(12) United States Patent
Wang et al.

(10) Patent No.: US 10,771,708 B2
(45) Date of Patent: *Sep. 8, 2020

(54) EXTERIOR VIEWING CAMERA MODULE FOR VEHICLE VISION SYSTEM

(71) Applicant: MAGNA ELECTRONICS INC., Auburn Hills, MI (US)

(72) Inventors: Jianguo Wang, Troy, MI (US); Garret Achenbach, Rochester Hills, MI (US); Ove Salomonsson, Farmington Hills, MI (US); Tom H. Toma, Waterford, MI (US); Edward R. Ahlquist, Jr., Troy, MI (US); Brian J. Winden, Rochester, MI (US); Christopher L. Van Dan Elzen, Rochester, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,062

(22) Filed: Oct. 28, 2019

(65) Prior Publication Data
US 2020/0059585 A1 Feb. 20, 2020

Related U.S. Application Data

(63) Continuation of application No. 16/396,856, filed on Apr. 29, 2019, now Pat. No. 10,462,375, which is a
(Continued)

(51) Int. Cl.
*H04N 5/235* (2006.01)
*B60R 11/04* (2006.01)
(Continued)

(52) U.S. Cl.
CPC ............. *H04N 5/235* (2013.01); *B60R 11/04* (2013.01); *H04N 5/2254* (2013.01); *H04N 7/18* (2013.01);
(Continued)

(58) Field of Classification Search
CPC .. H04N 5/2251; H04N 5/2252; H04N 5/2257; H04N 5/2254; H04N 5/235;
(Continued)

(56) References Cited

U.S. PATENT DOCUMENTS 4,514,530 A 4/1985 Sellstrom et al.
4,634,884 A 1/1987 Hayashimoto et al.
(Continued)

FOREIGN PATENT DOCUMENTS

CN 01059596 A 3/1992
CN 1743887 A 3/2006
(Continued)

OTHER PUBLICATIONS

International Search Report and Written Opinion dated May 6, 2013 from corresponding PCT Application No. PCT/US2012/026101.

*Primary Examiner* — Christopher S Kelley
*Assistant Examiner* — Kathleen M Walsh
(74) *Attorney, Agent, or Firm* — Honigman LLP

(57) ABSTRACT

A vehicular camera module includes a housing that houses a lens barrel, a lens holder, a main circuit board, and an imager disposed on an imager circuit board that is electrically connected with the main circuit board. The main circuit board includes a main PCB and the imager circuit board includes an imager PCB. Circuitry disposed at the main PCB includes an image processor for processing image data captured by the imager. The main circuit board is accommodated within front and rear portions of the housing, while the imager is accommodated within the rear portion and is not accommodated within the front portion. The imager views exterior of the housing via an opening of the upper cover at the rear portion of the housing, and the lens barrel extends through the opening. The lens barrel is tilted at an acute angle upward relative to the plane of the main PCB.

102 Claims, 47 Drawing Sheets

Related U.S. Application Data continuation of application No. 16/042,042, filed on Jul. 23, 2018, now Pat. No. 10,277,825, which is a continuation of application No. 15/871,173, filed on Jan. 15, 2018, now Pat. No. 10,033,934, which is a continuation of application No. 14/377,939, filed as application No. PCT/US2013/026101 on Feb. 14, 2013, now Pat. No. 9,871,971, which is a continuation-in-part of application No. 14/233,504, filed as application No. PCT/US2012/048993 on Jul. 31, 2012, now Pat. No. 9,596,387.

(60) Provisional application No. 61/583,431, filed on Jan. 5, 2012, provisional application No. 61/514,191, filed on Aug. 2, 2011, provisional application No. 61/600,205, filed on Feb. 17, 2012.

(51) Int. Cl.
    *H04N 7/18*     (2006.01)
    *H04N 5/225*    (2006.01)
    *B60R 11/00*    (2006.01)

(52) U.S. Cl.
    CPC .......... H04N 7/183 (2013.01); H05K 999/99 (2013.01); *B60R 2011/0026* (2013.01); *H04N 5/2251* (2013.01); *H04N 5/2252* (2013.01); *H04N 5/2257* (2013.01)

(58) Field of Classification Search
    CPC ........ H04N 7/18; H04N 7/183; H04N 5/2253; B60R 11/04; B60R 2011/0026; B60R 1/00; B60R 1/04; B60R 1/12; B60R 2001/1215; B60R 2001/1253; B60R 2300/102; B60R 2300/105; B60R 2300/303; B60R 2300/607; B60R 2300/8026; B60R 2300/804; B60R 2300/806; H05K 999/99; B60K 2370/152; B60K 2370/173; B60K 2370/21; B60K 2370/777; Y10T 29/49169
    USPC .................................. 348/143, 148; 29/854
    See application file for complete search history.

(56) References Cited

U.S. PATENT DOCUMENTS

| | | |
|---|---|---|
| 4,712,879 A | 12/1987 | Lynam et al. |
| 4,786,966 A | 11/1988 | Hanson et al. |
| 5,073,012 A | 12/1991 | Lynam |
| 5,076,673 A | 12/1991 | Lynam et al. |
| 5,096,287 A | 3/1992 | Kakinami et al. |
| 5,098,287 A | 3/1992 | Duncan et al. |
| 5,115,346 A | 5/1992 | Lynam |
| 5,130,804 A | 7/1992 | Tamura |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,204,615 A | 4/1993 | Richards et al. |
| 5,253,109 A | 10/1993 | O'Farrell et al. |
| 5,371,659 A | 12/1994 | Pastrick et al. |
| 5,406,414 A | 4/1995 | O'Farrell et al. |
| 5,497,306 A | 3/1996 | Pastrick |
| 5,525,264 A | 6/1996 | Cronin et al. |
| 5,550,677 A | 8/1996 | Schofield et al. |
| 5,559,556 A | 9/1996 | Kagebeck |
| 5,567,360 A | 10/1996 | Varaprasad et al. |
| 5,610,756 A | 3/1997 | Lynam et al. |
| 5,657,539 A | 8/1997 | Orikasa et al. |
| 5,668,663 A | 9/1997 | Varaprasad et al. |
| 5,669,699 A | 9/1997 | Pastrick et al. |
| 5,670,935 A | 9/1997 | Schofield et al. |
| 5,724,187 A | 3/1998 | Varaprasad et al. |
| 5,760,962 A | 6/1998 | Schofield et al. |
| 5,796,094 A | 8/1998 | Schofield et al. |
| 5,821,532 A | 10/1998 | Beaman et al. |
| 5,823,654 A | 10/1998 | Pastrick et al. |
| 5,854,708 A | 12/1998 | Komatsu et al. |
| 5,872,332 A | 2/1999 | Verma |
| 5,877,897 A | 3/1999 | Schofield et al. |
| 5,910,854 A | 6/1999 | Varaprasad et al. |
| 5,920,061 A | 7/1999 | Feng |
| 5,949,331 A | 9/1999 | Schofield et al. |
| 5,978,017 A | 11/1999 | Tino |
| 6,002,544 A | 12/1999 | Yatsu |
| 6,013,372 A | 1/2000 | Hayakawa et al. |
| 6,071,606 A | 6/2000 | Yamazaki et al. |
| 6,072,814 A | 6/2000 | Ryan et al. |
| 6,087,953 A | 7/2000 | DeLine et al. |
| 6,097,023 A | 8/2000 | Schofield et al. |
| 6,117,193 A | 9/2000 | Glenn |
| 6,124,886 A | 9/2000 | DeLine et al. |
| 6,151,065 A | 11/2000 | Steed |
| 6,154,306 A | 11/2000 | Varaprasad et al. |
| 6,172,613 B1 | 1/2001 | DeLine et al. |
| 6,176,602 B1 | 1/2001 | Pastrick et al. |
| 6,178,034 B1 | 1/2001 | Allemand et al. |
| 6,193,378 B1 | 2/2001 | Tonar et al. |
| 6,201,642 B1 | 3/2001 | Bos |
| 6,222,447 B1 | 4/2001 | Schofield et al. |
| 6,243,003 B1 | 6/2001 | DeLine et al. |
| 6,250,148 B1 | 6/2001 | Lynam |
| 6,259,475 B1 | 7/2001 | Ramachandran et al. |
| 6,276,821 B1 | 8/2001 | Pastrick et al. |
| 6,278,377 B1 | 8/2001 | DeLine et al. |
| 6,292,311 B1 | 9/2001 | Bohn et al. |
| 6,302,545 B1 | 10/2001 | Schofield et al. |
| 6,313,454 B1 | 11/2001 | Bos et al. |
| 6,320,176 B1 | 11/2001 | Schofield et al. |
| 6,326,613 B1 | 12/2001 | Heslin et al. |
| 6,329,925 B1 | 12/2001 | Skiver et al. |
| 6,341,523 B2 | 1/2002 | Lynam |
| 6,353,392 B1 | 3/2002 | Schofield et al. |
| 6,396,397 B1 | 5/2002 | Bos et al. |
| 6,420,975 B1 | 7/2002 | DeLine et al. |
| 6,428,172 B1 | 8/2002 | Hutzel et al. |
| 6,445,287 B1 | 9/2002 | Schofield et al. |
| 6,454,449 B2 | 9/2002 | Nestell et al. |
| 6,466,136 B2 | 10/2002 | DeLine et al. |
| 6,481,003 B1 | 11/2002 | Maeda |
| 6,483,101 B1 | 11/2002 | Webster |
| 6,498,620 B2 | 12/2002 | Schofield et al. |
| 6,501,387 B2 | 12/2002 | Skiver et al. |
| 6,523,964 B2 | 2/2003 | Schofield et al. |
| 6,535,242 B1 | 3/2003 | Strumolo et al. |
| 6,559,435 B2 | 5/2003 | Schofield et al. |
| 6,559,439 B1 | 5/2003 | Tsuchida et al. |
| 6,587,152 B1 | 7/2003 | Sharp et al. |
| 6,590,658 B2 | 7/2003 | Case et al. |
| 6,593,565 B2 | 7/2003 | Heslin et al. |
| 6,603,612 B2 | 8/2003 | Nakano |
| 6,611,202 B2 | 8/2003 | Schofield et al. |
| 6,651,187 B2 | 11/2003 | Lacey, III |
| 6,654,187 B2 | 11/2003 | Ning |
| 6,690,268 B2 | 2/2004 | Schofield et al. |
| 6,717,610 B1 | 4/2004 | Bos et al. |
| 6,757,109 B2 | 6/2004 | Bos |
| 6,768,422 B2 | 7/2004 | Schofield et al. |
| 6,774,356 B2 | 8/2004 | Heslin et al. |
| 6,795,237 B1 | 9/2004 | Marinelli et al. |
| 6,805,767 B2 | 10/2004 | Shinomiya |
| 6,806,452 B2 | 10/2004 | Bos et al. |
| 6,822,563 B2 | 11/2004 | Bos et al. |
| 6,824,281 B2 | 11/2004 | Schofield et al. |
| 6,831,261 B2 | 12/2004 | Schofield et al. |
| 6,891,563 B2 | 5/2005 | Schofield et al. |
| 6,897,432 B2 | 5/2005 | Schmidtke et al. |
| 6,946,978 B2 | 9/2005 | Schofield |
| 6,953,253 B2 | 10/2005 | Schofield et al. |
| 6,968,736 B2 | 11/2005 | Lynam |
| 6,977,619 B2 | 12/2005 | March et al. |
| 7,004,593 B2 | 2/2006 | Weller et al. |

(56) References Cited

U.S. PATENT DOCUMENTS

| | | |
|---|---|---|
| 7,004,606 B2 | 2/2006 | Schofield |
| 7,005,974 B2 | 2/2006 | McMahon et al. |
| 7,015,944 B2 | 3/2006 | Holz et al. |
| 7,031,075 B2 | 4/2006 | Tsuji |
| 7,038,577 B2 | 5/2006 | Pawlicki et al. |
| 7,095,123 B2 | 8/2006 | Prior |
| 7,095,572 B2 | 8/2006 | Lee et al. |
| 7,111,996 B2 | 9/2006 | Seger et al. |
| 7,123,168 B2 | 10/2006 | Schofield |
| 7,188,963 B2 | 3/2007 | Schofield et al. |
| 7,205,904 B2 | 4/2007 | Schofield |
| 7,215,479 B1 | 5/2007 | Bakin |
| 7,255,451 B2 | 8/2007 | McCabe et al. |
| 7,262,406 B2 | 8/2007 | Heslin et al. |
| 7,265,342 B2 | 9/2007 | Heslin et al. |
| 7,268,957 B2 | 9/2007 | Frenzel et al. |
| 7,289,037 B2 | 10/2007 | Uken et al. |
| 7,311,406 B2 | 12/2007 | Schofield et al. |
| 7,325,934 B2 | 2/2008 | Schofield et al. |
| 7,339,149 B1 | 3/2008 | Schofield et al. |
| 7,344,261 B2 | 3/2008 | Schofield et al. |
| 7,355,524 B2 | 4/2008 | Schofield |
| 7,370,983 B2 | 5/2008 | DeWind et al. |
| 7,388,182 B2 | 6/2008 | Schofield et al. |
| 7,391,458 B2 | 6/2008 | Sakamoto |
| 7,402,786 B2 | 7/2008 | Schofield et al. |
| 7,419,315 B2 | 9/2008 | Hirata et al. |
| 7,420,159 B2 | 9/2008 | Heslin et al. |
| 7,423,248 B2 | 9/2008 | Schofield et al. |
| 7,423,665 B2 | 9/2008 | Ray et al. |
| 7,425,076 B2 | 9/2008 | Schofield et al. |
| 7,453,509 B2 | 11/2008 | Losehand et al. |
| 7,480,149 B2 * | 1/2009 | DeWard ............... B60R 11/04 340/438 |
| 7,526,103 B2 | 4/2009 | Schofield et al. |
| 7,533,998 B2 | 5/2009 | Schofield et al. |
| 7,536,316 B2 | 5/2009 | Ozer |
| 7,538,316 B2 | 5/2009 | Heslin et al. |
| 7,551,103 B2 | 6/2009 | Schofield |
| 7,579,939 B2 | 8/2009 | Schofield et al. |
| 7,599,134 B2 | 10/2009 | Bechtel et al. |
| 7,616,781 B2 | 11/2009 | Schofield et al. |
| 7,655,894 B2 | 2/2010 | Schofield et al. |
| 7,679,498 B2 | 3/2010 | Pawlicki et al. |
| 7,697,027 B2 | 4/2010 | McMahon et al. |
| 7,728,721 B2 | 6/2010 | Schofield et al. |
| 7,768,574 B2 | 8/2010 | Humpston |
| 7,877,175 B2 | 1/2011 | Higgins-Luthman |
| 7,888,629 B2 | 2/2011 | Heslin et al. |
| 7,889,086 B2 | 2/2011 | Schafer et al. |
| 7,916,009 B2 | 3/2011 | Schofield et al. |
| 7,918,570 B2 | 4/2011 | Weller et al. |
| 7,946,505 B2 | 5/2011 | Lynam et al. |
| 7,965,336 B2 | 6/2011 | Bingle et al. |
| 7,972,045 B2 | 7/2011 | Schofield |
| 7,994,462 B2 | 8/2011 | Schofield et al. |
| 8,063,759 B2 | 11/2011 | Bos et al. |
| 8,064,146 B2 | 11/2011 | Iwasaki |
| 8,070,332 B2 | 12/2011 | Higgins-Luthman et al. |
| 8,090,153 B2 | 1/2012 | Schofield et al. |
| 8,120,652 B2 | 2/2012 | Bechtel et al. |
| 8,142,059 B2 | 3/2012 | Higgins-Luthman et al. |
| 8,162,518 B2 | 4/2012 | Schofield |
| 8,179,437 B2 | 5/2012 | Schofield et al. |
| 8,192,095 B2 | 6/2012 | Kortan et al. |
| 8,194,133 B2 | 6/2012 | DeWind et al. |
| 8,203,440 B2 | 6/2012 | Schofield et al. |
| 8,222,588 B2 | 7/2012 | Schofield et al. |
| 8,223,203 B2 | 7/2012 | Ohsumi et al. |
| 8,239,086 B2 | 8/2012 | Higgins-Luthman |
| 8,254,011 B2 | 8/2012 | Baur et al. |
| 8,256,821 B2 | 9/2012 | Lawlor et al. |
| 8,289,142 B2 | 10/2012 | Pawlicki et al. |
| 8,294,608 B1 | 10/2012 | Lynam |
| 8,314,689 B2 | 11/2012 | Schofield et al. |
| 8,318,512 B2 | 11/2012 | Shah et al. |
| 8,324,552 B2 | 12/2012 | Schofield et al. |
| 8,325,986 B2 | 12/2012 | Schofield et al. |
| 8,339,453 B2 | 12/2012 | Blake, III et al. |
| 8,355,839 B2 | 1/2013 | Schofield et al. |
| 8,376,595 B2 | 2/2013 | Higgins-Luthman |
| 8,386,114 B2 | 2/2013 | Higgins-Luthman |
| 8,405,725 B2 | 3/2013 | McMahon et al. |
| 8,405,726 B2 | 3/2013 | Schofield et al. |
| 8,451,332 B2 | 5/2013 | Rawlings |
| 8,513,590 B2 | 8/2013 | Heslin et al. |
| 8,529,075 B2 | 9/2013 | Yamada et al. |
| 8,531,278 B2 | 9/2013 | DeWard et al. |
| 8,534,887 B2 | 9/2013 | DeLine et al. |
| 8,542,451 B2 | 9/2013 | Lu et al. |
| 8,548,315 B2 | 10/2013 | Okuda |
| 8,629,768 B2 | 1/2014 | Bos et al. |
| 8,665,079 B2 | 3/2014 | Pawlicki et al. |
| 8,743,203 B2 | 6/2014 | Karner et al. |
| 8,763,970 B2 | 7/2014 | Mordau et al. |
| 8,851,690 B2 | 10/2014 | Uken et al. |
| 8,944,655 B2 | 2/2015 | Verrat-Debailleul et al. |
| 9,150,165 B1 | 10/2015 | Fortin et al. |
| 9,156,403 B2 | 10/2015 | Rawlings et al. |
| 9,193,308 B2 | 11/2015 | Okuda |
| 9,266,474 B2 | 2/2016 | DeWard et al. |
| 9,277,104 B2 | 3/2016 | Sesti et al. |
| 9,338,334 B2 | 5/2016 | Lu et al. |
| 9,380,219 B2 | 6/2016 | Salomonsson et al. |
| 9,451,138 B2 | 9/2016 | Winden et al. |
| 9,487,159 B2 | 11/2016 | Achenbach |
| 9,497,368 B1 | 11/2016 | Winden et al. |
| 9,596,387 B2 | 3/2017 | Achenbach et al. |
| 9,630,570 B2 | 4/2017 | Salomonsson et al. |
| 9,635,230 B2 | 4/2017 | Winden et al. |
| 9,871,971 B2 | 1/2018 | Wang et al. |
| 9,878,679 B2 | 1/2018 | Salomonsson et al. |
| 9,883,088 B2 | 1/2018 | Winden et al. |
| 10,033,934 B2 * | 7/2018 | Wang ..................... H04N 5/235 |
| 10,046,716 B2 | 8/2018 | Okuda et al. |
| 10,065,575 B2 | 9/2018 | Salomonsson et al. |
| 10,264,168 B2 | 4/2019 | Winden et al. |
| 10,277,825 B2 * | 4/2019 | Wang ..................... H04N 7/18 |
| 10,462,375 B2 * | 10/2019 | Wang ..................... H04N 7/18 |
| 2002/0003571 A1 | 1/2002 | Schofield et al. |
| 2002/0156559 A1 | 10/2002 | Stam et al. |
| 2002/0159270 A1 | 10/2002 | Lynam et al. |
| 2003/0090569 A1 | 5/2003 | Poechmueller |
| 2003/0137595 A1 | 7/2003 | Takachi |
| 2003/0169522 A1 | 9/2003 | Schofield et al. |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0189862 A1 | 9/2004 | Gustavsson et al. |
| 2005/0083590 A1 | 4/2005 | Tanigawa et al. |
| 2005/0104995 A1 | 5/2005 | Spryshak et al. |
| 2005/0141106 A1 | 6/2005 | Lee et al. |
| 2005/0184352 A1 | 8/2005 | Jeong et al. |
| 2005/0190283 A1 | 9/2005 | Ish-Shalom et al. |
| 2005/0232469 A1 | 10/2005 | Schofield et al. |
| 2005/0274883 A1 | 12/2005 | Nagano |
| 2006/0038668 A1 | 2/2006 | DeWard et al. |
| 2006/0049533 A1 | 3/2006 | Kamoshita |
| 2006/0050018 A1 | 3/2006 | Hutzel et al. |
| 2006/0054802 A1 | 3/2006 | Johnston |
| 2006/0056077 A1 | 3/2006 | Johnston |
| 2006/0061008 A1 | 3/2006 | Karner et al. |
| 2006/0065436 A1 | 3/2006 | Gally et al. |
| 2006/0077575 A1 | 4/2006 | Nakai et al. |
| 2006/0103727 A1 | 5/2006 | Tseng |
| 2006/0125919 A1 | 6/2006 | Camilleri et al. |
| 2006/0171704 A1 | 8/2006 | Bingle et al. |
| 2006/0184297 A1 | 8/2006 | Higgins-Luthman |
| 2006/0202038 A1 | 9/2006 | Wang et al. |
| 2007/0096020 A1 | 5/2007 | Mitsugi et al. |
| 2007/0109406 A1 | 5/2007 | Schofield et al. |
| 2007/0120657 A1 | 5/2007 | Schofield et al. |
| 2007/0221826 A1 | 9/2007 | Bechtel et al. |
| 2007/0279518 A1 | 12/2007 | Apel et al. |

(56) References Cited

U.S. PATENT DOCUMENTS

| | | |
|---|---|---|
| 2008/0024833 A1 | 1/2008 | Kawasaki |
| 2008/0024883 A1 | 1/2008 | Iwasaki |
| 2008/0043105 A1 | 2/2008 | Kallhammer et al. |
| 2008/0121034 A1 | 5/2008 | Lynam et al. |
| 2008/0247751 A1 | 10/2008 | Lang et al. |
| 2008/0252882 A1 | 10/2008 | Kesterson |
| 2009/0010494 A1 | 1/2009 | Bechtel et al. |
| 2009/0046150 A1 | 2/2009 | Hayakawa et al. |
| 2009/0085755 A1 | 4/2009 | Schafer et al. |
| 2009/0208058 A1 | 8/2009 | Schofield et al. |
| 2009/0244361 A1 | 10/2009 | Gebauer et al. |
| 2009/0295181 A1* | 12/2009 | Lawlor ............... B60R 11/04 296/1.11 |
| 2010/0103308 A1 | 4/2010 | Butterfield et al. |
| 2010/0110192 A1 | 5/2010 | Johnston et al. |
| 2010/0118146 A1 | 5/2010 | Schofield et al. |
| 2010/0134616 A1 | 6/2010 | Seger et al. |
| 2010/0165468 A1 | 7/2010 | Yamada et al. |
| 2010/0279438 A1 | 11/2010 | An et al. |
| 2010/0279439 A1 | 11/2010 | Shah et al. |
| 2010/0283581 A1 | 11/2010 | Heigl |
| 2011/0025850 A1 | 2/2011 | Maekawa et al. |
| 2011/0035120 A1 | 2/2011 | Taylor et al. |
| 2011/0163904 A1 | 7/2011 | Alland et al. |
| 2011/0233248 A1 | 9/2011 | Flemming et al. |
| 2011/0298968 A1 | 12/2011 | Tseng et al. |
| 2012/0008129 A1 | 1/2012 | Lu et al. |
| 2012/0013741 A1* | 1/2012 | Blake, III ............ G01D 11/30 348/148 |
| 2012/0069185 A1 | 3/2012 | Stein |
| 2012/0075471 A1 | 3/2012 | Seger et al. |
| 2012/0081550 A1 | 4/2012 | Sewell |
| 2012/0182425 A1 | 7/2012 | Higgins-Luthman et al. |
| 2012/0207461 A1 | 8/2012 | Okuda |
| 2012/0265416 A1 | 10/2012 | Lu et al. |
| 2013/0002873 A1 | 1/2013 | Hess |
| 2013/0044021 A1 | 2/2013 | Lynam |
| 2014/0000804 A1 | 1/2014 | Looi et al. |
| 2014/0015977 A1 | 1/2014 | Taylor et al. |
| 2014/0016919 A1 | 1/2014 | Okuda |
| 2014/0022657 A1 | 1/2014 | Lu et al. |
| 2014/0043465 A1 | 2/2014 | Salomonsson et al. |
| 2014/0160284 A1 | 6/2014 | Achenbach et al. |
| 2014/0226012 A1 | 8/2014 | Achenbach |
| 2015/0015713 A1 | 1/2015 | Wang et al. |
| 2015/0042798 A1 | 2/2015 | Takeda |
| 2015/0251605 A1 | 9/2015 | Uken et al. |
| 2017/0187931 A1 | 6/2017 | Onishi et al. |

FOREIGN PATENT DOCUMENTS

| | | |
|---|---|---|
| CN | 101681530 A | 3/2010 |
| CN | 101799614 A | 8/2010 |
| DE | 102008044003 A1 | 5/2010 |
| DE | 102010023593 A1 | 12/2011 |
| EP | 0889801 A1 | 1/1999 |
| EP | 1025702 A1 | 8/2000 |
| EP | 1271214 A1 | 1/2003 |
| EP | 1351316 A2 | 10/2003 |
| EP | 1504276 A2 | 2/2005 |
| EP | 1605520 A1 | 12/2005 |
| JP | 08084277 | 3/1996 |
| JP | 2006-293100 A | 10/2006 |
| JP | 2006-350372 A | 12/2006 |
| JP | 2007243550 A | 9/2007 |
| JP | 2010042703 A | 2/2010 |
| WO | 2001044850 A2 | 6/2001 |
| WO | 2004010679 A2 | 1/2004 |
| WO | 2006029995 A1 | 3/2006 |
| WO | 2006029996 A1 | 3/2006 |
| WO | 2007053404 A2 | 5/2007 |
| WO | 2008024639 A2 | 2/2008 |
| WO | 2008127752 A2 | 10/2008 |
| WO | 2009046268 A1 | 4/2009 |
| WO | 2011111465 A1 | 9/2011 |
| WO | 2013019795 A1 | 2/2013 |
| WO | 2013081984 A1 | 6/2013 |
| WO | 2013081985 A1 | 6/2013 |
| WO | 2013123161 A1 | 8/2013 |

* cited by examiner

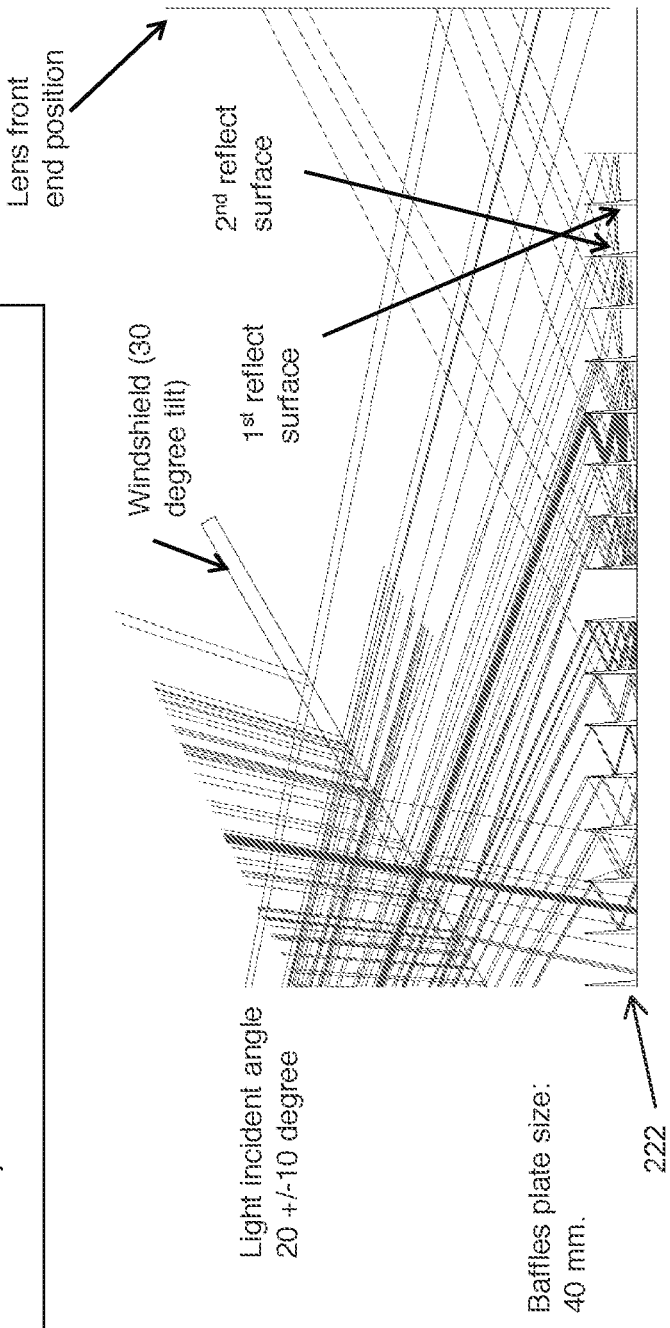

- The best baffle angle is vertical for both surface.
- The 1st reflection surface should be as vertical as possible.
- The 2nd reflection surface should be less than 10 degree to the vertical position.
- The 2nd surface: the smaller the angle to the vertical the better.
- The baffles should made as deep as possible.
- The top of the baffle should as sharp as possible to reduce scatter light from the top of the baffles.

FIG. 16

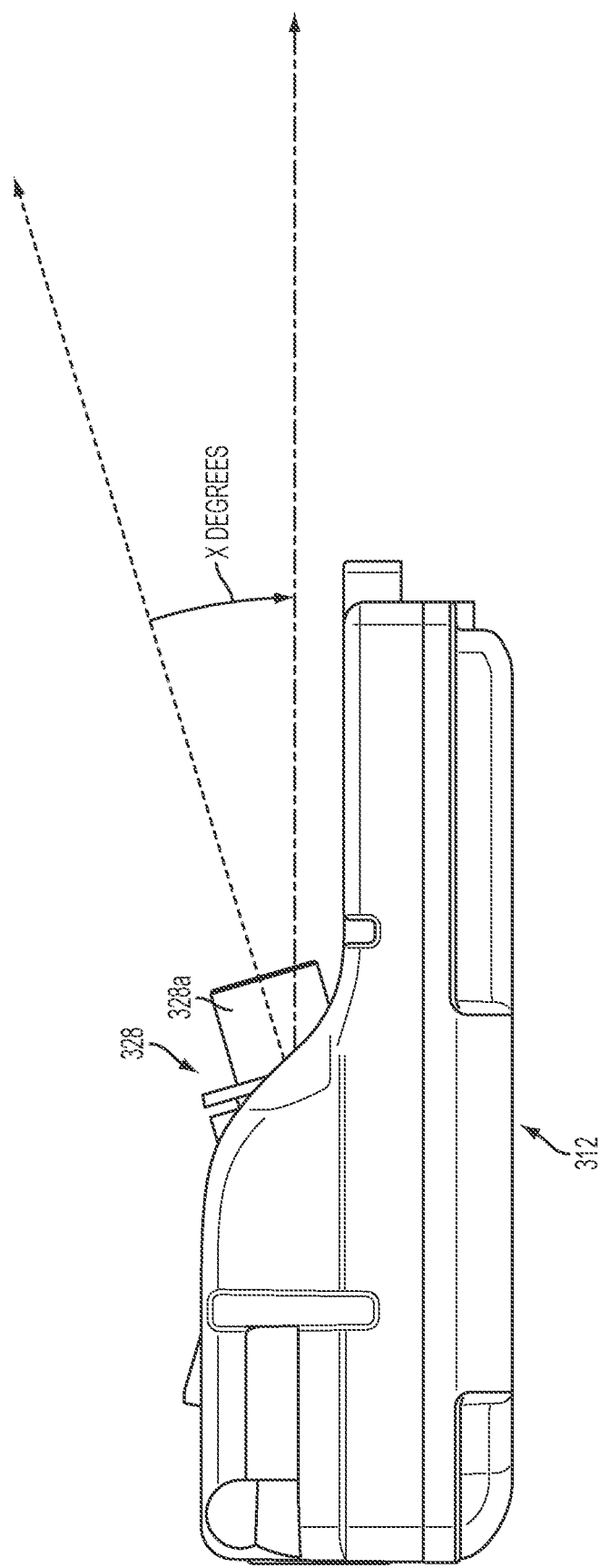

EXTERIOR VIEWING CAMERA MODULE FOR VEHICLE VISION SYSTEM

CROSS REFERENCE TO RELATED APPLICATIONS

The present application is a continuation application of U.S. patent application Ser. No. 16/396,856, filed Apr. 29, 2019, now U.S. Pat. No. 10,462,375, which is a continuation application of U.S. patent application Ser. No. 16/042,042, filed Jul. 23, 2018, now U.S. Pat. No. 10,277,825, which is a continuation application of U.S. patent application Ser. No. 15/871,173, filed Jan. 15, 2018, now U.S. Pat. No. 10,033,934, which is a continuation application of U.S. patent application Ser. No. 14/377,939, filed Aug. 11, 2014, now U.S. Pat. No. 9,871,971, which is a 371 national phase filing of PCT Application No. PCT/US2013/026101, filed Feb. 14, 2013, which claims the filing benefit of U.S. provisional applications, Ser. No. 61/600,205, filed Feb. 17, 2012, which is hereby incorporated herein by reference in its entirety. U.S. patent application Ser. No. 14/377,939 is a continuation-in-part of U.S. patent application Ser. No. 14/233,507, filed Jan. 17, 2014, now U.S. Pat. No. 9,596,387, which is a 371 national stage filing of PCT Application No. PCT/US2012/048993, filed Jul. 31, 2012 and published Feb. 7, 2013 as International Publication No. WO 2013/019795, which is hereby incorporated herein by reference in its entirety, and which claims priority of U.S. provisional applications, Ser. No. 61/583,431, filed Jan. 5, 2012, and Ser. No. 61/514,191, filed Aug. 2, 2011.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 8,324,552; 8,314,689; 8,222,588; 8,203,440; 7,994,462; 7,655,894; 7,339,149; 7,344,261; 7,459,664; 7,423,248; 6,097,023; 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data, which may be displayed or processed to provide the desired display images and/or processing and control, depending on the particular application of the camera and vision or imaging system. The present invention provides a stray light shield for a forward facing imaging (FFI) machine vision camera module. The stray light shield of the present invention adapts or customizes a standard or common camera module for a particular vehicle windshield application (for example, to compensate for the particular windshield angle used in the equipped vehicle so that the stray light shield construction generally compensates for the windshield rake angle so that, with the camera module attached at the vehicle windshield, the principal line of vision of the camera that is located in the camera module is set appropriately for the desired FFI application, for example, generally horizontal with the road being traveled). The stray light shield preferably provides a tapered or wedge-shaped pocket or recess that is disposed in front of the lens/image sensor (such as a CMOS photosensor array or the like) and that shields the lens/image sensor from extraneous light emanating from within the cabin of the vehicle at which the camera module is disposed when the camera module is mounted either directly to the windshield or to a bracket that itself is attached at the windshield. The stray light shield may be an integral part of the bracket that is attached to the windshield (and to which bracket the camera module is attached, preferably detachably attached) or the light shield may be formed as a separate component or element and may be attached or secured at the camera module (or at the bracket) before the camera module is attached at the bracket at the windshield.

The stray light shield may include a light baffling or light trapping structure or configuration or system that limits or reduces extraneous light that passes through a window or windshield of the equipped vehicle from exterior the vehicle from being directly or indirectly imaged by the forward facing camera that is at or near the windshield and that views through the windshield. The light baffling/light trapping structure thus helps assure that light originating external of the vehicle that is incident at the image sensor of the forward facing camera emanates from (or is reflected by) objects of interest in the forward field of view of the imager (for example, other vehicles, pedestrians, road signs, oncoming headlights, leading taillights, road markers, construction zone lanes and/or the like), and the light baffling/light trapping structure or system does so in a manner that reduces extraneous light (such as sunlight glare, overhead streetlights, extraneous shop or billboard lighting or the like) from glaring at or otherwise confusing image data gathered by the forward facing camera and its associated image processing system.

According to an aspect of the present invention, a vehicle vision system or driver assistance system includes a camera module comprising an imager or camera or image sensor with a field of view through a window of the vehicle, such as a forward field of view through a windshield of the equipped vehicle when the camera module is disposed at the in-cabin surface of that window or windshield. A bracket has an attachment portion that is configured to attach at an in-cabin surface of the vehicle windshield (such as by direct adhesive attachment or by attachment to one or more attachment elements that themselves are adhered at the in-cabin surface of the vehicle windshield). A light shield comprises a base portion and side walls (preferably tapering side walls) that extend upward from the base portion so as to preferably provide a tapered pocket or cavity or recess, and wherein an aperture is provided at a narrower end of the tapered pocket. The camera module comprises the imager assembly or camera having an image sensor array and a lens, and the camera module is configured to attach at the bracket (preferably to detachably attach). When the camera module is attached at the bracket, with the light shield disposed at the camera module, the lens is disposed at the aperture (such as to protrude at least partially through the aperture and into the pocket, or such as to view into the pocket via the aperture) and views via the pocket through the windshield of the equipped vehicle. The light shield may be an integral part of the bracket (for example, the light shield may be integrally molded with the bracket via an injection molding operation or the like) or may be a separate structure that is attached at the camera module (or that is attached at the bracket) before the camera module is attached at the bracket at the vehicle windshield. The separate light shield (that is a separate and distinct component from the camera module) provides an adapting or customizing feature that, when disposed at the camera module at the vehicle windshield, adapts or configures the camera module for the particular vehicle and/or windshield application.

The light shield may include a light baffling device or structure or light trap disposed in front of the camera or imager and between a lens of the camera and the window of the vehicle. The light baffling device comprises a plurality of baffle elements arranged in a spaced apart manner, with each baffle element comprising a generally vertically oriented element (or fin or rib or column or the like) having a first surface and a second surface opposite the first surface. The first surface of a given baffle element is closer to the window than the second surface of the given baffle element. The first surface may be configured to be at an angle of less than about five degrees relative to vertical and the second surface may be configured to be at an angle of less than about ten degrees relative to vertical when the camera and the light baffling device are normally mounted in the vehicle. The baffle elements are arranged to limit or reduce extraneous light that passes through the window or windshield of the equipped vehicle (that can directly impinge or be incident on or at the camera or that may reflect or scatter in front of the camera) from reaching and being imaged by the camera.

Optionally, the first and second surfaces of the baffle element may be at different angles so that the baffle element narrows towards its upper end. The upper end of the baffle element may narrow to a point or may be substantially pointed. The vehicle window may comprise a vehicle windshield, such as a windshield that is angled relative to horizontal, such as an angle of at least about 15 degrees relative to horizontal or at least about 25 degrees relative to horizontal or at least about 30 degrees relative to horizontal or more, such as at least about 45 degrees relative to horizontal.

Therefore, the present invention provides for adaptation or customization of a camera module (such as a common or universal camera module) for various vehicle and/or windshield applications. The stray light shield of the present invention is a separate component from the camera module and is attached at or disposed at the camera module at least when the camera module is attached or disposed at the vehicle windshield to adapt the camera module for the particular vehicle/windshield application. In accordance with the present invention, a camera module manufacturer can manufacture a standard camera module that lacks a stray light shield, and the needed light shield can be customized for a particular vehicle brand and/or model. Since the stray light shield can be manufactured at considerably lower cost and with greater flexibility than that of a camera module, this aspect of the present invention improves manufacturing economy and flexibility.

The present invention also provides enhanced imaging of light, such as light that passes through a windshield of a vehicle to a forward facing camera disposed at or near the windshield of the vehicle, by limiting or reducing imaging of reflected or scattered light. The light baffling elements are spaced apart in front the imaging device to reflect the scattered light and reduce the amount of reflected or scattered light that is received by and imaged by the imaging device or camera. The construction and arrangement of the light baffling elements is selected to limit or reduce imaging of the reflected or scattered light, and may be optimized via computer algorithms and design systems.

These and other objects, advantages, purposes and features of the present invention will become apparent upon review of the following specification in conjunction with the drawings.

BRIEF DESCRIPTION OF THE DRAWINGS

The drawings illustrate, by way of example only, embodiments of the present disclosure.

FIG. 16 is a schematic showing light reflecting at a baffle configuration of the present invention;

FIG. 27C is a side elevation of a camera module of the present invention;

DESCRIPTION OF THE PREFERRED EMBODIMENTS

Figure 1:
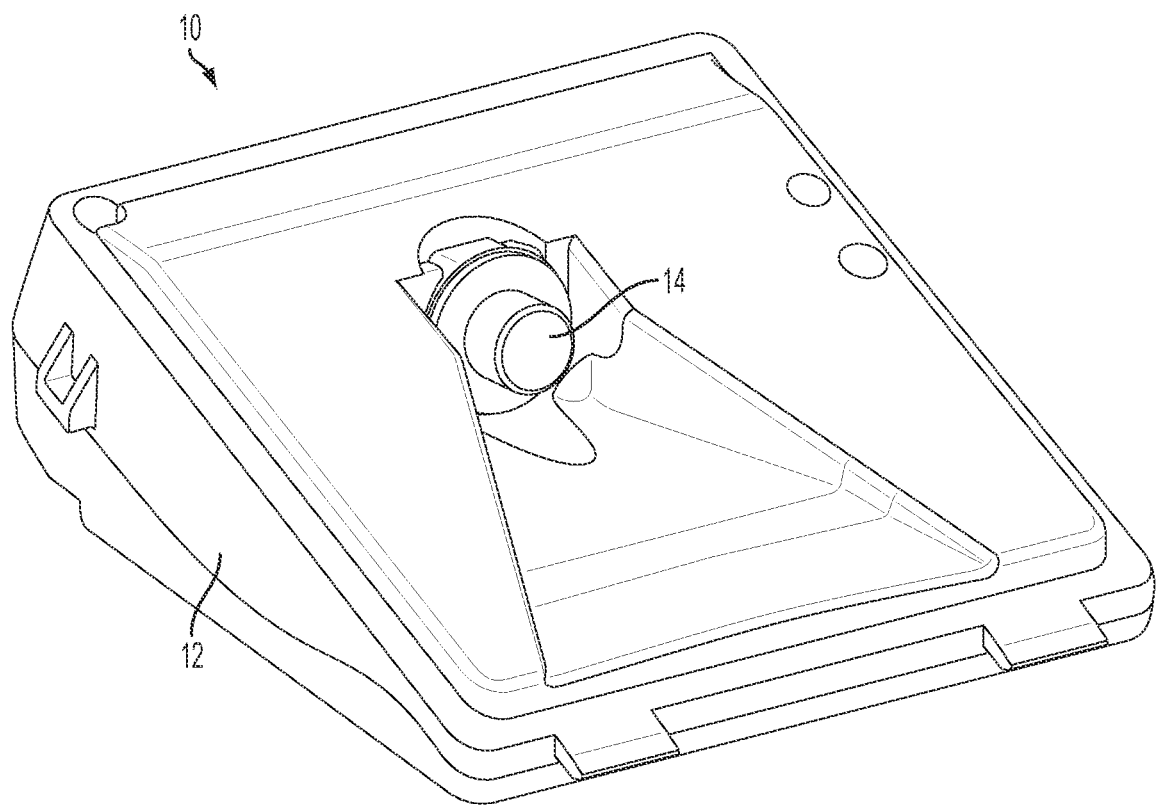
FIG. 1 is a perspective view of a vehicular camera system.

A vehicular camera system can be installed on the inside of the front windshield of a vehicle, such as a car, truck, bus, or van. Such a camera system may be used for a variety of functions such as object detection, lane keeping, and high beam control. FIG. 1 shows an example of a vehicular camera system or module 10 configured to be attached in a front-facing manner to a vehicle. The camera system 10 includes a housing 12 and a lens barrel 14 projecting therefrom.

Figure 2:
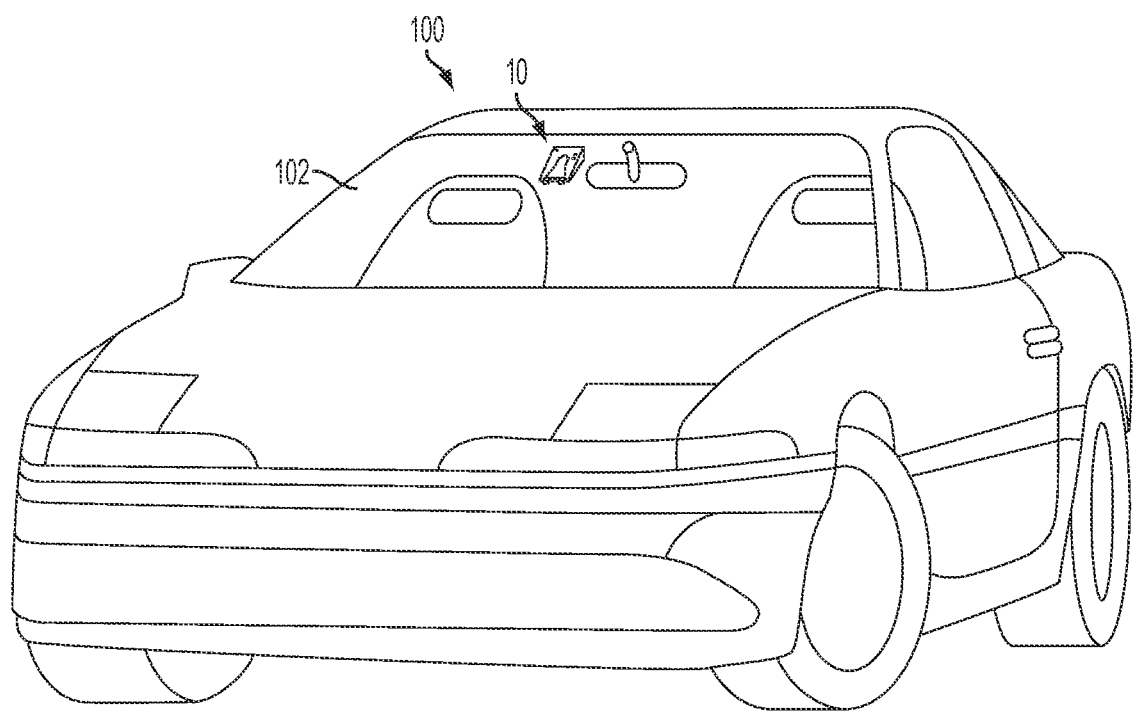
FIG. 2 is a perspective view of a vehicle having the vehicular camera system.

FIG. 2 shows a forward-facing position for a camera system 10 in the vehicle 100. The camera system or module 10 can be attached to the windshield 102, as shown, such as via a frame or bracket that is adhesively attached at the windshield via a plurality of fixing elements or attachment elements. Other positions are also possible. The camera system or camera module of the present invention may utilize aspects of the systems and/or modules described in PCT Application No. PCT/US2012/048993, filed Jul. 31, 2012 and published Feb. 7, 2013 as International Publication No. WO 2013/019795, and/or U.S. Pat. Nos. 8,256,821; 7,480,149; 7,289,037; 7,004,593; 6,824,281; 6,690,268; 6,445,287; 6,428,172; 6,420,975; 6,326,613; 6,278,377; 6,243,003; 6,250,148; 6,172,613 and/or 6,087,953, and/or U.S. patent application Ser. No. 11/721,406, filed Jun. 11, 2007 and published Dec. 3, 2009 as U.S. Publication No. US-2009-0295181, which are all hereby incorporated herein by reference in their entireties.

Since the camera system 10 uses a portion of the limited amount of space on the windshield 102, which is needed for a clear view of the road and/or placement of other components of the vehicle, the camera housing 12 can be made as small as practical. A height H (see FIG. 4C) of the camera housing 12 tends to have a relatively significant effect on driver and passenger visual perception. As will be discussed below, the components of the camera system 10 can be configured to reduce the height H. In one example, the height H can be reduced to about 28 mm (about 1.1 inches), which is about 15 percent smaller than a comparable camera system.

Figure 3:
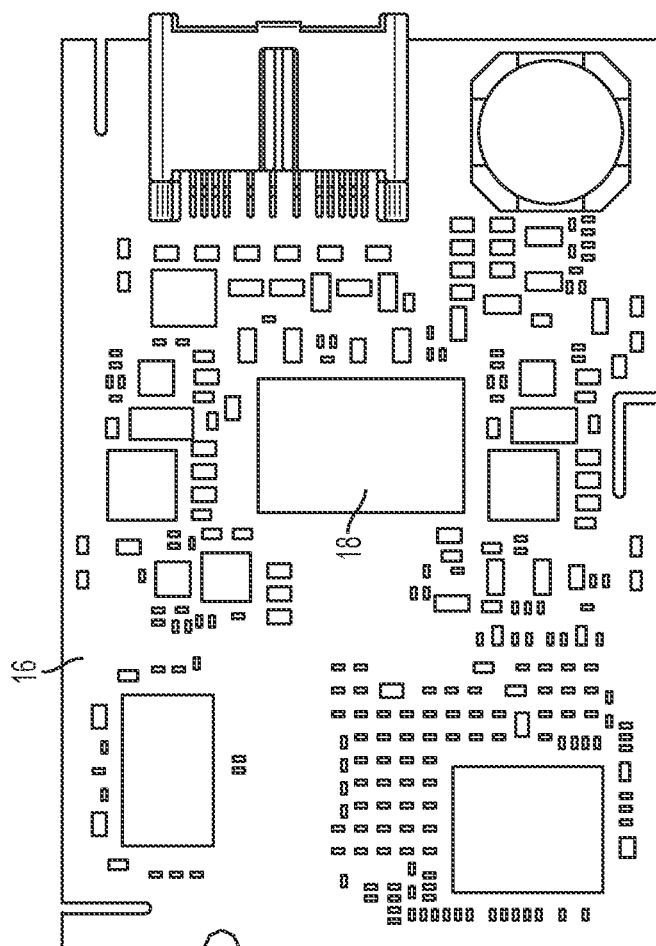
FIG. 3 is a plan view of a main circuit board of the vehicular camera system.

As shown in FIG. 3, the camera system 10 includes a main circuit board 16, such as a printed circuit board (PCB), that has an opening 18, which may be referred to as a hole or a cut-out section. The opening 18 can be approximately centrally located, as depicted, in the main PCB 16, or, in other examples, can be positioned at other locations. The opening 18 is surrounded by material of the main PCB 16. The opening 18 can be formed by any mechanical technique suitable for the material of the main PCB 16, such as cutting, punching, drilling, or milling, or by another technique, such as laser cutting. The opening 18 can be formed during the fabrication process of PCB material for use as PCBs or can be formed subsequently. In the embodiment shown in FIG. 3, the opening 18 has a rectangular shape with rounded inside corners. In other embodiments other shapes, such as elliptical, can be used for the opening 18.

Figure 4A:
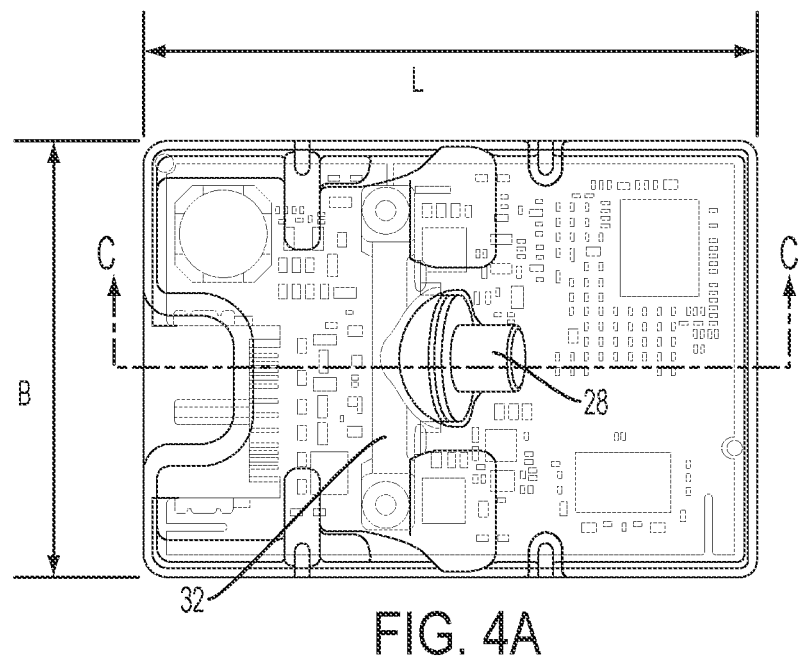
FIG. 4A is a hidden-line top view of the vehicular camera system showing internal components.
Figure 4B:
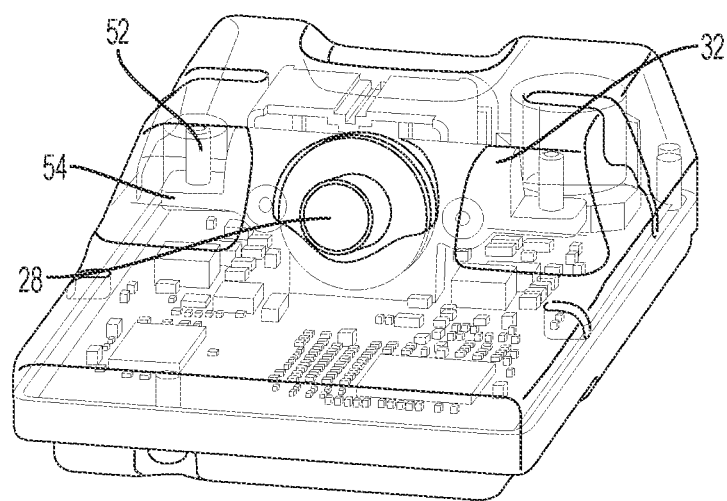
FIG. 4B is a hidden-line perspective view of the vehicular camera system showing internal components.
Figure 4C:
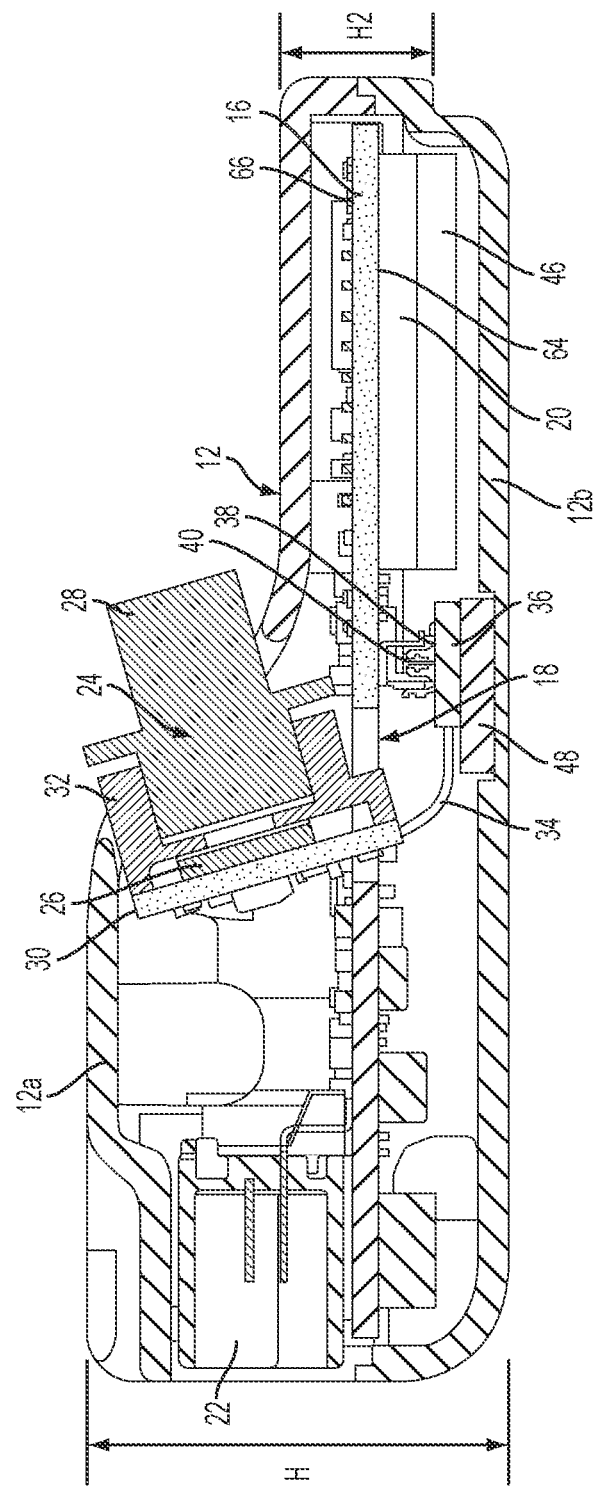
FIG. 4C is a section view of the vehicular camera system along section line C-C of FIG. 4A.

As seen in FIGS. 4A-C, the main PCB 16 is installed extending along a breadth B and length L of the housing 12. The main PCB 16 is dual-sided and has circuitry or electrical components or elements established at or populated at both sides of the PCB. The main PCB 16 supports or includes or carries or has established thereon a digital image processor 20, memory components, power supply components, and a vehicle connector 22, which are electrically operatively coupled together by conductive traces and vias. The processor 20 and memory are cooperatively configured to provide functions such as image processing, object detection, and lane detection. The main PCB 16 can be multilayered.

In the above-mentioned example where the height H of the camera housing 12 is about 28 mm (about 1.1 inches), the breadth B of the housing 12 can be about 58 mm (about 2.3 inches) and the length can be about 85 mm (about 3.3 inches). A forward height H2 of the housing can be about 10 mm (about 0.4 inches). In addition to the 15 percent reduction in height, these dimensions afford as much as a 35 percent reduction in breadth and a 15 percent reduction in length with respect to the comparable camera system.

An imager assembly 24 extends through the opening 18 of the main PCB 16. The imager assembly 24 includes an imager 26, such as an integrated circuit (IC) imager, which receives light directed by a lens 28 positioned in front of the imager 26 to capture a scene in front of the vehicle. The imager 26 can include a charge-coupled device (CCD), a complementary metal-oxide semiconductor (CMOS) active-pixel sensor (APS), or similar device. The imager 26 is connected to an imager circuit board 30 (such as a PCB), and a lens holder 32 mechanically fixes the lens 28 to the imager PCB 30. The imager PCB 30 and the lens holder 32 extend along the height H of the housing 12 partially through the opening 18 of the main PCB 16, which can allow for the above-mentioned reduction in the height H of the housing 12. The imager PCB 30 extending along the height H need not be parallel to the height H, and the imager PCB 30 can be tilted at an angle, as depicted, resulting in the other components of the imager assembly 24 being tilted as well. The magnitude of such angle can be selected to allow for the height H of the housing 12 to meet an operational constraint. For example, when a taller housing 12 is acceptable, then the angle can be 90 degrees, meaning that the imager PCB 30 extends parallel to the height H or perpendicular to the main PCB 16. When a shorter housing 12 is needed, the magnitude of the angle can be reduced, thereby tilting the imager PCB 30 with respect to the main PCB 16 so that the imager PCB 30 is not perpendicular to the main PCB 16 (as depicted). The location in the vehicle of the camera system 10 can be taken into account when determining the angle of the imager PCB 30. Geometric factors such as windshield slope and shape of the housing 12 as well as the desired field of view of the camera system 10 can be taken into account. In this example, the angle is about 75 degrees. In other examples, the angle can be smaller, such as about 60 degrees, or larger.

The imager PCB 30 also includes a flexible portion 34 that terminates at a small rigid PCB terminator 36. The flexible portion 34 can include any of a flexible connector (also known as a flex connector), a flexible PCB, a ribbon cable, wires, or the like. The flexible portion 34 includes conductors that electrically connect the components of the imager PCB 30 to the terminator 36. The terminator 36 has an electrical connector 38 that attaches to a mating electrical connector 40 on the underside 64 of the main PCB 16. The flexible connector or ribbon cable provides image signals/data (such as LVDS signals or the like) to the circuitry of the main PCB. Thus, the imager 26 and the main PCB 16 are operatively connected to allow image signals/data captured by the imager 26 to be received at the processor 20. The underside 64 is located opposite a top side 66 of the main PCB 16 on which the lens 28 is positioned. The electrical connector 38 can be removably attachable to the electrical connector 40.

Figure 5A:
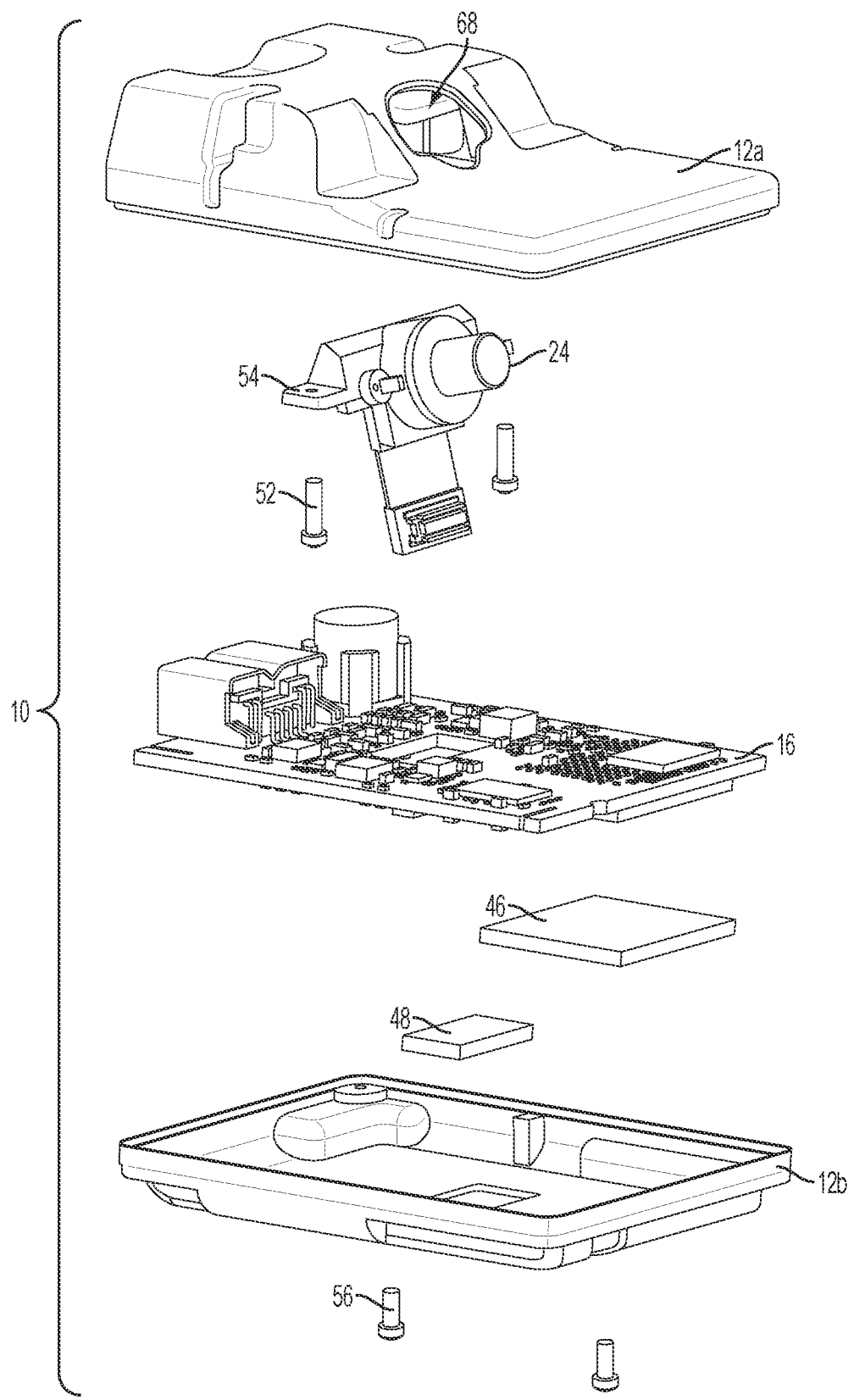
FIG. 5A is an exploded view of the vehicular camera system.
Figure 5B:
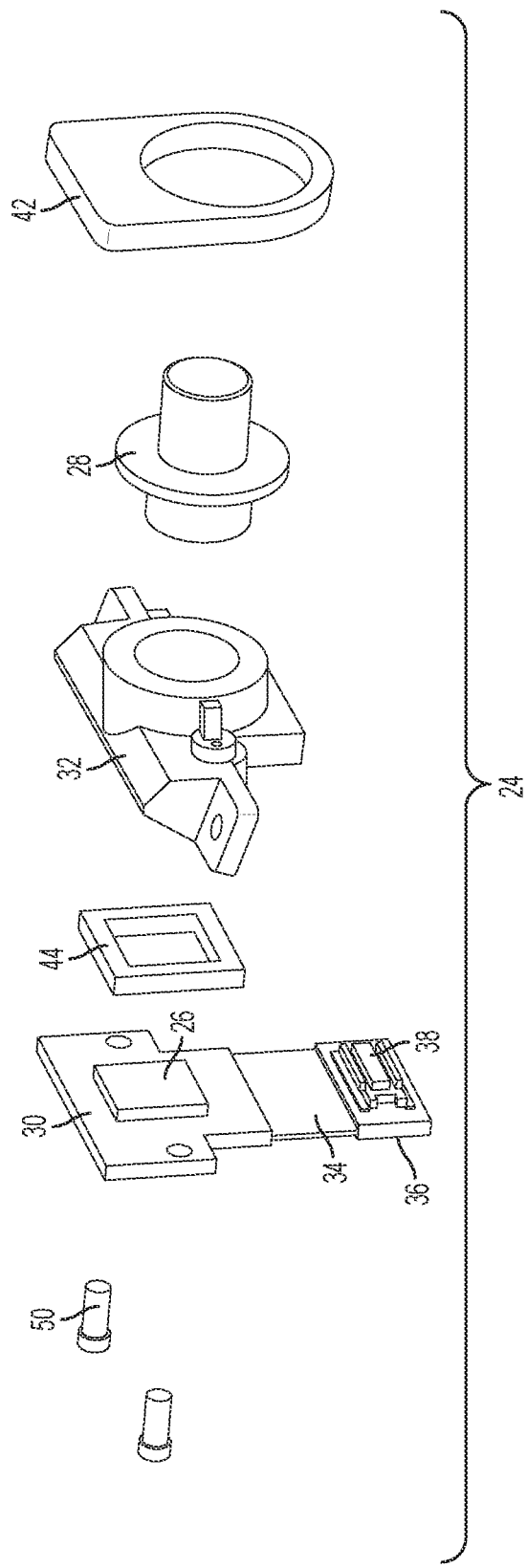
FIG. 5B is an exploded view of the imager assembly.

FIG. 5A shows an exploded view of the camera system 10, where it will be seen that the housing 12 can be subdivided into an upper cover 12a and a lower cover 12b. FIG. 5B shows an exploded view of the imager assembly 24. The housing upper cover 12a includes a lens opening 68 through which the lens 28 of the imager assembly 24 receives light.

Protective components can be installed within the housing 12 and can include a lens gasket 42, an imager resilient member 44, a heat sink 46, and a connector resilient member 48. The lens gasket 42 serves to reduce or eliminate infiltration of dust, particulate or moisture into the imager assembly 24 between the lens 28 and the lens holder 32. The heat sink 46 is positioned on the processor 20 to collect and dissipate heat generated by the processor 20. Each of the resilient members 44, 48 can include a foam cushion, or the like. The imager resilient member 44 is of rectangular shape with a central rectangular opening sized to accommodate the imager 26. The imager resilient member 44 surrounds the imager 26 and is sandwiched between the imager PCB 30 and the lens holder 32, and serves to reduce or eliminate infiltration of dust, particulate, or moisture past the imager PCB 30 and the lens holder 32 to protect the imager 26.

As shown in FIG. 4C, the connector resilient member 48 is sandwiched between the PCB terminator 36 that carries the electrical connector 38 and the lower cover 12b of the housing 12, and accordingly, the connector resilient member 48 transmits force from the lower cover 12b to the electrical connector 38 to ensure that the electrical connector 38 is firmly seated to the mating electrical connector 40 of the main PCB 16 in order to maintain a sound electrical connection between the imager PCB 30 and the main PCB 16. In this example, the thickness of the connector resilient member 48 is selected to be larger than the space between the lower cover 12b of the housing and the terminator 36, so that the resiliency of the connector resilient member 48 provides an effective seating force.

FIGS. 6A-B, 7A-B and 8A-B show a method of assembling the camera system 10.

Figure 6A:
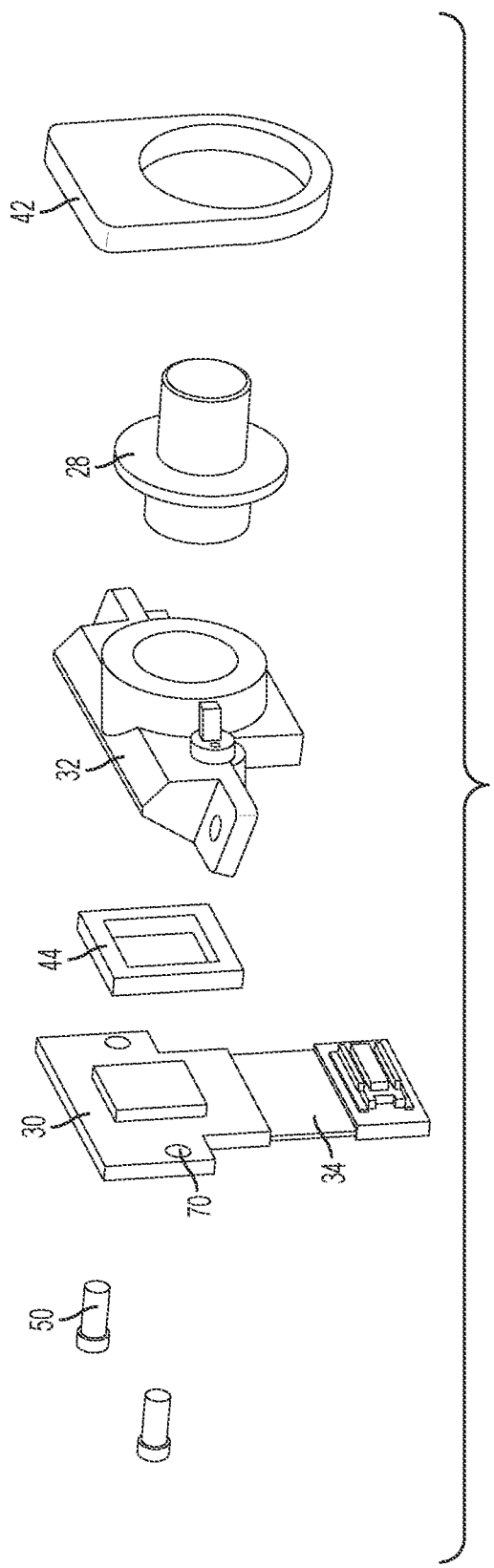
FIGS. 6A-B, 7A-B, 8A-B are perspective views that show a method of assembly of the vehicular camera system.
Figure 6B:
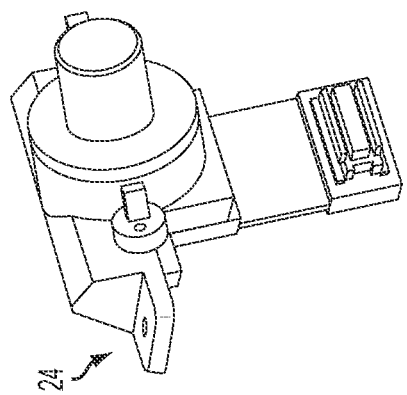

First, as shown in FIGS. 6A and 6B, the imager assembly 24 is assembled. The lens 28 is screwed into the lens holder 32, or alternatively another technique, such as adhesive bonding, is used to mount the lens 28 to the lens holder 32. The lens holder 32 is fixed to the imager PCB 30 using, for example, one or more fasteners 50 (e.g., screws) that extend through holes 70 in the imager PCB 30 and mate with threaded holes in the lens holder 32. The lens gasket 42 is slid over and around the lens 28.

Figure 7A:
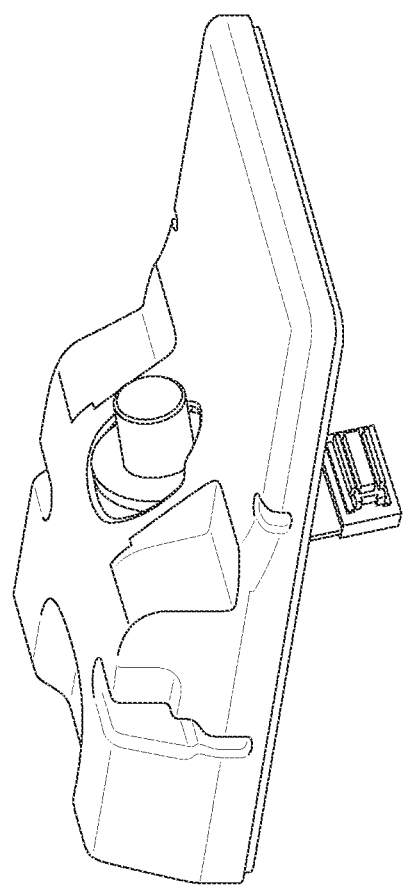
Figure 7B:
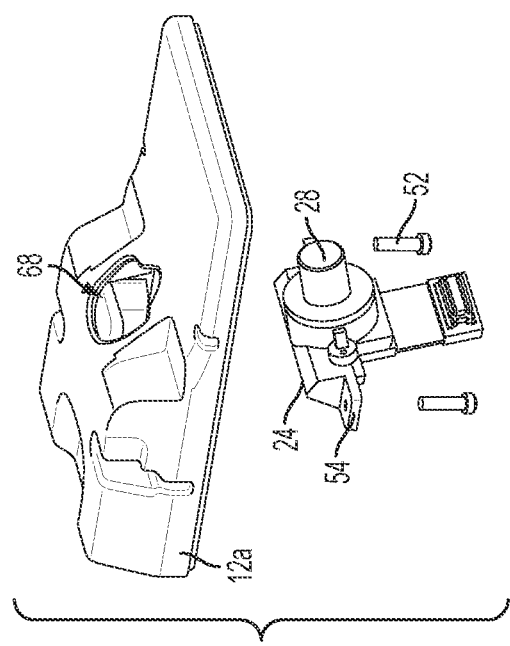

Next, as shown in FIGS. 7A and 7B, the imager assembly 24 is placed in the housing upper cover 12a such that the lens 28 is aligned with the lens opening 68. The imager assembly 24 is mounted to the inside of the housing upper cover 12a by, for example, one or more fasteners 52 (such as, for example, screws or the like), which can mate with corresponding features (such as, for example, threaded holes or the like) in the upper cover 12a. The lens holder 32 (see also FIG. 4B) includes wings 54 on either side having openings for receiving the fasteners 52.

Figure 8B:
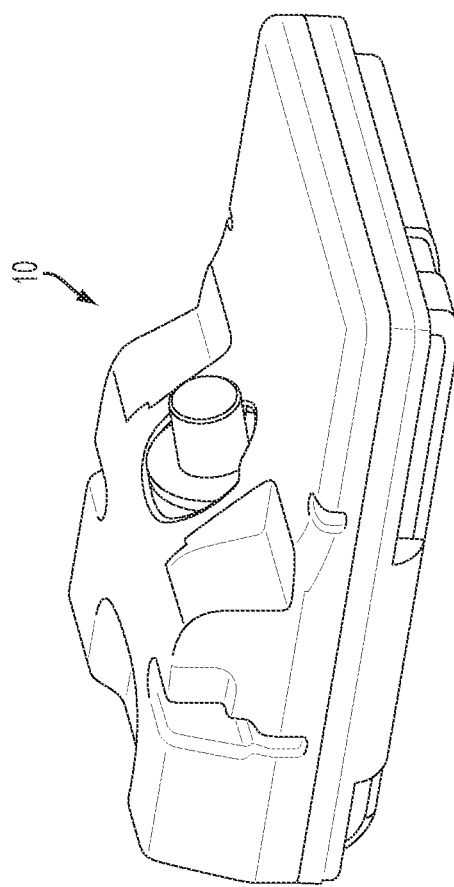
Figure 8A:
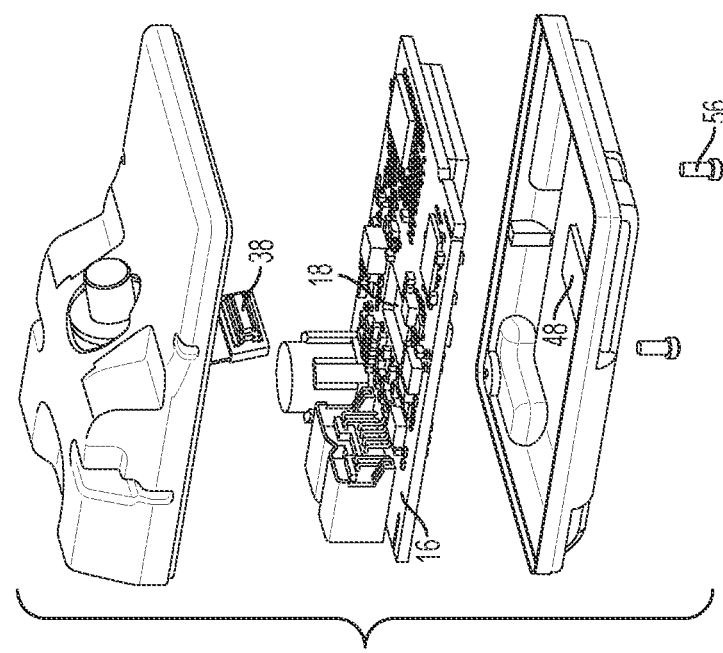

Next, the main PCB 16 is brought into alignment with the housing upper cover 12a and is fitted so that a portion of the imager assembly 24 extends through the opening 18 of the main PCB 16, as seen best in FIG. 4C. The connector resilient member 48 is positioned on the inside of the housing lower cover 12b, and can be held in place using an adhesive or other technique. The connector 38 is then extended through the opening 18 in the main PCB 16 (as can be seen in FIG. 8A), aligned with the mating connector 40 on the underside 64 of the main PCB 16 by virtue of the flexible portion 34, and mated with the connector 40. The electrical connection between the imager PCB 30 and the main PCB 16 is made. The housing lower cover 12b is then fastened to the housing upper cover 12a via, for example, one or more fasteners 56, which compresses the connector resilient member 48 to firmly seat the camera-side connector 38 on the mating main PCB-side connector 40.

In other examples, the method steps described above can be performed in an order different from that described.

Figure 9:
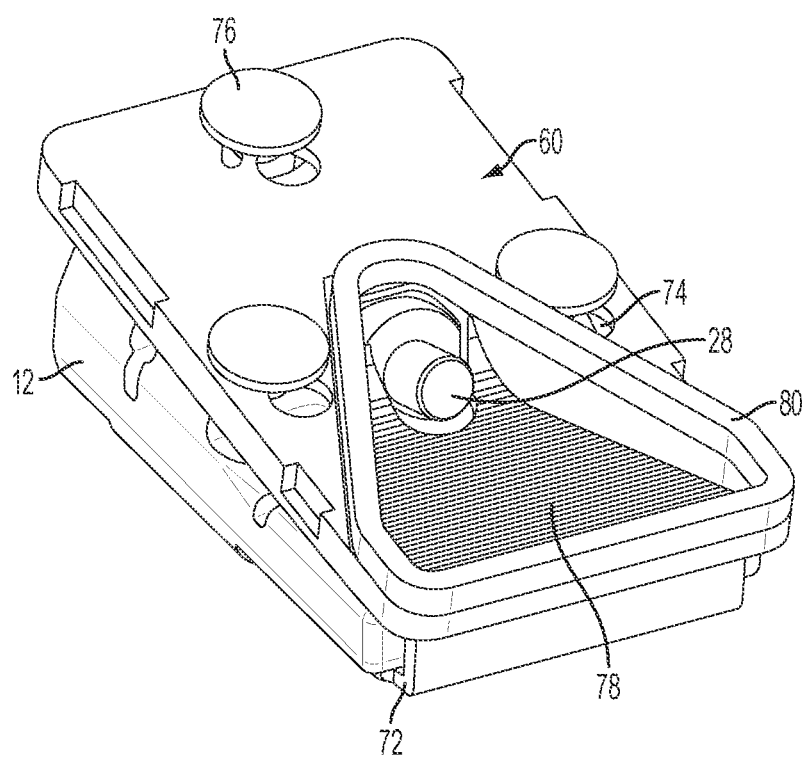
FIG. 9 is a perspective view of a vehicular camera system with a stray light shield.

FIG. 9 shows a frame or bracket 60 that can be attached to the camera housing 12 and that provides a stray light shield or light baffle or the like. The stray light shield can function to reduce capture by the camera lens 28 of stray light or glare that may, for example, be reflected off of the windshield. The frame or bracket 60 can be attached to the housing 12 by, for example, a mechanical clip-and-notch structure, referenced at 72, whereby the housing 12 of the accessory or camera module 10 may modularly locate and/or attach at the frame or bracket 60 with the frame or bracket attached at the windshield via fixing elements or attachment elements 76. For example, narrowing slots 74 can be provided in the frame or bracket 60 to removably mate with knobs or structure on the backs of the fixing elements 76. The pads of fixing elements 76 can be attached to the vehicle windshield by way of an adhesive (and such as by utilizing aspects of the modules described in U.S. patent application Ser. No. 11/721,406, filed Jun. 11, 2007 and published Dec. 3, 2009 as U.S. Publication No. US-2009-0295181, which is hereby incorporated herein by reference in its entirety). Alternatively, the pads can be suction pads.

The stray light shield of the frame or bracket 60 may comprise ridges 78 positioned (such as below and in front of the lens) to reduce the amount of light reflected into the lens 28 (such as by utilizing aspects of the vision systems described in U.S. provisional application Ser. No. 61/600, 205, filed Feb. 17, 2012, which is hereby incorporated herein by reference in its entirety). Further, a shield gasket 80 can be positioned on the frame or bracket 60 around the lens 28 to reduce incursion of dust, particulate, or moisture into the vicinity of the lens 28. The gasket may utilize aspects of the gaskets described in U.S. patent application Ser. No. 12/393, 223, filed Feb. 26, 2009, which is hereby incorporated herein by reference in its entirety. Thus, the frame or bracket 60 may be attached at the fixing elements 76 (which may be adhered at the in-cabin surface of the vehicle windshield), whereby the tapered or wedge-shaped recess or pocket (having the stray light shield portion and tapered sidewalls) is disposed in front of the camera and lens with the camera and lens viewing through the pocket and through the vehicle windshield.

Figure 10:
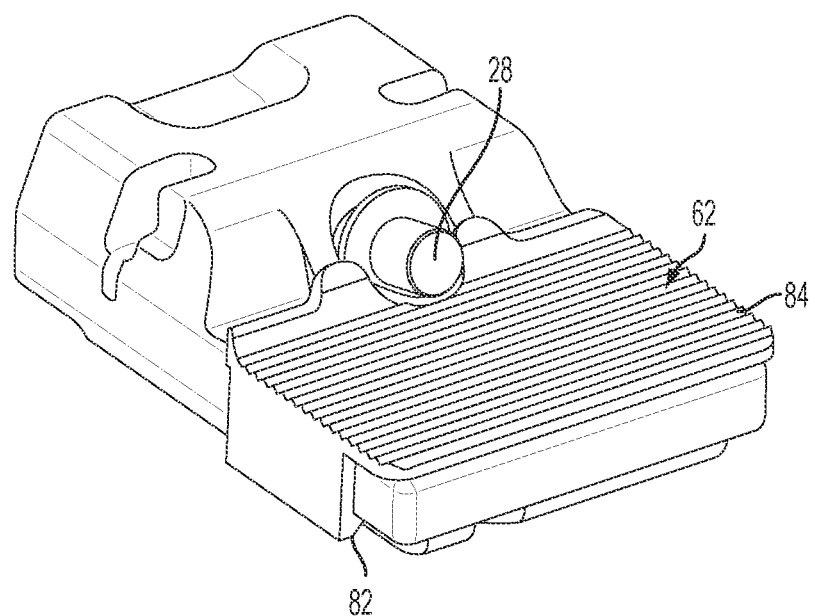
FIG. 10 is a perspective view of a vehicular camera system with another stray light shield.

FIG. 10 shows another stray light shield 62 that can be attached to or established at the camera housing 12. The stray light shield 62 can function to reduce capture by the camera lens 28 of stray light or glare that may, for example, be reflected off of the windshield. The stray light shield 62 can be attached to the housing 12 by, for example, a mechanical clip-and-notch structure, such as shown at 82, and the module (with the stray light shield at the housing) may be mechanically attached to a frame or bracket adhesively attached at the windshield via a plurality of spaced apart fixing elements or attaching elements or the like. The stray light shield 62 can include ridges 84 positioned to reduce the amount of light reflected into the lens 28. The stray light shield may comprise any suitable material, such as a shield that utilizes aspects of the light baffling system of the vision systems described in U.S. provisional application Ser. No. 61/600,205, filed Feb. 17, 2012, which is hereby incorporated herein by reference in its entirety. Thus, a stray or extraneous light shield may be selected or customized or adapted for a particular windshield/vehicle application of a camera module, and may be snapped onto (via a snap fit or snap attachment) or otherwise attached at the camera module to adapt or configure the camera module for the particular application. For example, a common camera module may be used with a SUV having a windshield angle of, for example, about 28 degrees, or the same common module may be used with a compact vehicle having a windshield angle of, for example, about 24 degrees, by customizing the stray light shield for the respective requirements of the SUV or the compact vehicle, depending on the particular or target application of the camera module and stray light shield.

The side walls of the stray light shield are preferably dimensioned and configured so as to form a pocket that (with the camera module mounted at the windshield-attached bracket) is sufficiently large or dimensioned so that the field of view of the camera does not encompass the base portion and/or side walls of the stray light shield. When the light shield and camera module are disposed at the windshield-attached bracket, the roof of the pocket (the upper boundary of the pocket of the stray light shield) is formed by the windshield and optionally a portion of the bracket and windshield. For example, the stray light shield, when disposed at the bracket, is aligned with an aperture of the bracket, and a perimeter portion of the bracket that circumscribes the bracket aperture may overlap the side walls and may extend over the stray light shield such that a small portion of the "roof" of the stray light shield comprises the circumscribing portion of the bracket (and optionally the circumscribing portion of the bracket may have light traps or ribs or columns thereat). The field of view of the camera, when the camera module and stray light shield are disposed at the windshield-attached bracket, preferably views through the aperture of the bracket (and may also view through an aperture or light transmitting opening of a light absorbing/ opaque layer or frit layer at the windshield) and preferably does not encompass the circumscribing portion of the bracket (or any portion of the opaque layer at the windshield that circumscribes the aperture at the opaque layer).

Figure 11:
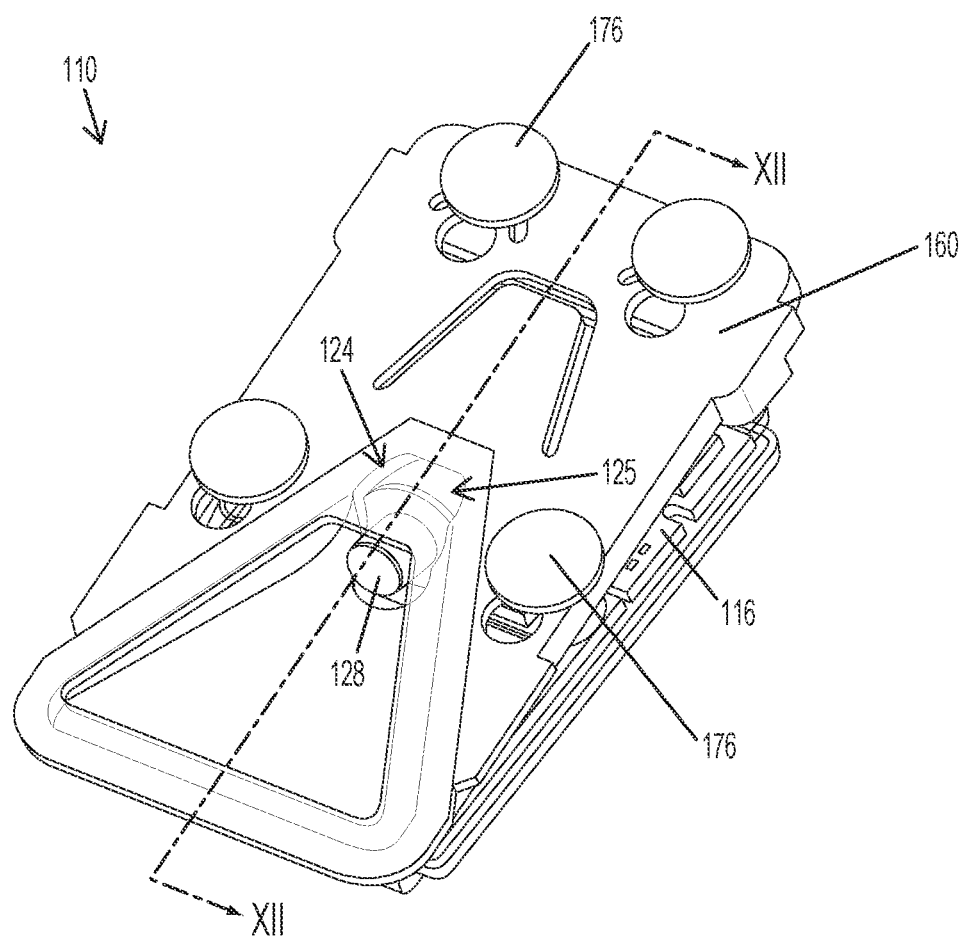
FIG. 11 is a perspective view of another vehicular camera system of the present invention.
Figure 12A:
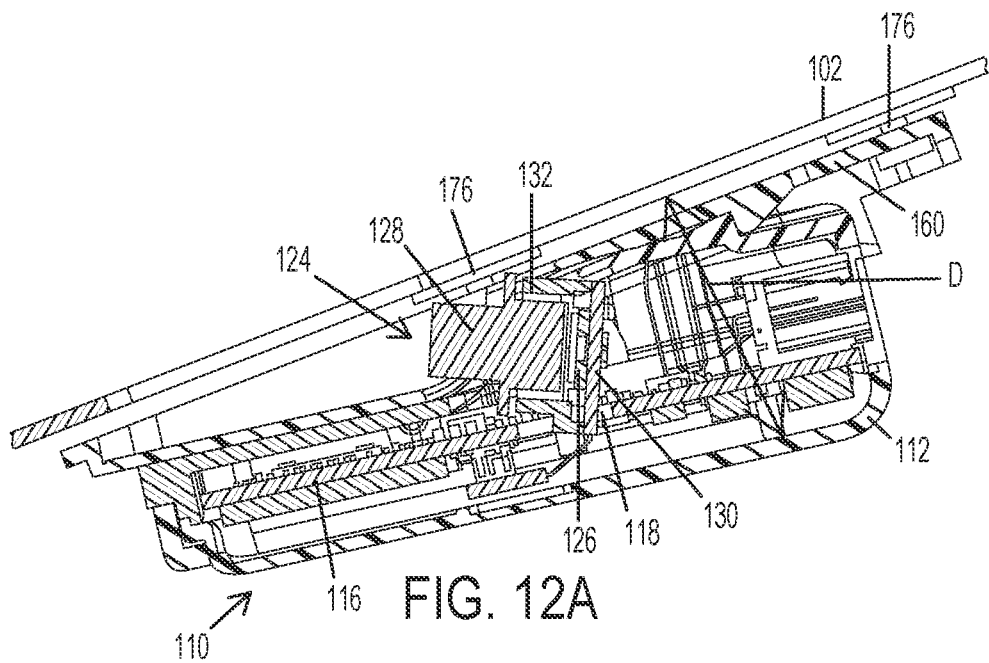
FIGS. 12A and 12B are sectional views taken along the line XII-XII in FIG. 11, showing the camera system mounted at windshields having different windshield angles.
Figure 12B:
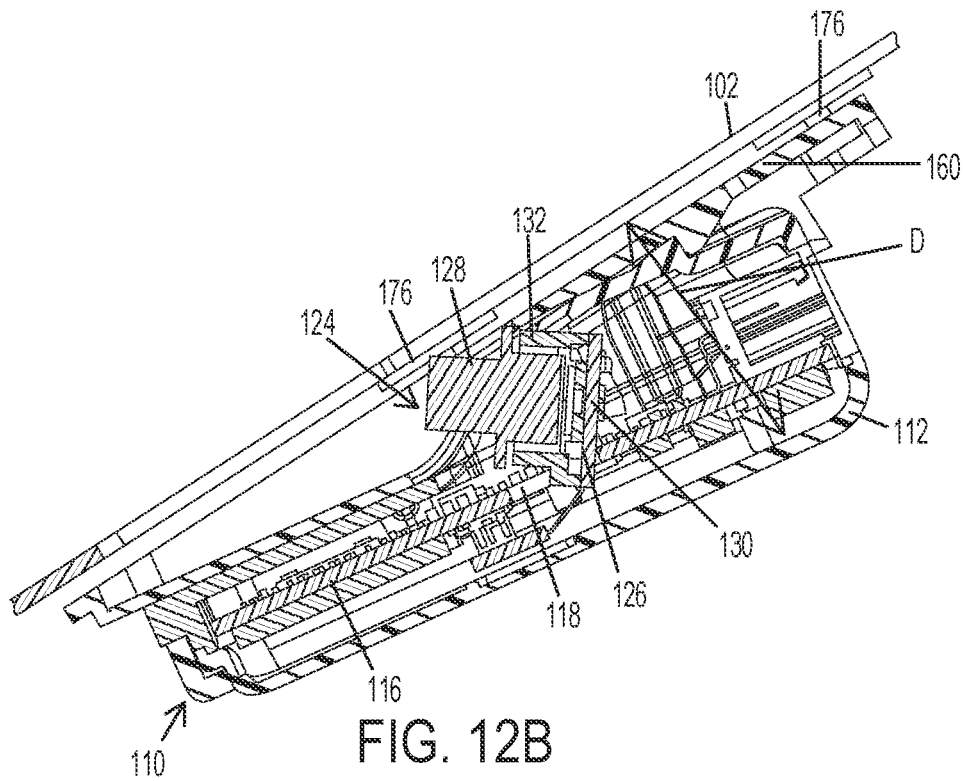
Figure 13:
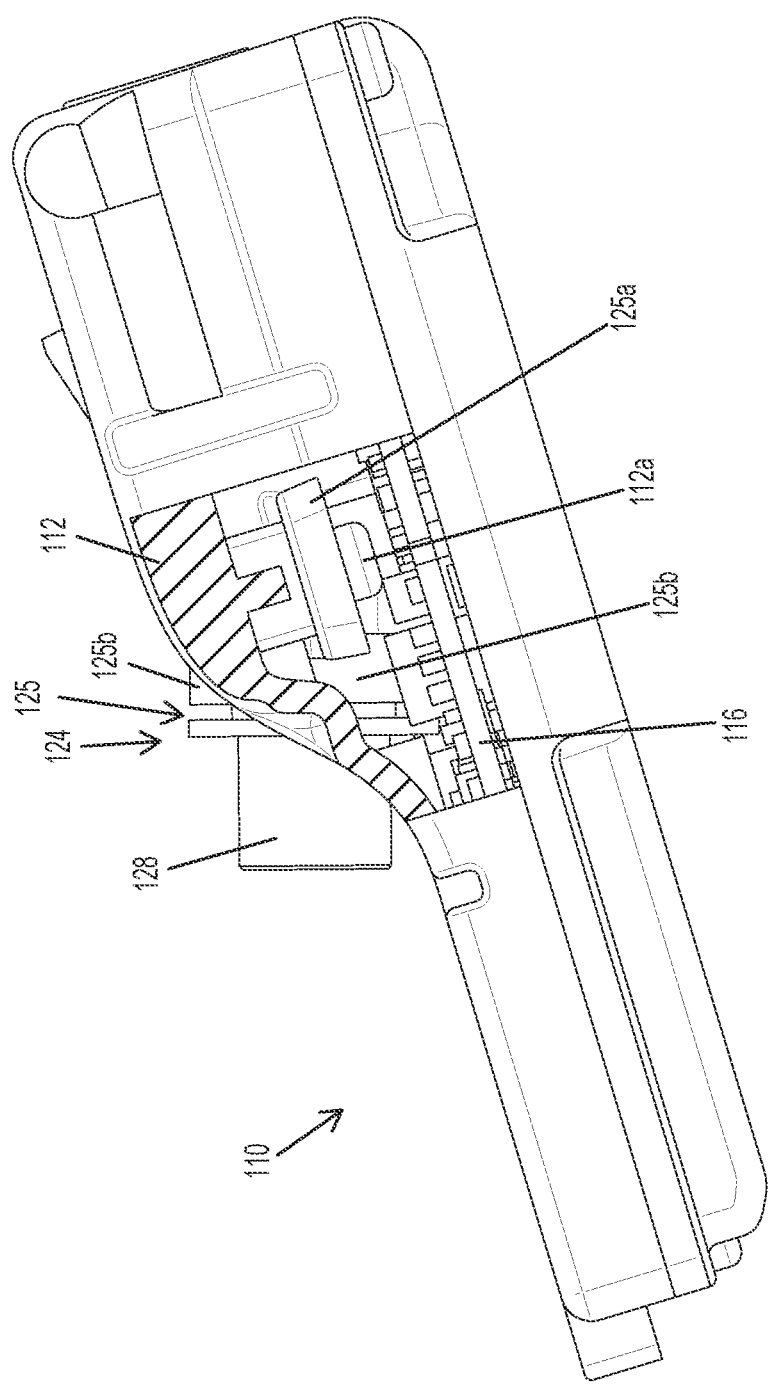
FIG. 13 is a side elevation and partial sectional view of the vehicular camera system of FIG. 11.

Optionally, and with reference to FIGS. 11-13, a camera module 110 may be adjustable to adapt or configure the module for different windshield applications (having different angles relative to horizontal) of different vehicles, while still providing the desired, generally horizontal, forward field of view of the camera or imager assembly 124. The camera module 110 is configured to mechanically attach to a frame or bracket 160, which includes a plurality of fixing elements or attaching elements 176, which are configured for adhesive attachment to the in-cabin surface of the vehicle windshield. The camera module 110 may attach to the frame or bracket (with the frame or bracket attached at the windshield surface) via any suitable means, such as via a sliding engagement or snap attachment or the like.

As can be seen with reference to FIGS. 12A and 12B, the imager assembly 124 (including the imager 126, lens 128, imager circuit element or board 130 and lens holder 132) extends through the opening 118 of the main circuit element or board 116 and may be adjusted or pivoted relative to the camera module housing 112 and main circuit board 116 to adjust the angle of the imager assembly (and the imager 126 and lens 128) relative to horizontal so as to provide the desired field of view and viewing angle or lens tip angle of the imager assembly for different windshield/vehicle applications. For example, and as shown in FIG. 12A, for a windshield with a reduced slope, the imager assembly 124 is pivoted or adjusted or set to provide the desired or appropriate lens tip angle when the camera module 110 is attached at the frame or bracket 160 at the windshield 102. For a windshield with a greater slope, and such as shown in FIG. 12B, the imager assembly 124 is pivoted or adjusted or set at a different angle relative to the main circuit board 116 to provide the desired or appropriate lens tip angle when the camera module 110 is attached at the frame or bracket 160 at the windshield. In both configurations shown in FIGS. 12A and 12B, the distance D from the inner surface of the windshield 102 to the lower surface of the housing 112 (when the camera module 110 is attached at the frame or bracket 160 at the windshield) is about the same because the camera modules mount or attach at the windshield in the same manner, with only the imager assembly being adjusted or pivoted within the module to adjust the viewing angle or lens tip angle of the imager assembly.

The imager assembly 124 is mounted at the housing 112 (or to the main circuit board 116 or the like) via one or more threaded fasteners. For example, and as shown in FIG. 13, the imager assembly 124 may include a holder or mounting structure 125 (such as a plastic holder or the like) that is attached at the housing 112 and supports the imager 126 and lens assembly 128 and imager circuit board 130). The holder 125 includes a mounting or stationary or fixed portion 125a that may be attached or fastened to a threaded fastener 112a of the housing, whereby a rotatable portion or adjustable portion 125b of holder 125 of imager assembly 124 may be rotatable or pivotable or adjustable relative to the mounting portion 125a to provide for adjustment of the tip angle of the lens 128 and viewing angle of the imager 126 relative to the housing 112 and main circuit board 116. The adjustable portion 125b of the holder 125 of imager assembly 124 thus may be adjusted relative to the mounting portion 125a to provide the desired tip angle or viewing angle and may be secured at the selected or adjusted or appropriate orientation, such as via tightening of a fastener or the like. Optionally, the adjustable portion 125b may have a ratcheting engagement with the mounting portion 125a or may have multiple detent settings, such that an operator adjusts or sets or clicks the adjustable portion 125b to the desired or appropriate angle relative to the mounting portion 125a to set the desired or appropriate viewing angle of the imager and lens for the particular windshield angle of the windshield of the particular vehicle application of the camera module 110. Optionally, instead of having an adjustable holder portion, the holder may be removable and replaceable so that an appropriately angled holder may be selected for the particular windshield application, with the camera and lens and circuit board and the like being common components for various applications.

Thus, the camera module of the present invention provides for a low profile module that may be selected or adjusted to provide a desired viewing angle for the particular application of the camera module. The module thus keeps the lens angle or viewing angle of the imager in the same orientation or position for different windshield angle applications. The module may be adapted or configured for different applications by adjusting the camera holder or installing an appropriate or selected low cost plastic holder or replacing the plastic holder with an appropriate or selected holder, while keeping the camera and lens and PCB and housing the same or common components of the module for the various windshield applications (so that the manufacturer does not have to replace the PCB for different windshield angles), and while keeping the profile of the module the same for various windshield applications. The holder may be threadedly fastened or screwed to the cover or housing, such as at either side of the holder (with one fastener at one side of the holder shown in FIG. 13).

Because of the number of components established at the main circuit board, it is desirable to have the main circuit board comprise a double sided PCB with circuitry and components established at both sides of the circuit board. The flexible connector or cable provides LVDS signals conveying image data captured by the imager to the image processor of the main circuit board. Alternately, image data captured by the imager may be conveyed to the image processor via the likes of Ethernet or by the protocols described in U.S. Pat. No. 7,697,027, which is hereby incorporated herein by reference in its entirety. The aperture or opening or hole in the main circuit board provides for passage of the flexible connector through the circuit board so as to establish electrical connection to the opposite side of the main circuit board, and the aperture or opening or hole in the main circuit board also at least partially receives a portion of imager assembly (such as a portion of the imager circuit board and/or imager and/or lens holder and/or lens) to provide a lower profile camera system or module.

Optionally, the camera module may include ventilation means for ventilating the module at the windshield (such as by utilizing aspects of the modules described in U.S. patent application Ser. No. 11/721,406, filed Jun. 11, 2007 and published Dec. 3, 2009 as U.S. Publication No. US-2009-0295181; and/or U.S. patent application Ser. No. 12/393,223, filed Feb. 26, 2009, which are hereby incorporated herein by reference in their entireties). For example, the ventilation means may comprise one or more vents or ports or ventilation openings (such as a vent or port or opening established through the housing and/or gasket and/or frame or the like), a gas permeable and fluid impermeable material, a baffle that passes air and that blocks moisture, and/or a breathable membrane and/or the like. Such ventilation means may be provided to reduce moisture or fogging of the windshield at the viewing area of the camera or imager. Optionally, a localized heater element or grid may be established at the windshield (such as a conductive trace, such as a transparent conductive trace or the like, established at the in-cabin surface of the windshield local to the camera module) to provide heating of the windshield at the area through which the camera views, in order to reduce moisture or fogging of the windshield at the viewing area of the camera or imager.

Terms such as top side, underside, and height are used herein in a relative sense and are not intended to be limiting with respect to vertical or horizontal orientation. For example, in a hypothetical example, a camera system may be installed such that a top side is positioned below an underside.

According to an aspect of the present invention, a vehicular camera system includes an imager assembly including an imager disposed on an imager circuit board and a lens positioned to direct light to the imager. The vehicular camera system further includes a main circuit board operatively connected to the imager circuit board. The main circuit board includes at least one processor for processing images captured by the imager. The main circuit board includes an opening, and at least a portion of the imager assembly extends through the opening.

The imager circuit board can extend through the opening of the main circuit board. Optionally, for example, and such as best seen in FIG. 6A, the imager circuit board may have a narrowed portion that is sized to fit at least partially through the aperture or opening of the main circuit board, with the wider portion of the imager circuit board disposed above the main circuit board when the imager assembly is disposed at the main circuit board. Thus, a portion of the imager circuit board extends through the opening of the main circuit board, and optionally, a portion of the imager and/or of the lens holder and/or the lens may extend at least partially through the opening of the main circuit board when the imager assembly is disposed at the main circuit board.

The vehicular camera system can further include a housing having a breadth and a height. The main circuit board can extend generally along the breadth of the housing and the imager circuit board can extend generally along the height of the housing.

The imager circuit board can include a flexible portion that terminates at an electrical connector. The electrical connector can be connected to an underside of the main circuit board, the underside being opposite a top side of the main circuit board at which the lens is positioned.

The vehicular camera system can further include a connector resilient member sandwiched between the electrical connector and the housing to seat the electrical connector to a mating electrical connector positioned on the underside of the main circuit board.

The housing can be configured to be mounted to the front of a vehicle.

The vehicular camera system can further include a lens holder connecting the lens and the imager circuit board.

The lens holder can extend through the opening of the main circuit board.

The opening can be surrounded by material of the main circuit board.

The opening can have a rectangular shape.

The opening can have rounded inside corners.

The imager circuit board can be tilted at an angle with respect to the main circuit board.

The vehicular camera system can further include a stray light shield positioned to reduce stray light reflected to the lens.

According to another aspect of this disclosure, a method of assembling a vehicular camera system includes positioning an imager assembly at a top side of a main circuit board. The imager assembly can have a lens and an imager for capturing images and the main circuit board can have a processor for processing the captured images. The method further includes extending a portion of the imager assembly through an opening in the main circuit board, and operatively connecting the portion of the imager assembly with an underside of the main circuit board opposite the top side.

Extending a portion of the imager assembly through an opening can include extending a flexible portion through the opening.

Operatively connecting can include connecting an electrical connector of the imager assembly with a mating electrical connector of the main circuit board.

The method can further include positioning a connector resilient member between an inside of a housing and the electrical connector.

The method can further include fastening a lower cover of the housing to an upper cover of the housing to compress the connector resilient member to firmly seat the electrical connector to the mating electrical connector.

The method can further include fastening the imager assembly to the upper cover of the housing.

The method can further include attaching a stray light shield to the housing.

The driver assist system and/or vision system and/or object detection system and/or alert system may operate to capture images exterior of the vehicle and process the captured image data to detect objects at or near the vehicle and in the predicted path of the vehicle, such as to assist a driver of the vehicle in maneuvering the vehicle in a rearward direction. The object detection may utilize detection and analysis of moving vectors representative of objects detected in the field of view of the vehicle camera, in order to determine which detected objects are objects of interest to the driver of the vehicle, such as when the driver of the vehicle undertakes a reversing maneuver.

Figure 14:
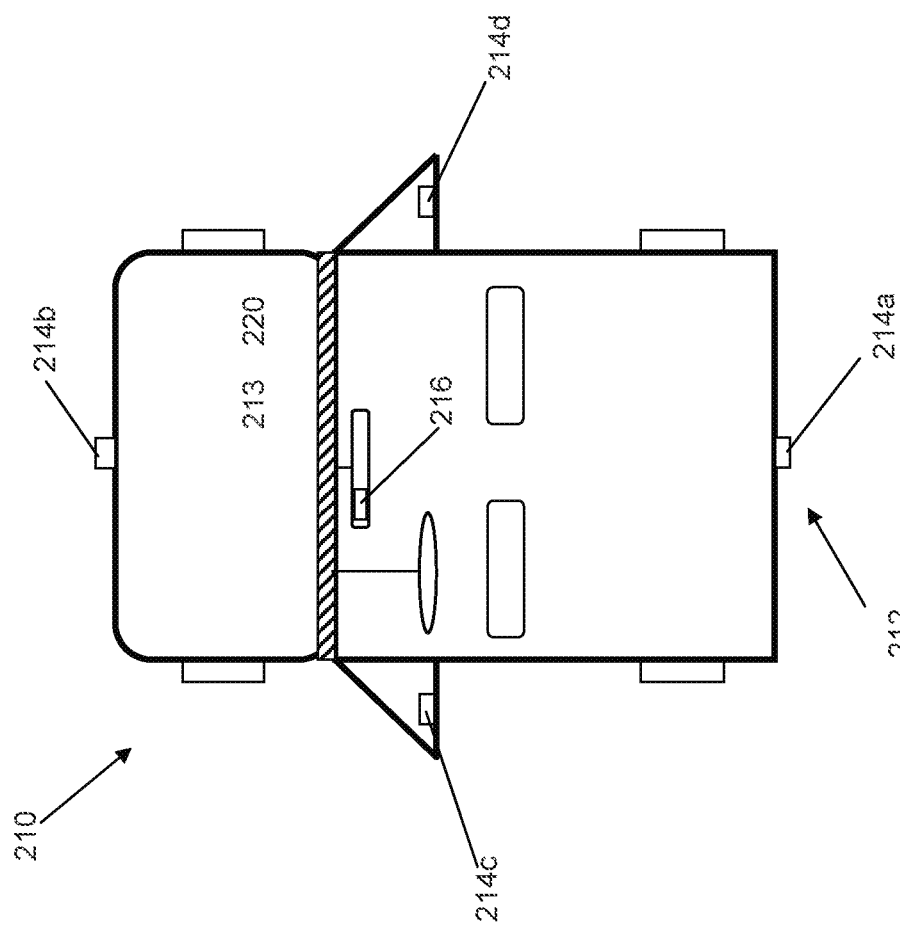
FIG. 14 is a plan view of a vehicle with a vision system and imaging sensors or cameras that provide exterior fields of view in accordance with the present invention.

Referring now to FIG. 14, a vehicle 10 includes an imaging system or vision system 12 that includes a forward facing camera or imaging sensor 13 disposed behind the windshield 20 of the vehicle and having a forward field of view through the windshield of the vehicle. The vision system 12 may also include one or more other imaging sensors or cameras (such as a rearward facing imaging sensor or camera 14*a* and/or a forwardly facing camera 14*b* at the front of the vehicle, and/or a sidewardly/rearwardly facing camera 14*c*, 14*b* at the sides of the vehicle), which capture images exterior of the vehicle, with the cameras having a lens for focusing images at or onto an imaging array or imaging plane of the camera (FIG. 14). The vision system 12 is operable to process image data captured by the cameras and may provide displayed images at a display device 16 for viewing by the driver of the vehicle. Optionally, the vision system may process image data to detect objects, such as objects forward of the vehicle during forward driving or such as objects to the rear of the subject or equipped vehicle during a reversing maneuver, or such as approaching or following vehicles or vehicles at a side lane adjacent to the subject or equipped vehicle or the like.

Forward facing driver assistant image sensors or cameras that are installed behind the vehicle's front windshield are known. It is also known to encase such sensors in a manner so that light from the outside of the vehicle can enter or be captured by the image sensor, but also so that reduced or no light from within the vehicle is captured by the image sensor. Some image sensor cases may have grooves or polymorph surfaces to reduce scattered light from within the vehicle.

On optical thresholds of transparent surfaces (such as glass to air, such as the vehicle windshield to air within the cabin of the vehicle), the light passing from its source to the light sensor or camera becomes reflected, sometimes scattered. Also, the geometrics of the windshield and the sensor housing may cause scattered light. Further, the windshield's tilt angle may have an influence to the light reflection ratio.

Images captured by image sensors or cameras (such as forward facing image sensors) become distorted by scattered or reflected light, which does not originate from direct rays of light sources or objects in front of the vehicle that are in the field of view of the image sensor and/or within the scope of the driver assistant system's surveillance (machine vision or provided to a human machine interface or HMI or the like). The sensor case may have grooves or polymorph surfaces for catching or reducing scattered light, but these typically do not possess optimized surfaces for advanced scatter capturing. The light trap or baffles, formed of light absorbing materials/surfaces, may trap the extraneous light and limit or preclude or reduce the extraneous light from reflecting towards the camera. The light baffle or light trap may comprise dark or light absorbing baffles or ribs or columns or pits or depressions or the like (such as baffles or ribs formed of a dark or black plastic material or the like) to limit or reduce the amount of light that reflects off of the baffles.

For enhancing or optimizing the capability to capture scattered light, the present invention utilizes specifically designed baffles. These baffles are disposed or placed along an inner surface of a vision system image sensor casing. In the illustrated embodiment, the image sensor and casing are disposed behind the front windshield of a vehicle, and the casing has an opening to the front capturing light that passes through the windshield. The baffles may comprise a plurality of spaced apart elongated ribs or vanes with angled or generally vertical surfaces. The individual ribs or vanes may comprise elongated linear or curved ribs or vanes (and optionally may be slightly curved to generally correspond with the curvature of the windshield at the area where the camera module or windshield electronics module is disposed), with the angled surfaces of the individual ribs or vanes or elements and the spacing distance between the individual ribs or vanes or elements being selected to provide the desired baffling and/or reflecting of light for the particular application of the imaging sensor or camera. The camera or module may utilize aspects of the cameras described in PCT Application No. PCT/US2012/048993, filed Jul. 31, 2012 and published Feb. 7, 2013 as International Publication No. WO 2013/019795, which is hereby incorporated herein by reference in its entirety.

Figure 15:
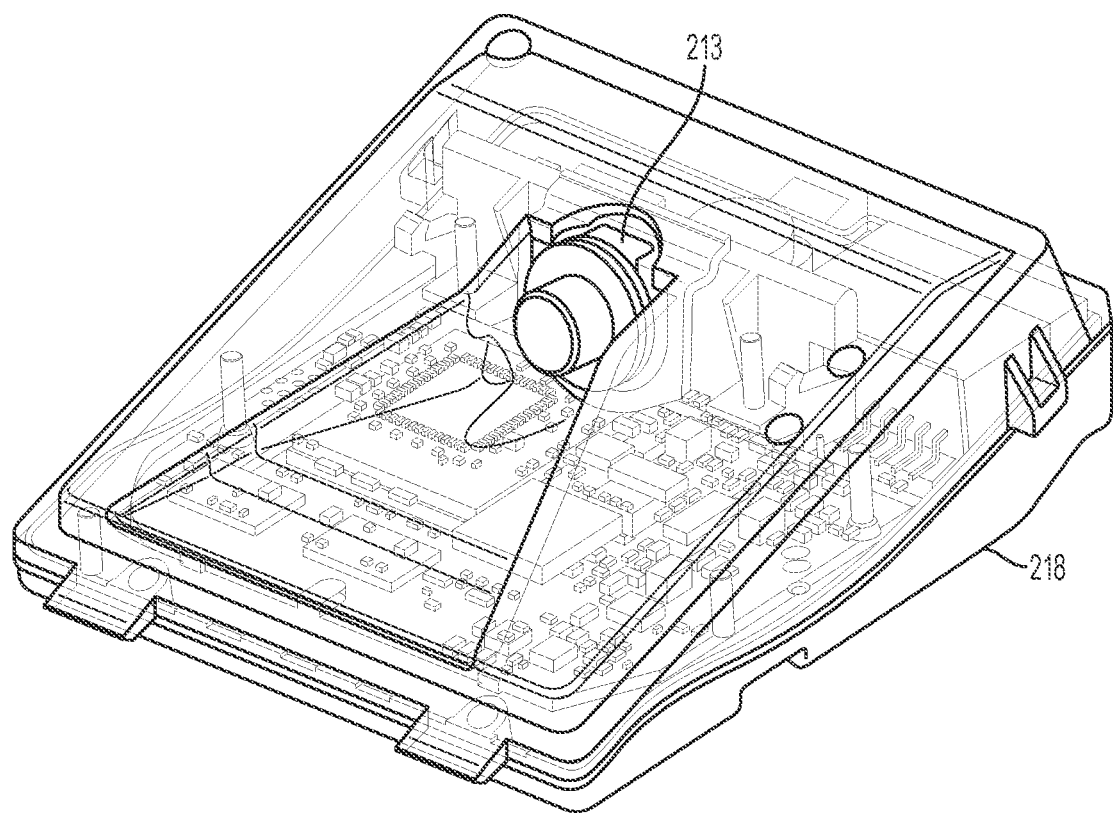
FIG. 15 is a perspective view of a windshield electronics module that is configured for housing a camera or imaging sensor at an interior surface of a vehicle windshield.
Figure 17:
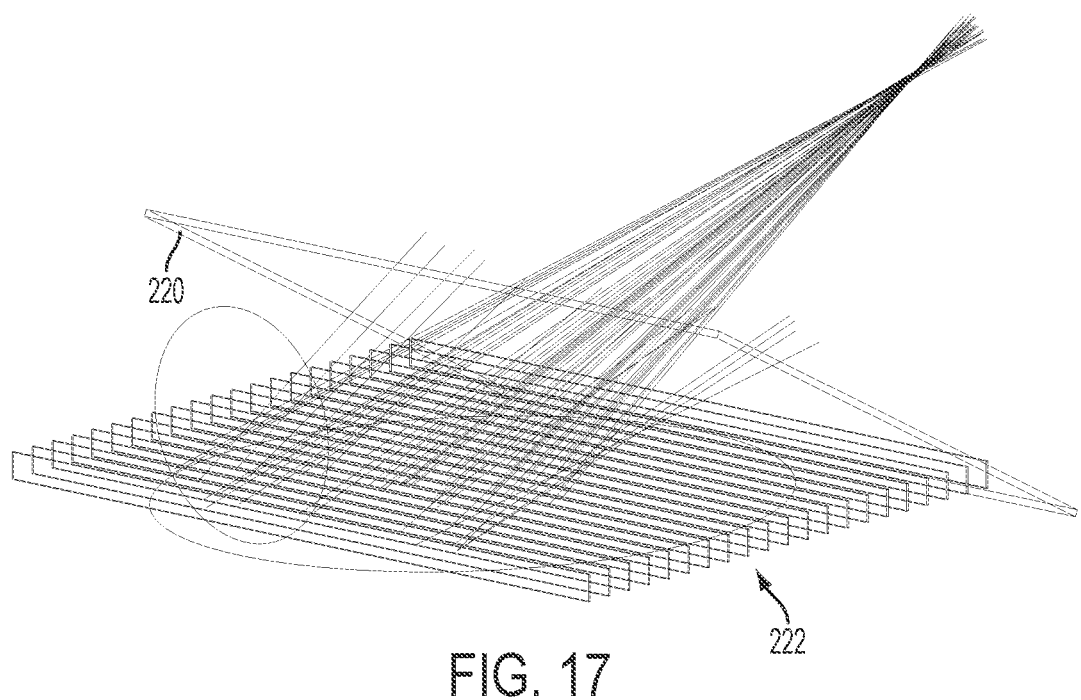
FIG. 17 is a perspective schematic of the baffle configuration and light reflection of FIG. 15.
Figure 18:
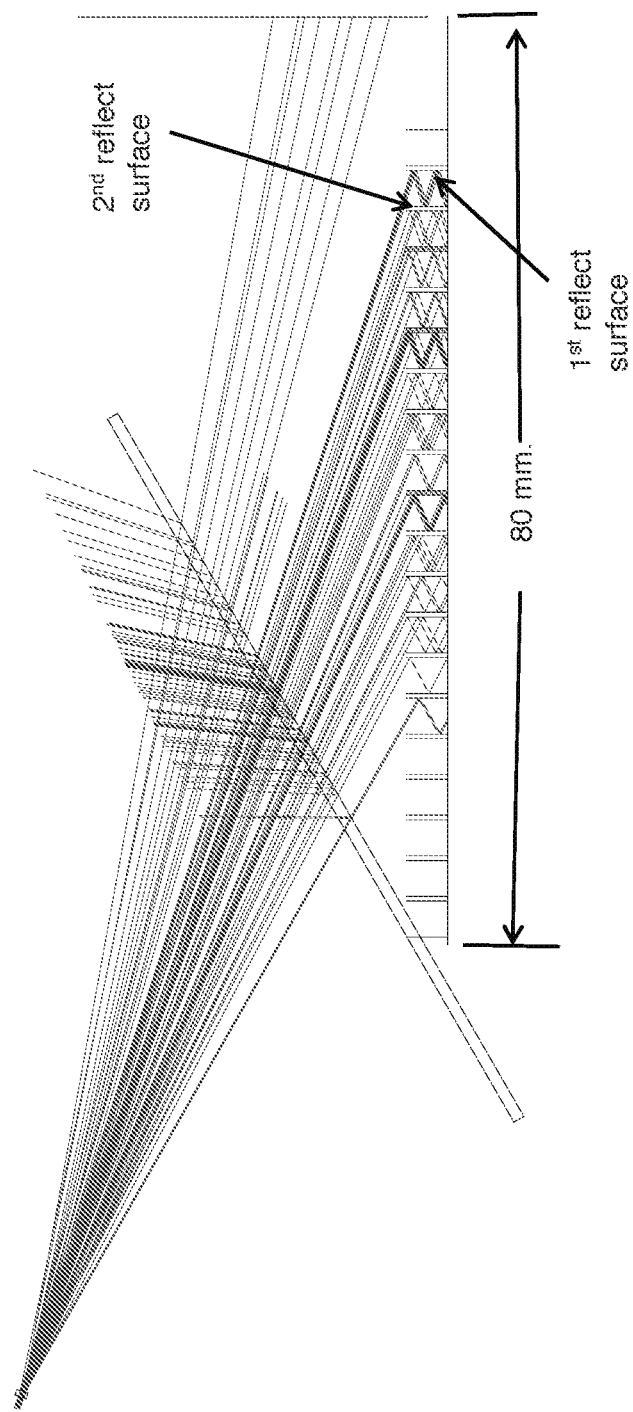
FIG. 18 is another schematic of a baffle configuration of the present invention, showing baffles with a first baffle surface of about zero degrees and a second baffle surface of about zero degrees, and as disposed at a windshield having an angle of about 60 degrees.
Figure 19:
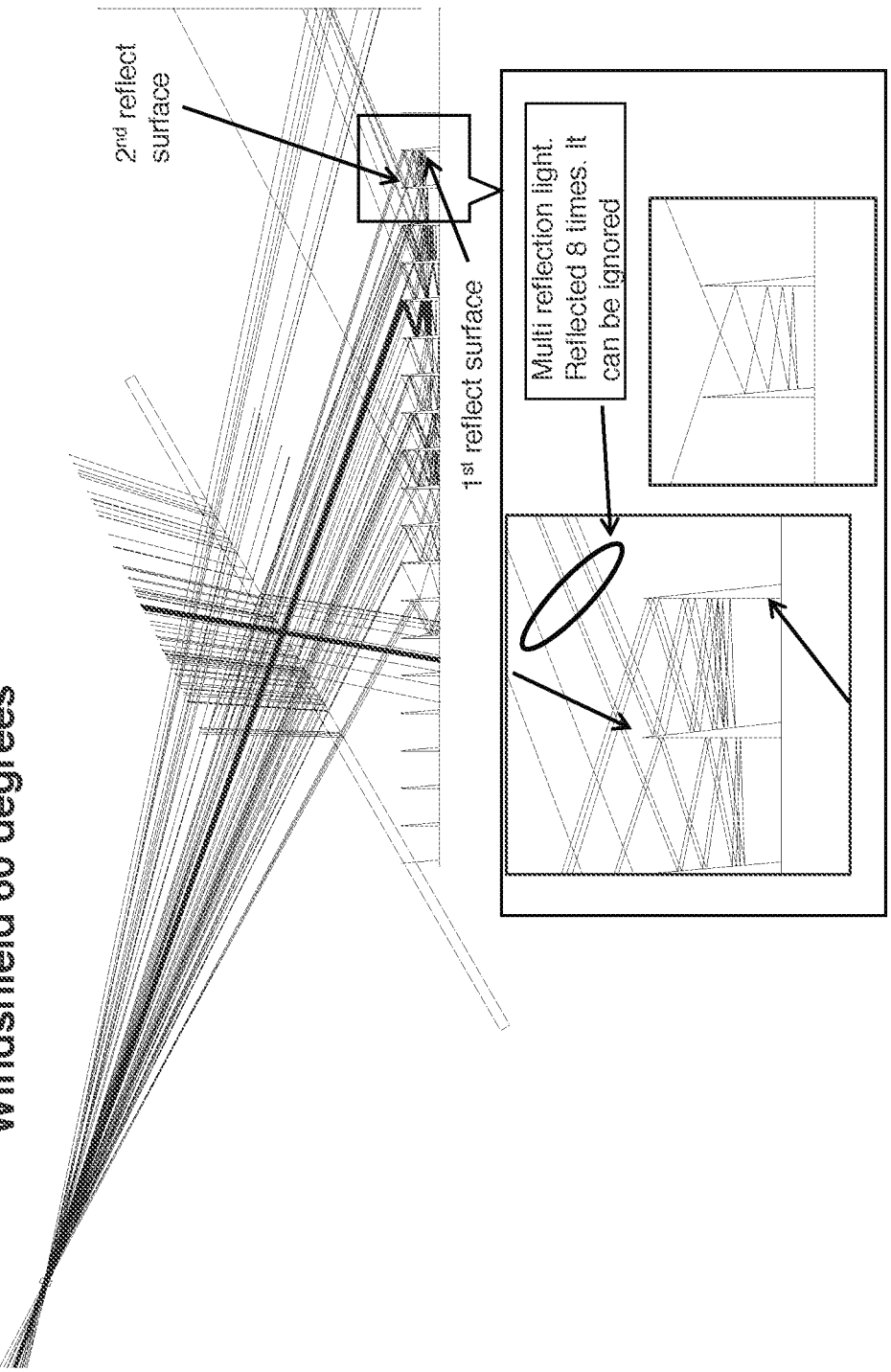
FIG. 19 is another schematic of a baffle configuration of the present invention, showing baffles with a first baffle surface of about zero degrees and a second baffle surface of about five degrees, and as disposed at a windshield having an angle of about 60 degrees.
Figure 20:
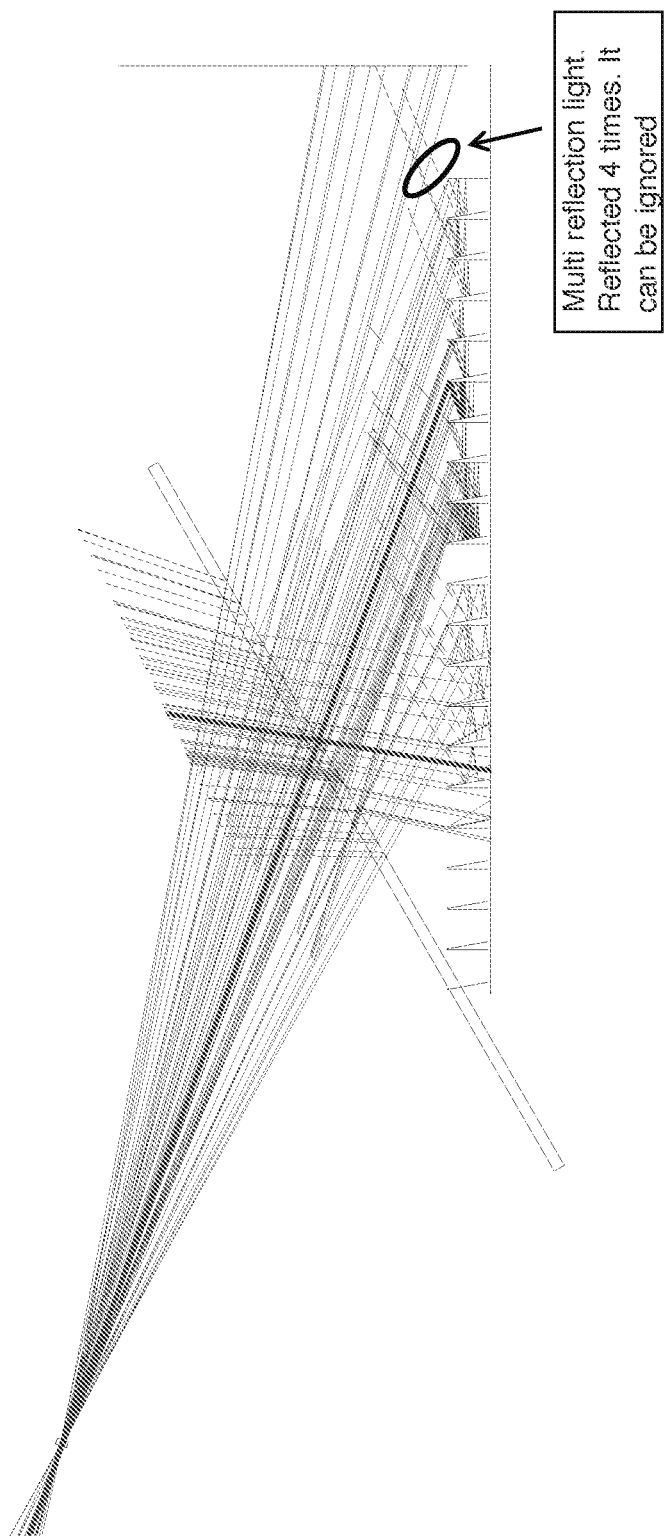
FIG. 20 is another schematic of a baffle configuration of the present invention, showing baffles with a first baffle surface of about zero degrees and a second baffle surface of about ten degrees, and as disposed at a windshield having an angle of about 60 degrees.
Figure 21:
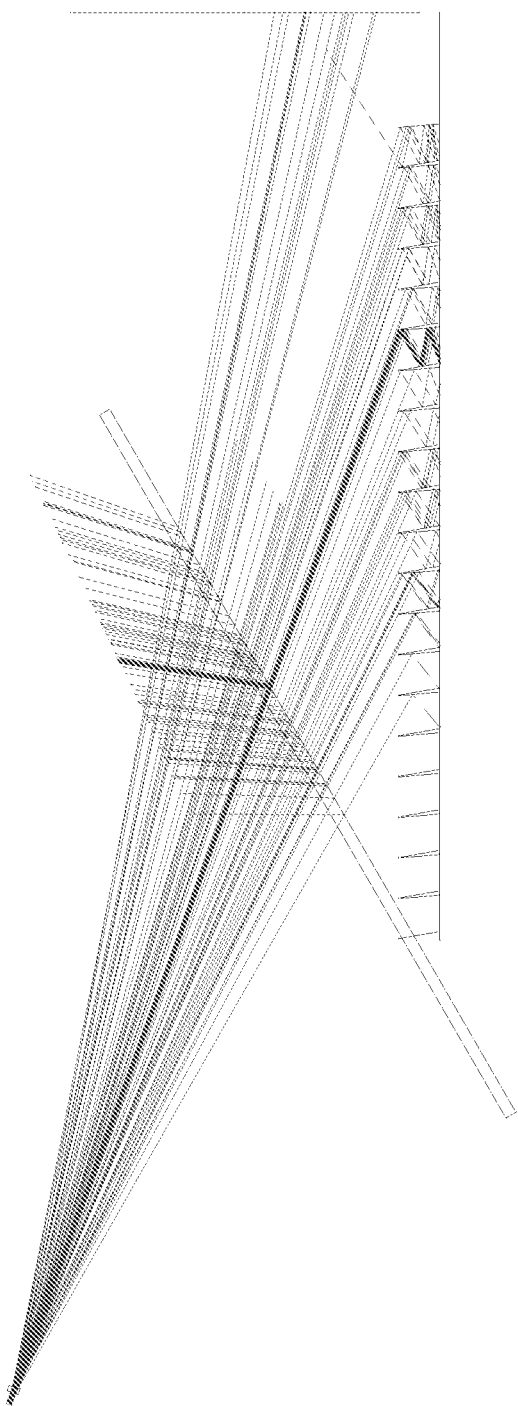
FIG. 21 is another schematic of a baffle configuration of the present invention, showing baffles with a first baffle surface of about five degrees and a second baffle surface of about ten degrees, and as disposed at a windshield having an angle of about 60 degrees.
Figure 22:
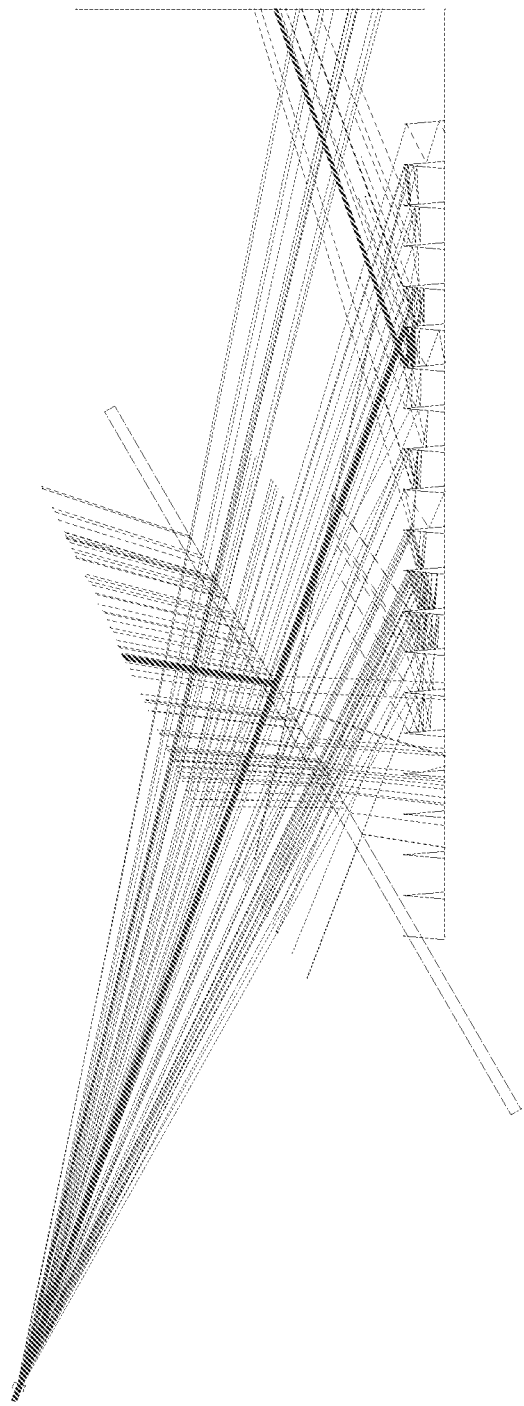
FIG. 22 is another schematic of a baffle configuration of the present invention, showing baffles with a first baffle surface of about five degrees and a second baffle surface of about five degrees, and as disposed at a windshield having an angle of about 60 degrees.

As shown in FIG. 15, the forward facing camera 13 may be disposed at or housed at a casing or module 18 (such as at a windshield electronics module or the like) that is configured to attach at an interior or in-cabin surface of a vehicle windshield 20. Optionally, the module 18 and camera 13 may utilize aspects of the imaging systems and/or modules described in U.S. Pat. Nos. 7,946,505; 7,188,963; 7,004,593; 6,824,281; 6,968,736; 6,690,268; 6,250,148; 6,341,523; 6,593,565; 6,428,172; 6,501,387; 6,329,925 and 6,326,613, and/or in U.S. patent application Ser. No. 10/538,724, filed Jun. 13, 2005 and published Mar. 9, 2006 as U.S. Publication No. US-2006-0050018, and/or U.S. patent applications, Ser. No. 11/721,406, filed Jun. 11, 2007, now U.S. Pat. No. 8,256,821; and/or Ser. No. 13/258,850, filed Sep. 22, 2011, now U.S. Pat. No. 8,451,332, which are hereby incorporated herein by reference in their entireties. Optionally, the forward facing camera may be disposed at a module that is spaced from the windshield, such as at or near or part of the interior rearview mirror assembly, or the forward facing camera may be disposed at or in the interior rearview mirror assembly that is attached at an in-cabin portion of the vehicle, while remaining within the spirit and scope of the present invention. The baffles or light baffling elements of the baffle configuration or structure 22 may be disposed or established at a plate or substrate, which may be disposed at or in the module and may be arranged generally horizontally in front of and below the imaging sensor (or a lens or optical assembly of the imaging sensor or camera), with the baffles extending laterally in a cross car direction in front of the imaging sensor or camera. The baffles or light baffling elements may be generally vertically arranged at the plate or substrate or base of the baffle structure, so that the light baffling elements may be generally vertically oriented when the base of the structure is generally horizontally disposed at the vehicle (with selected angles of the opposite surfaces of the light baffling elements as discussed below).

As shown in FIGS. 16-22, the baffles or light baffling elements have a first or front facing reflection surface and a second or rear facing reflection surface. Both reflection surfaces are disposed at and have a vertical angle. The reflection angle of the first surface is at or close to vertical, while the reflection angle of the second surface is within about 10 degrees from vertical. In the illustrated embodiment, the baffles are generally in a spike like shape, with the baffles top optionally and desirably being substantially pointed or sharp, such as being as sharp as possible for the particular manufacturing techniques used to manufacture the baffles.

As can be seen in FIGS. 16-22, the height of the baffles may be equal or substantially equal. Optionally, the height of the baffles may be unequal, such as in a pattern configuration, such as a linear height pattern, an exponential height pattern a logarithmic height pattern, an alternating row height pattern, a squared sine height pattern or the like.

Optionally, the baffles are spaced apart by a predetermined or selected or appropriate distance. For example, the baffles may be spaced apart by specific distances, or the baffles may be set up in a pattern, or the baffles' spacing distances may be a ratio of the height of the baffles or spikes. Optionally, the baffles' spacing distances pattern may be a linear pattern or an exponential pattern or a logarithmic pattern or an alternating row pattern or a squared sine pattern or the like.

Optionally, and desirably, the baffles' surfaces, angles, height, spacing distances and/or the like, may, at least in part, be designed or generated by an optimization algorithm, such as by a simulating ray tracing algorithm or the like. Optionally, the optimization algorithm may use various input parameters, such as the length, width, height, opening angle of the light sensor casing, as well the position of the sensor relative to the opening or baffles, the opening angle of the sensor optics, the tilt angle of the windshield and the different materials' surface reflection ratio and/or the like. Optionally, the optimization may comprise an evolutionary hill climbing algorithm (try-evaluate-decide change-return), or the like.

Therefore, the present invention provides a vehicle vision system that provides enhanced imaging of light that passes through a window or transparent panel of a vehicle, such as through a windshield of the vehicle or the like. The light may be scattered or reflected as it passes through the window or windshield, and the system includes a baffle or light baffling system or configuration to reduce the amount of reflected or scattered light that is imaged by or received by the imaging sensor or camera. The vehicle vision system of the present invention thus provides enhanced display of information and images to the driver of the vehicle based on images captured by one or more cameras or image sensors of the vehicle and having exterior fields of view, such as forwardly, rearwardly and sidewardly of the vehicle.

Optionally, the bracket may include attachment means (such as slots or the like) for attaching the bracket to one or more (such as three or four) fixing elements or attachment elements adhered at the windshield surface, and may include a stray light shield that shields light emanating from inside the vehicle from being received by the camera, such as in a similar manner as shown in FIGS. 9 and 11. Thus, the bracket provides the light shield at or in front of the camera and lens, and may also provide a light baffling element or system that limits light emanating from outside the vehicle and passing through the windshield from reflecting off of the generally horizontal portion of the bracket in front of the camera towards the camera and lens. The light baffling system provides a plurality of baffles or generally vertically oriented ribs that cause the light passing through the windshield to reflect between opposing surfaces of the ribs before reflecting towards the camera and lens, such that the light is scattered and the intensity of the scattered light at the camera and lens is reduced.

As discussed above, the present invention provides for a camera module that is attachable at or to a bracket that attaches at the vehicle windshield, with the bracket having a light shield that is separate from the camera module so as to adapt the camera module for the particular vehicle or windshield application of the camera module. Typically, different OEMs and different types and styles of vehicles elect to use different windshield angles (for example, some windshields of some vehicles are more vertical and some windshields of some vehicles are more sloped). The present invention provides a light shield element or component that is selected for a particular windshield or vehicle application, such that a common camera module may be used in various applications (having different windshield angles and the like), with a selected or appropriate light shield and bracket used to mount or attach the common or universal camera module at the windshield. By placing the light shield at the bracket and/or separate from the camera module, the manufacturer can set or compensate for the particular windshield angle of a particular vehicle by the forming or molding (such as injection molding of a polymeric material, preferably a dark or light absorbing or non-reflecting plastic or polymeric material or the like) of that particular light shield.

The present invention thus may provide for a standard or stock camera module that is configured to attach to a selected particular bracket for a particular application. The field of view of the camera or imager of the standard camera module may be set for the different vehicle applications by using the molding of the selected bracket for the different applications. The present invention thus provides for a separate and independent light shield, which provides for decoupling or divorcing of the light shield from the camera module itself. Thus, when the light shield and bracket abut against the windshield, the aperture of the frit allows light to pass through the windshield, while the walls of the pocket of the light shield abut the windshield (with a gasket or seal disposed therebetween) to block light emanating from inside vehicle from being received by the imager.

Figure 23:
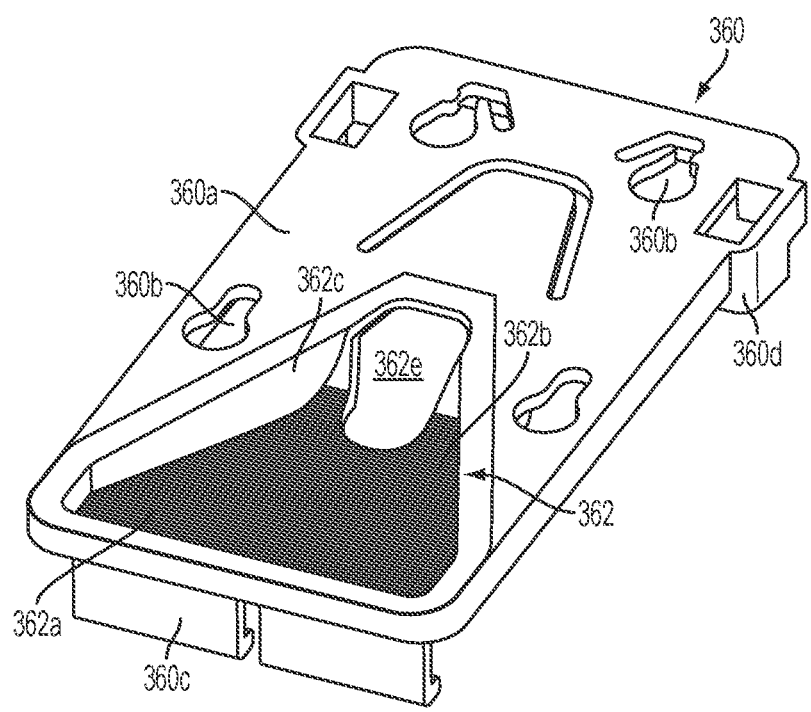
FIG. 23 is a perspective view of a bracket or shroud for a windshield electronics module of the present invention.
Figure 24:
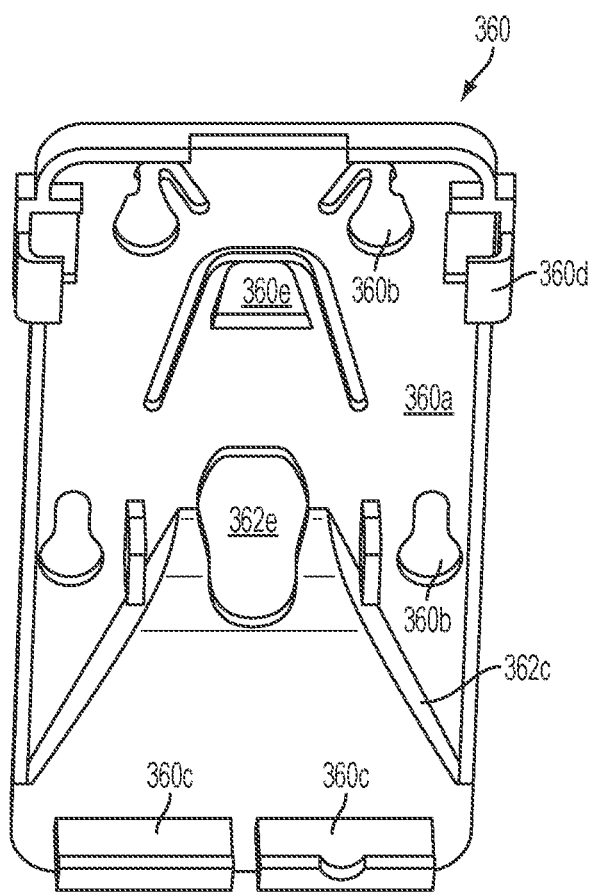
FIG. 24 is another view of the bracket of FIG. 23.
Figure 25:
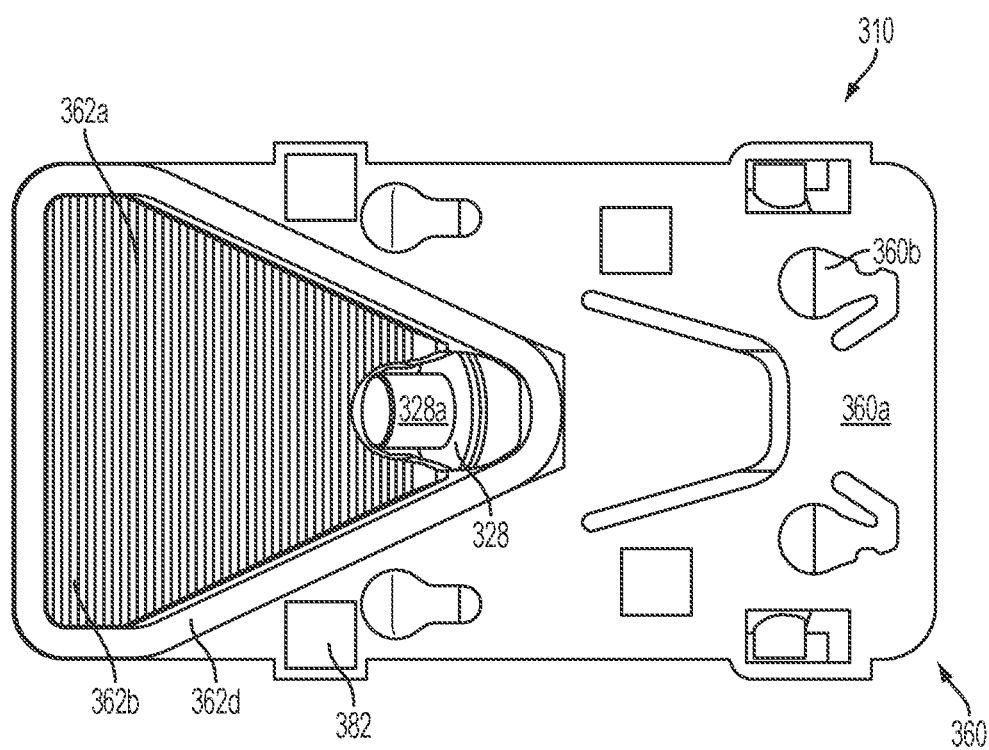
FIG. 25 is a plan view of the bracket of FIGS. 23 and 24, shown with a camera module attached thereat.
Figure 26:
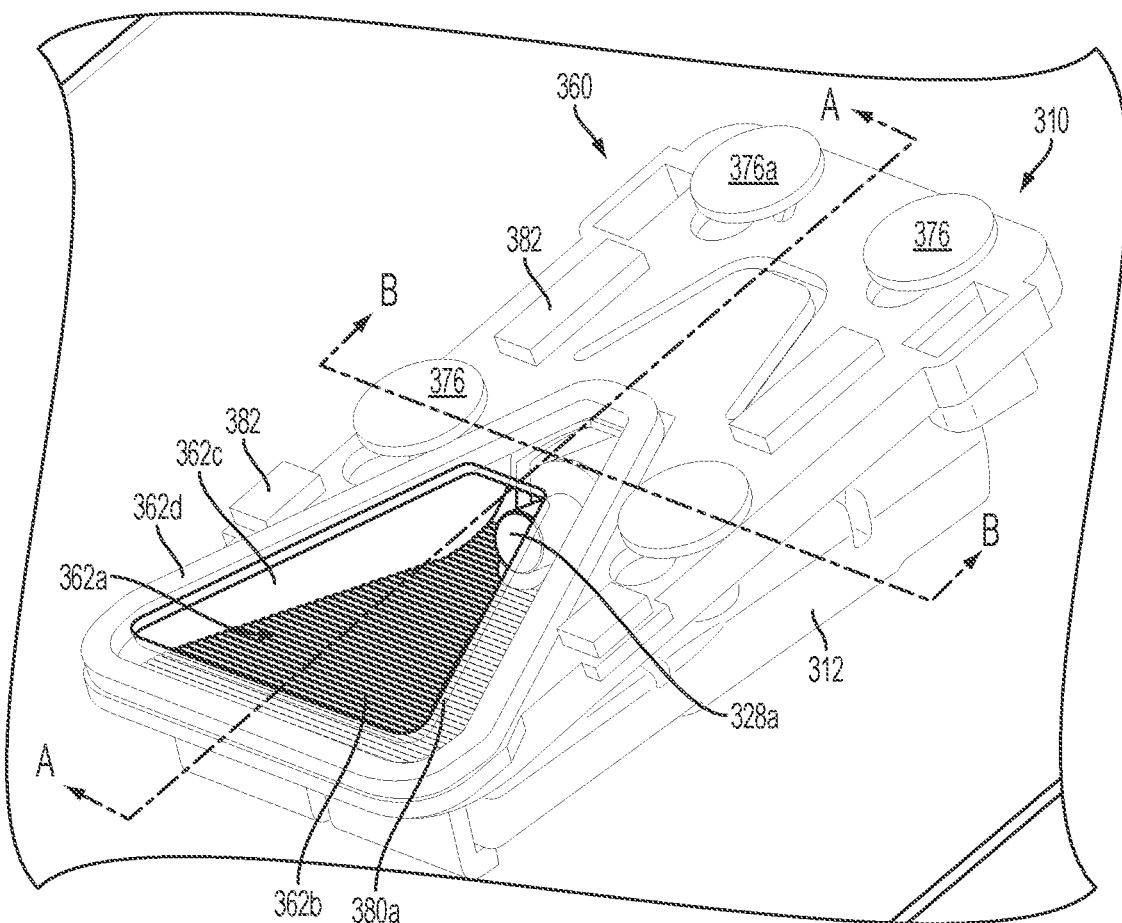
FIG. 26 is a perspective view of the camera module and bracket construction of FIG. 25, shown attached at a vehicle windshield.
Figure 27A:
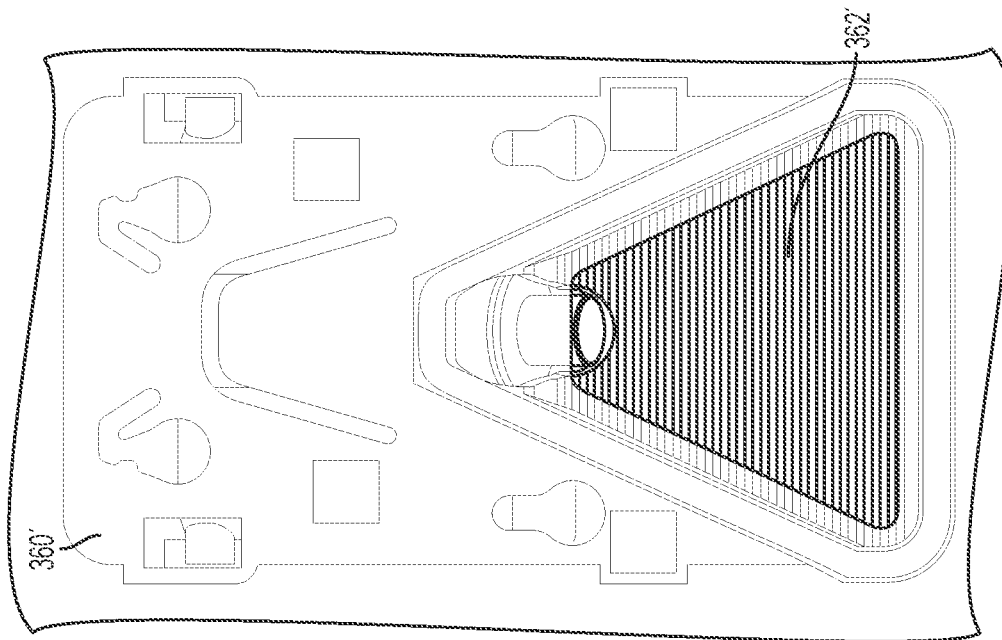
FIGS. 27A and 27B are plan views of camera module and bracket constructions of the present invention, shown with a common camera module and different brackets to accommodate different vehicle applications.
Figure 27B:
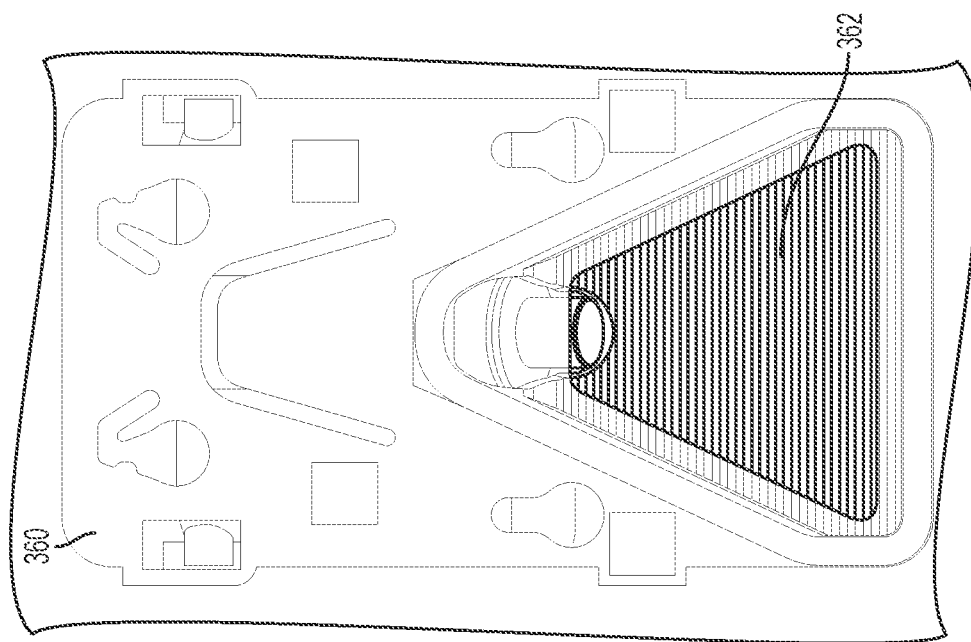
Figure 28:
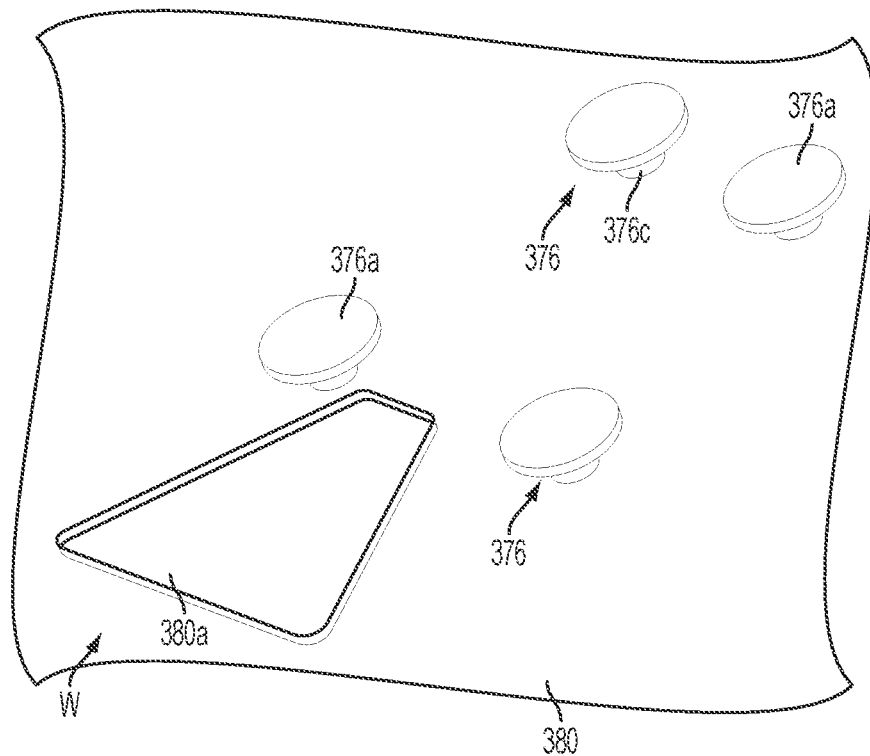
FIGS. 28-30 are perspective views showing the steps in attaching a bracket and camera module at a vehicle windshield in accordance with the present invention.
Figure 29:
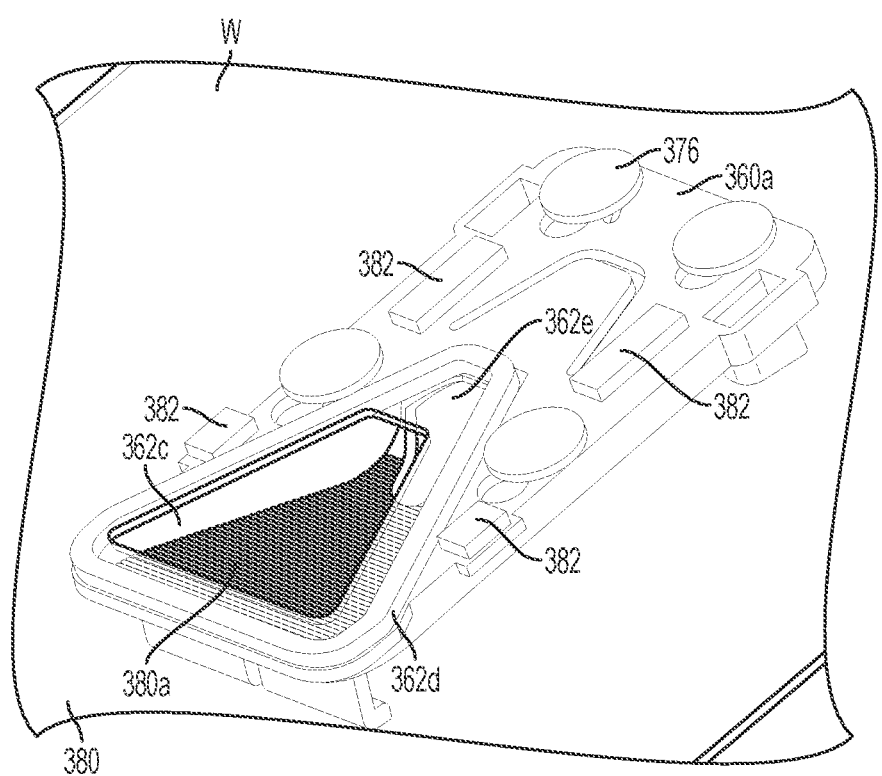

For example, and with reference to FIGS. 23-30, a camera system 310 includes a camera module or housing 312 that houses a camera and lens or imager assembly 328 and that is attachable at a bracket or frame 360, which in turn is attachable at a vehicle windshield. As shown in FIGS. 23 and 24, the bracket 360 comprises an attaching portion 360a (which may comprise a generally planar plate or portion or a curved plate or portion that is curved to correspond to a curvature of the windshield that it will attach to) that has a plurality of slots or attaching elements 360b formed thereat for attaching the bracket to a plurality of fixing elements 376 adhered at the in-cabin surface of the vehicle windshield. In the illustrated embodiment, there are four slots 360b for receiving a portion of four fixing elements 376 (FIGS. 26, 28 and 29). The fixing elements 376 each have a base or adhering portion 376a for attaching at the in-cabin surface of the vehicle windshield W and an elongated neck portion 376b extending therefrom, and with a larger diameter attaching portion 376c for retaining the bracket at the fixing element when the larger diameter attaching portion is received through a larger slot portion of the slots 360b and moved to a narrower or smaller slot portion of the slots 360b, as discussed below. The bracket 360 also includes one or more front tabs or elements 360c and rear tabs or elements 360d for retaining the camera housing or module at the bracket, as also discussed below.

As best shown in FIGS. 23 and 24, the bracket or frame 360 includes the light shield 362 (which, in the illustrated embodiment, is integrally formed or molded with the rest of the bracket), which comprises a tapered generally wedge-shaped pocket or recess 362a having a lower or base portion 362b and tapering sidewalls 362c, with a gasket or seal 362d disposed around a perimeter of the light shield 362. An aperture 362e is established through the bracket 360 at the narrower end region of the pocket or recess 362a to at least partially receive a lens portion 328a of the camera 328 when the camera module 312 is attached at the bracket. Thus, when the bracket 360 is attached at the fixing elements 376 at the windshield W, the seal 362d engages or seals against the in-cabin surface of the windshield and the side walls 362c and lower portion 362b of the light shield 362 function to substantially block or attenuate light emanating from inside the vehicle cabin from entering the pocket or recess 362a at which the camera is disposed.

In the illustrated embodiment, the light shield 362 also includes a plurality of baffles or ribs at the lower portion 362b to limit glare or reflection of light emanating from outside of the vehicle and passing through the windshield from being received at the camera or imager assembly.

As shown in FIG. 28, the windshield W may have an opaque or light absorbing or non-light-transmitting layer 380 (such as an opaque ceramic frit layer or the like) disposed at the area of the windshield at which the bracket is mounted, with an aperture 380a established through the opaque layer generally at the area in front of and generally aligned with the imager assembly when the bracket and camera housing are attached at the windshield.

Thus, and as can be seen with reference to FIGS. 26, 28 and 29, the windshield W may have a plurality of fixing elements 376 adhered at its inner or in-cabin surface at an area or region of the windshield at which an opaque layer 380 is established. As best shown in FIG. 28, an aperture 380a is formed through the opaque layer 380. As shown in FIG. 29, the bracket may be attached at the fixing elements 376 to attach the bracket at the windshield. As can be seen in FIG. 29, when the bracket 360 is so attached, the pocket 362a of the light shield 362 is disposed generally at or behind the aperture 380a, with the seal 362d engaging or sealing the in-cabin surface of the windshield. Optionally, the seal 362d may comprise an open cell foam material (such as by utilizing aspects of the camera systems described in U.S. patent application Ser. No. 12/393,223, filed Feb. 26, 2009, which is hereby incorporated herein by reference in its entirety), and one or more other sealing elements or pads 382 (which may comprise any suitable material, such as a closed cell foam material or the like) may be disposed between the bracket 360 and the windshield W to maintain a substantially constant gap between the bracket and the windshield surface and/or to limit rattling or the like when the bracket is attached at the windshield.

Figure 30:
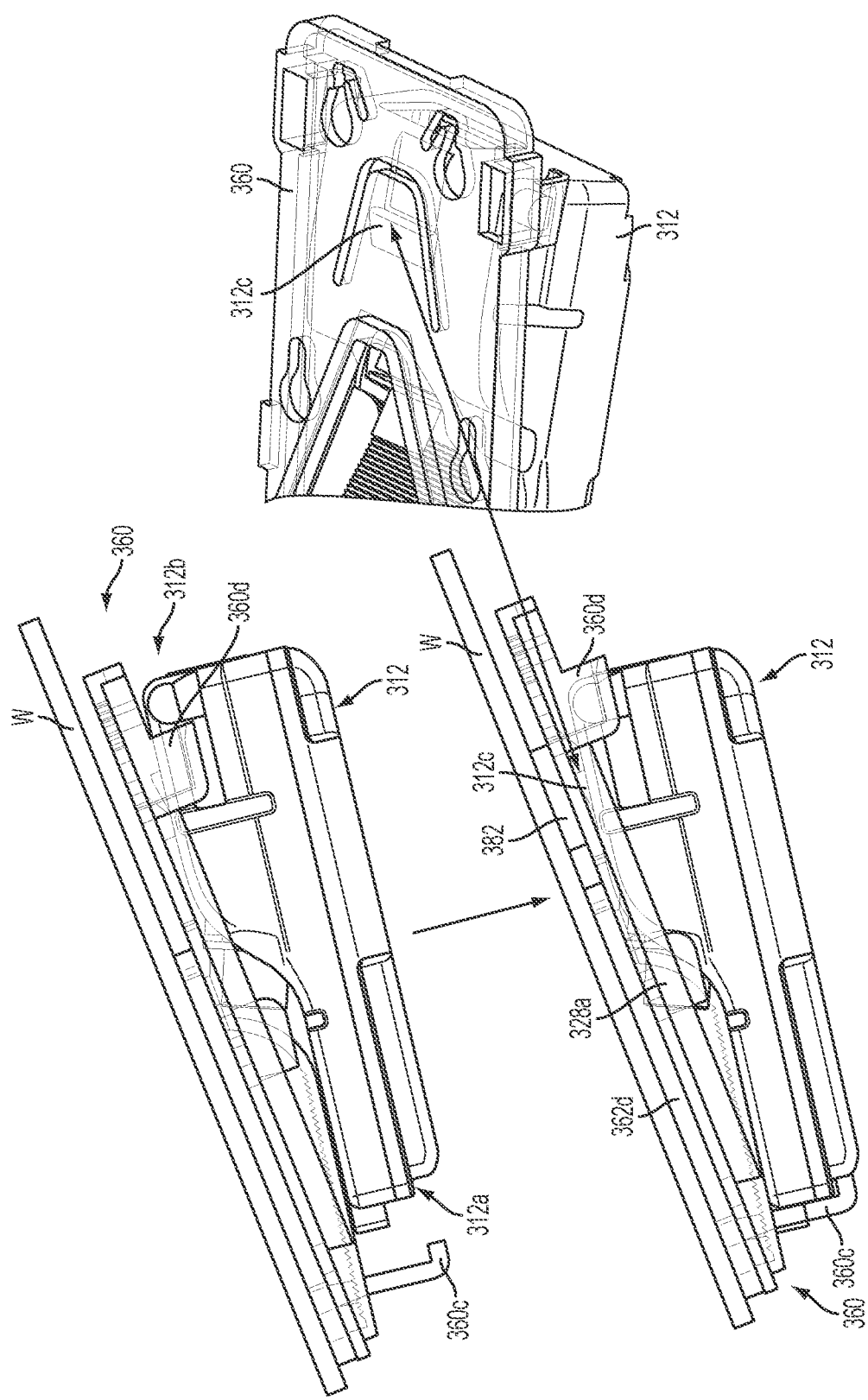
Figure 31:
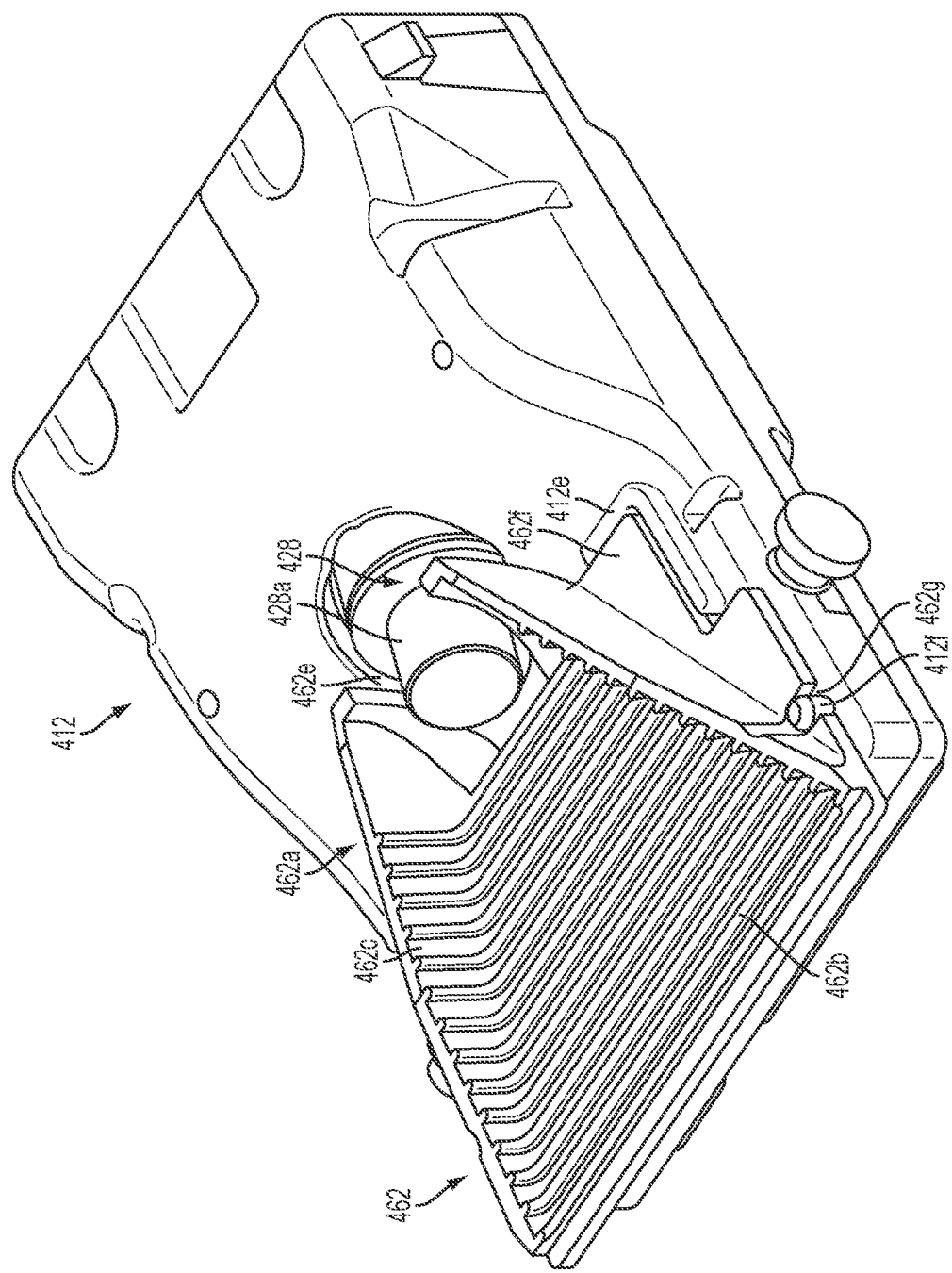
FIG. 31 is a perspective view of another camera module and separate light shield in accordance with the present invention.

As shown in FIG. 30, the camera module or housing 312 may be moved or slid along the bracket 360 to attach the housing at the bracket. For example, the front of the housing 312 may include a front mounting lip 312a that is received at or engages the front mounting tab or tabs 360c of the bracket while a rear mounting tab 312b of the camera housing 312 may engage or slide along the respective rear tab 360d of the bracket. The camera housing or module is slid along the bracket until the locking tab 312c of the camera housing engages a receiving portion 360e of the bracket 360, whereby the locking tab limits or substantially precludes movement of the housing in the opposite direction, thereby retaining the camera housing or module at the bracket. When the camera housing or module 312 is so attached at the bracket 360, the lens 328a of the imager assembly protrudes at least partially through the opening 362e in the shield portion 362 of the bracket 360, with its field of view through or across the pocket 362a and through the aperture 380a at the windshield W.

Figure 26A:
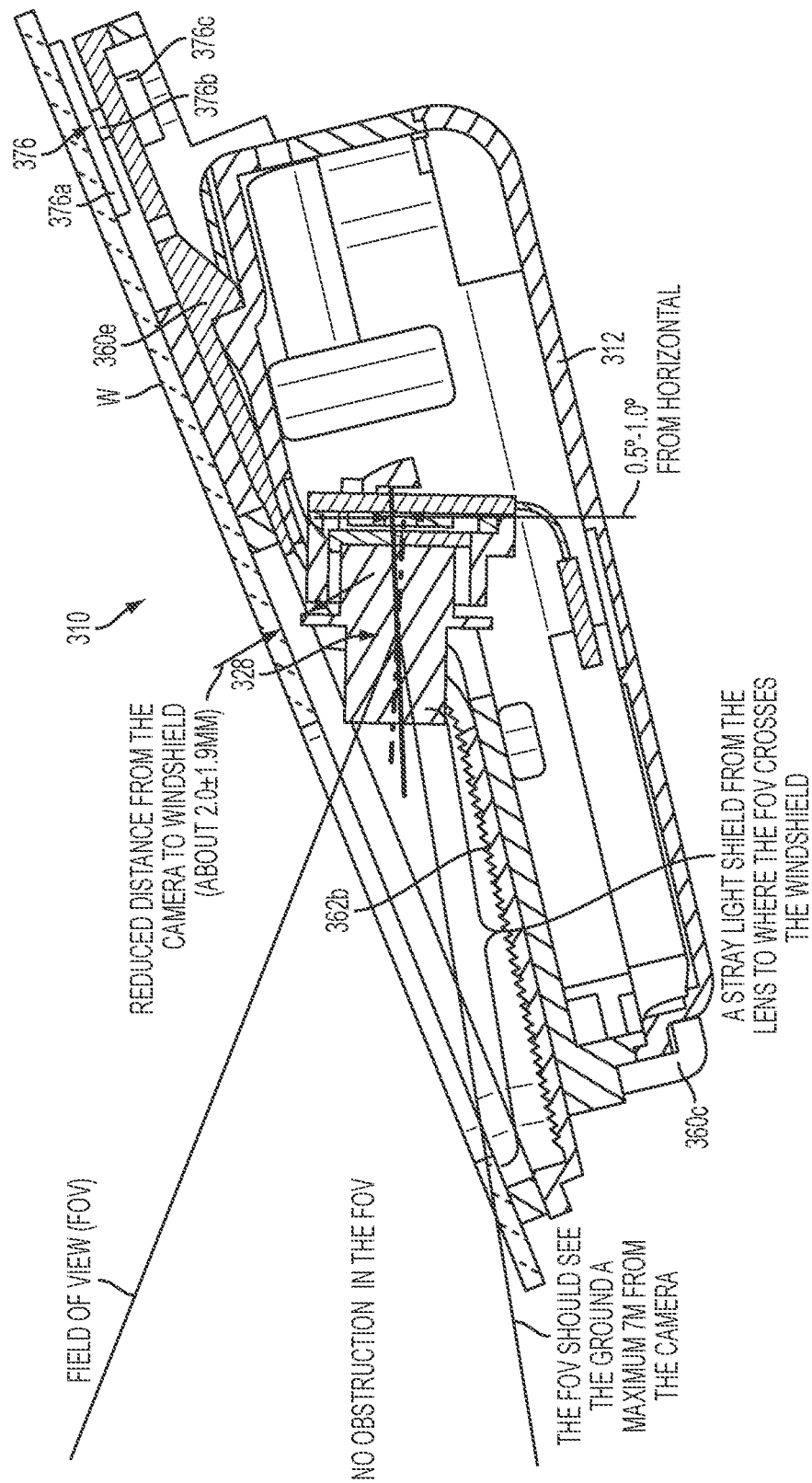
FIG. 26A is a sectional view of the camera module and bracket construction taken along the line A-A in FIG. 26.
Figure 26B:
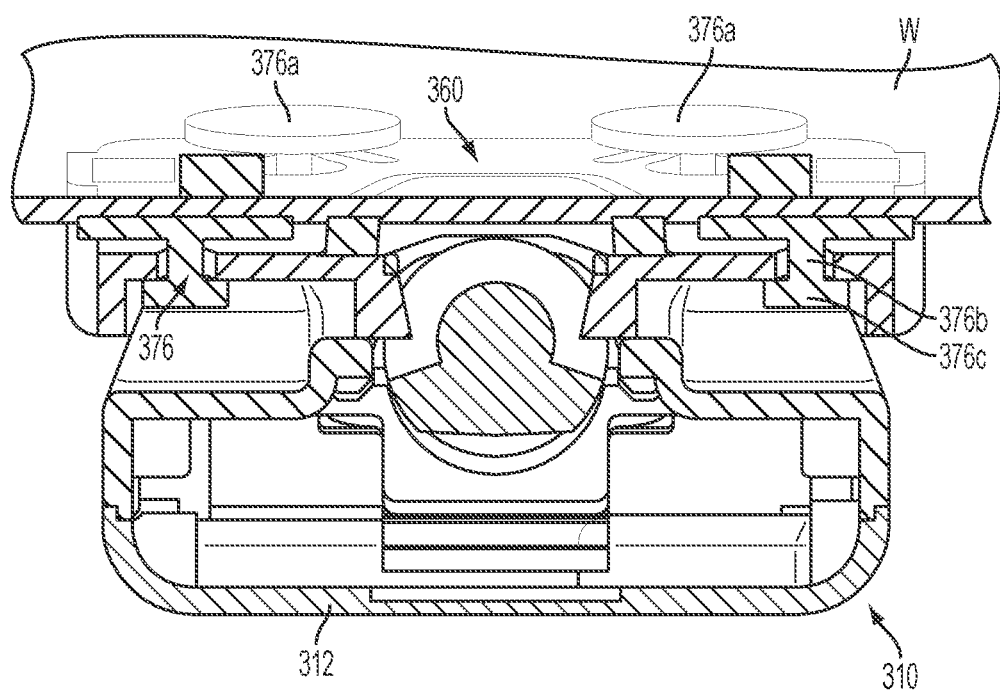
FIG. 26B is a sectional view of the camera module and bracket construction taken along the line B-B in FIG. 26.

When the camera module is attached at the bracket at the windshield (such as shown in FIGS. 26, 26A and 26B), the imager assembly 328 has a field of view through the aperture 380a in the opaque layer 380 at the windshield W, with no obstruction in the field of view of the imager. The field of view of the imager is set (such as by the bracket configuration) to be at or slightly above horizontal (such as, for example, at at least about 0.5 degrees above horizontal or about 1 degree above horizontal or at about 2 degrees above horizontal or thereabouts), with the field of view of the imager encompassing the ground ahead of the equipped vehicle at less than about 7 m from the imager. The stray light shield 360 is arranged so that it extends from the lens of the imager to where the field of view of the imager crosses the windshield. The camera module and bracket configuration also provide for the imager to be mounted at the windshield at a location that is a reduced distance from the windshield (such as less than about 4 mm, preferably less than about 2 mm and preferably about 2.0+/−1.9 mm or thereabouts).

The camera module 312 may comprise a reduced size camera module, such as a module or housing that is less than about 100 mm long (such as less than about 90 mm long and such as, for example, about 88 mm long or thereabouts) and that is less than about 100 mm wide (such as less than about 75 mm wide and such as, for example, about 58 mm wide or thereabouts) and that is less than about 35 mm tall (such as less than about 30 mm tall and such as, for example, about 29 mm tall or thereabouts). The imager may comprise any suitable imager or imaging array, such as, for example, a wide VGA imager having, for example, 752 columns. Optionally, the imager may only use about 640 columns of pixels of the imaging array. Thus, the imager or image processor may have about 112 columns or 56 columns in either direction to adjust the imager to accommodate for any misalignment or yaw (such as within a range of about +/−3 to 4 degrees or thereabouts) of the imager when the camera module is mounted at the windshield of a vehicle. The camera module or system may also provide for adjustment of the imager's field of view to accommodate variation in tip angle (such as, for example, about +/−6 degrees or thereabouts) and/or roll angle (such as, for example, about +/−3 degrees or thereabouts).

As can be seen with reference to FIGS. 27A and 27B, the camera module 312 may be selectively attached at a selected bracket 360 (FIG. 27A) or bracket 360' (FIG. 27B). The selected bracket 360, 360' establishes the angle of the imager relative to the windshield and is selected based at least in part on the windshield angle of the vehicle at which the camera is to be installed. For example, the bracket 360 sets or mounts the camera module for a windshield angle of about 23 degrees relative to horizontal and a camera height of about 120 cm, while the bracket 360' sets or mounts the camera module for a windshield angle of about 23 degrees relative to horizontal and a camera height of between about 120 cm and about 135 cm. As can be seen by comparing FIGS. 27A and 27B, the bracket 360' has a larger light shield 362' than the light shield 362 of bracket 360. As shown in FIG. 27C, the camera module 312 is formed with the camera or imager 328 and lens 328a angled upwardly at an angle of at least about 10 degrees to an angle of about 20 degrees or more, preferably, for example, at an angle of about 16 degrees, relative to the housing of the camera module. Such an angle allows the imager and module to be disposed close to the windshield for applications at the most common vehicle windshield or rake angles (such as between about 19 degrees relative to horizontal and about 26 degrees relative to horizontal).

Thus, in accordance with the present invention, the camera holder or module (including the camera and housing portion) is configured to attach to a bracket that is attachable at the in-cabin surface of the vehicle windshield, such as via attachment to one or more attachment elements adhesively attached at the in-cabin surface of the vehicle windshield. The bracket has an aperture for at least partially receiving and/or aligning with the camera and lens, such that the camera views through the windshield of the vehicle when the camera holder is attached at the bracket that is attached at the windshield. The camera holder and/or the bracket and/or a separate element provides a light shield having a wedge-shaped or tapered recess or pocket at the camera lens, whereby the camera views through the recess or pocket and through the windshield (such as by utilizing aspects of the camera systems described in U.S. Pat. Nos. 8,256,821 and/or 6,824,281, and/or U.S. patent application Ser. No. 13/470,860, filed May 14, 2012, now U.S. Pat. No. 8,405,726, which are hereby incorporated herein by reference in their entireties). The wedge-shaped recess or pocket is defined or formed by a base portion and opposite sidewalls that taper towards the lens and that extend generally upwards from the base portion to form the wedge-shaped recess or pocket between the in-cabin surface of the windshield and the base portion.

Thus, the camera holder or module or unit may comprise a common or universal component for vehicle vision system, and the bracket may be selected for a particular vehicle application. For example, a bracket of the present invention may be selected or provided that has the appropriate attachment for a particular windshield angle and that has a light shield and wedge-shaped recess or pocket formed or selected for the particular windshield angle and windshield application. Thus, the dimensions of the bracket and recess/pocket formed thereat may be selected or configured for particular vehicle windshield applications, while the camera module or unit may comprise a common unit that is attached at the selected particular bracket for the selected particular vehicle/windshield application.

The light shield is formed so that, when the camera module is attached at the bracket and/or light shield, the light shield is not in the field of view of the imager (in other words, the cone of vision of the imager does not encompass the light shield). The texture of the light shield may be any suitable material, such as a Rio grain texture combined with Micromatte (such as known in the texturing arts). The selected material preferably comprises a low gloss material (such as a material having a gloss level of 10max), and is preferably a dark or black color, such as Ebony 848 or the like. The selected material may comprise any suitable material, and may comprise a glass filled Nylon material or the like, such as, for example, ULTRAMID® B3WG6 glass fiber reinforced plastic available from BASF Aktiengesellschaft of Germany, or such as, for example, Bayblend T85 XF plastic available from Bayer MaterialScience AG of Germany. Optionally, the surface of the ribs or light traps may be stippled or otherwise configured or textured so as to enhance the light trapping capability thereof. Although preferably light absorbing, the ribs or light traps of the present invention may comprise a non-light-absorbing material/surface or may comprise a partially light reflective material/surface or the like. Optionally, the surfaces of the light traps may comprise fiber/flocked surfaces or the like.

Although the mounting bracket is preferably formed via injection molding of a polymeric material and although the light shield is preferably integrally formed therewith in the same injection molding operation, other forms of fabrication are contemplated. For example, the bracket and the light shield integrally formed therewith may be fabricated by metal forming, such as by stamping or casting or die casting or the like. Preferably, for purposes of light-weightness, the bracket and light shield integrally formed therewith may be formed of magnesium metal, preferably fabricated using thixomolding. Other forms of semi-solid metal casting techniques can be used, including rheocasting, thixocasting and SIMA, such as are known in the metal fabrication arts. Optionally, non-ferrous metals, such as aluminum or aluminum alloys, magnesium or magnesium alloys or copper or copper alloys or the like, may be used in fabrication of the bracket and light shield.

Optionally, a separate stray light shield may be provided as a separate component that attaches at the camera module before the camera module is attached at a bracket attached at a vehicle windshield. In such a configuration, a selected light shield and bracket may be selected for a particular vehicle application, whereby the selected light shield and bracket are used with a common or universal camera module to adapt the camera module for the particular or selected vehicle and windshield application.

For example, and with reference to FIGS. 31-45, a light shield element 462 is configured to attach at a camera module or camera holder or housing 412 to provide the desired or selected or appropriate light shield feature or configuration at the imager and lens assembly 428 for the particular vehicle windshield application of the camera module. In the illustrated embodiment, the light shield element 462 comprises a tapered generally wedge-shaped pocket or recess 462a having a lower or base portion 462b and tapering sidewalls 462c. A partial aperture or notch 462e is established at the narrower end region of the pocket or recess 462a to at least partially receive a lens portion 428a of the camera 428 when the light shield 462 is attached at the camera module 412. In the illustrated embodiment, the light shield 462 also includes a plurality of baffles or ribs at the lower portion 462b to limit glare or reflection of light emanating from outside of the vehicle and passing through the windshield from being received at the camera or imager assembly.

Figure 32:
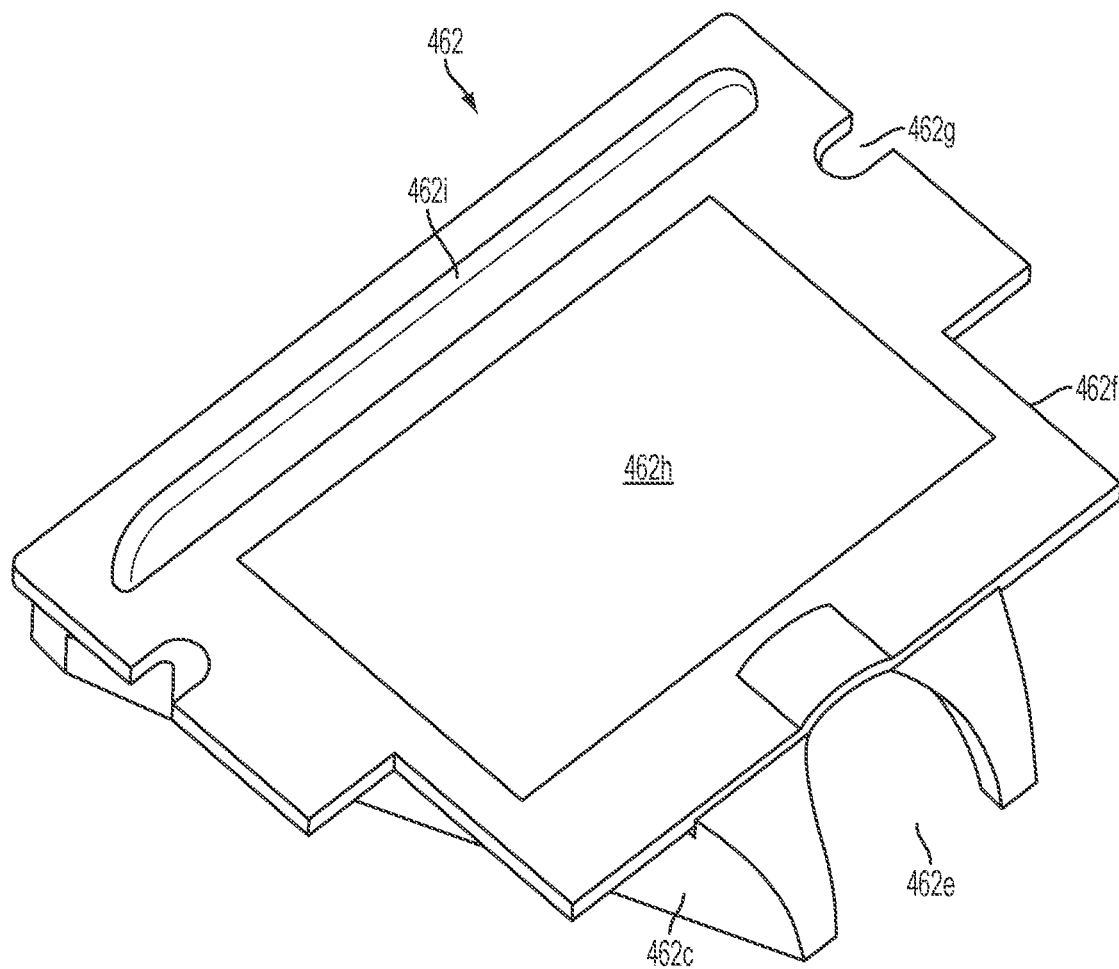
FIG. 32 is an underside perspective view of the separate light shield of FIG. 31.

As shown in FIGS. 31-36, the light shield element 462 is configured to be partially received at a generally planar light shield attaching portion 412d of the camera module. In the illustrated embodiment, the camera module 412 includes a partial wall or rib 412e that receives a base or footprint 462f of the light shield and also includes a pair of protrusions 412f that are received in respective slots 462g of the light shield to locate the light shield 462 at the camera module so that the light shield is generally aligned with the imager and lens assembly 428. As shown in FIG. 32, the light shield 462 may include an adhesive layer or pad 462h (such as a pressure sensitive adhesive layer, such as a VHB adhesive or the like, such as, for example, an Acrylic Plus Tape Series EX4000 adhesive commercially available from 3M of St. Paul, Minn.) that adheres the base of the light shield at the attaching portion 412d of the camera module.

Figure 33:
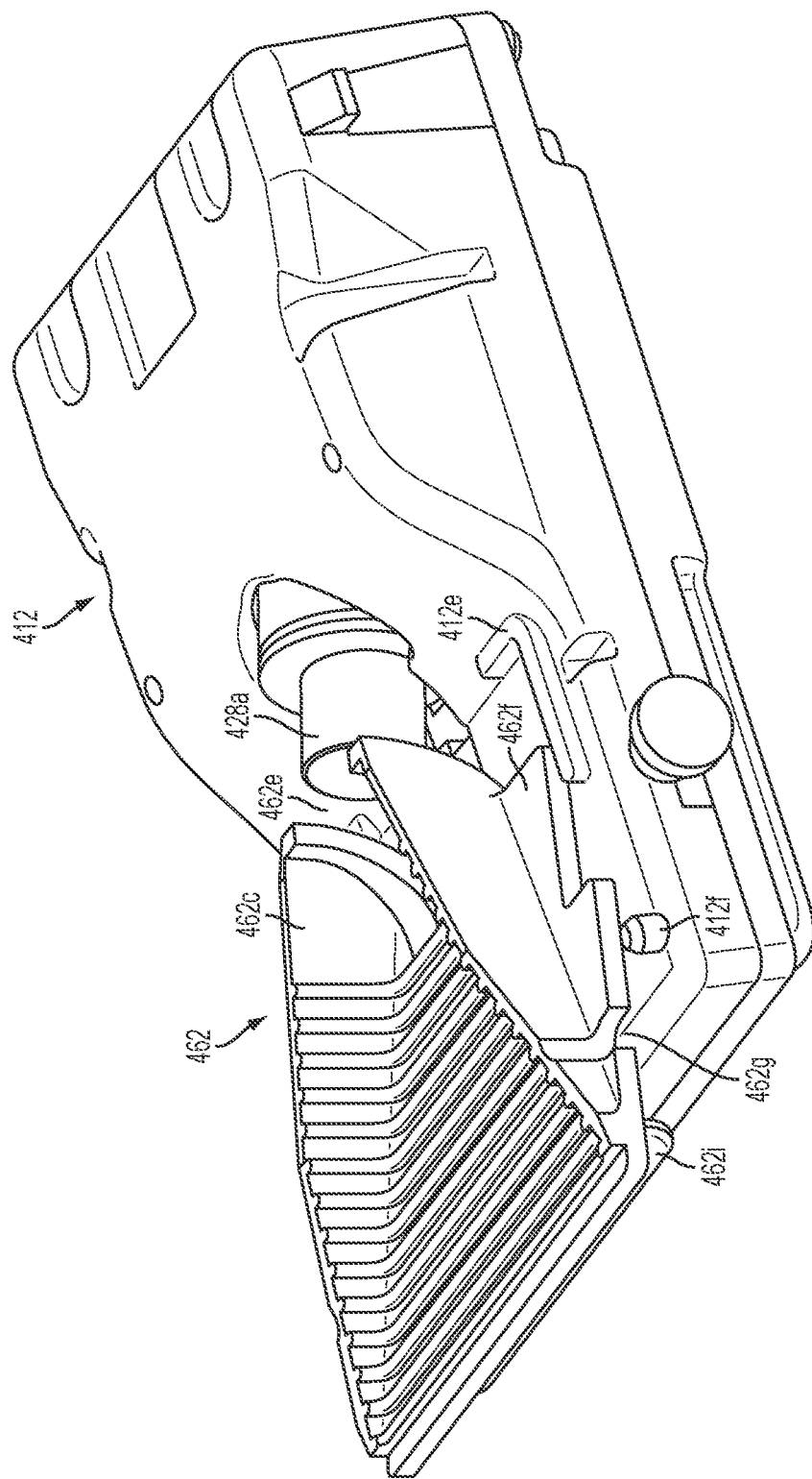
FIGS. 33-36 are views of the camera module and separate light shield of FIG. 31, showing the assembly of the light shield to the camera module.
Figure 34:
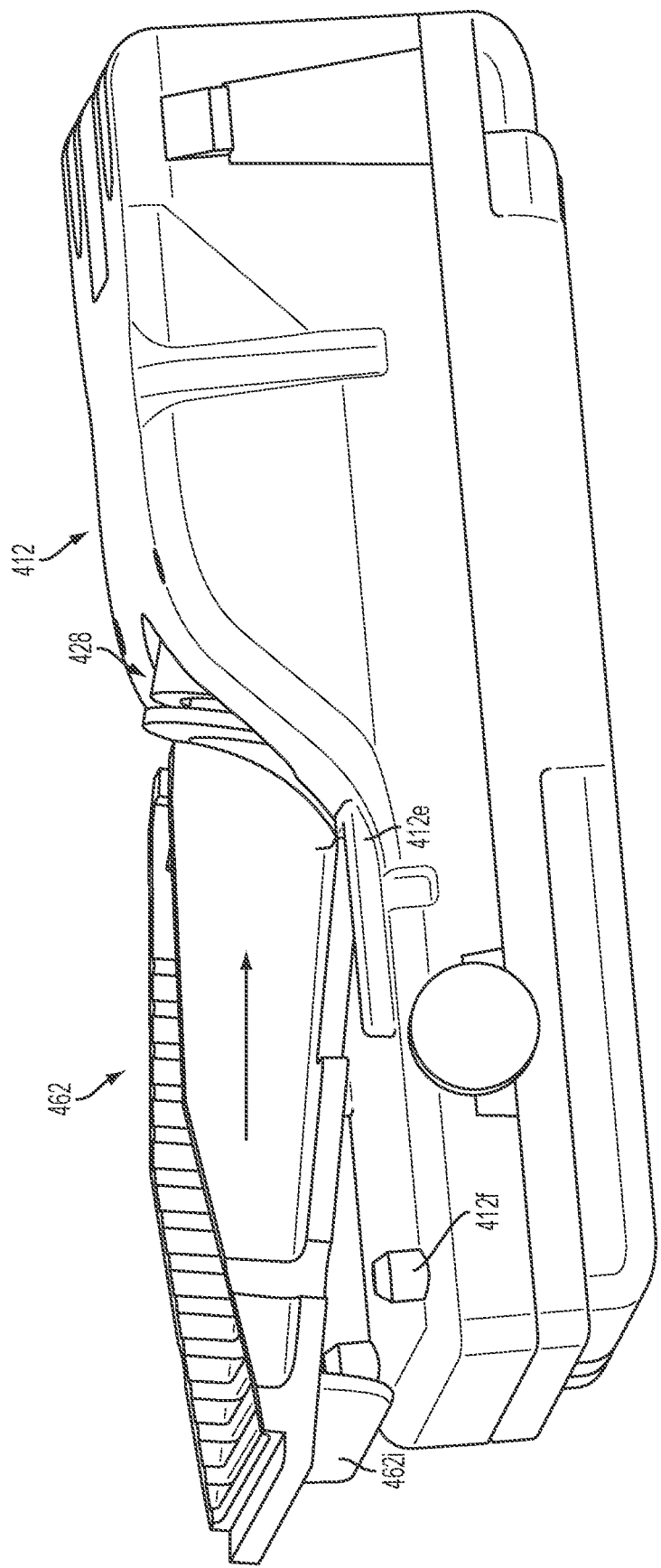
Figure 35:
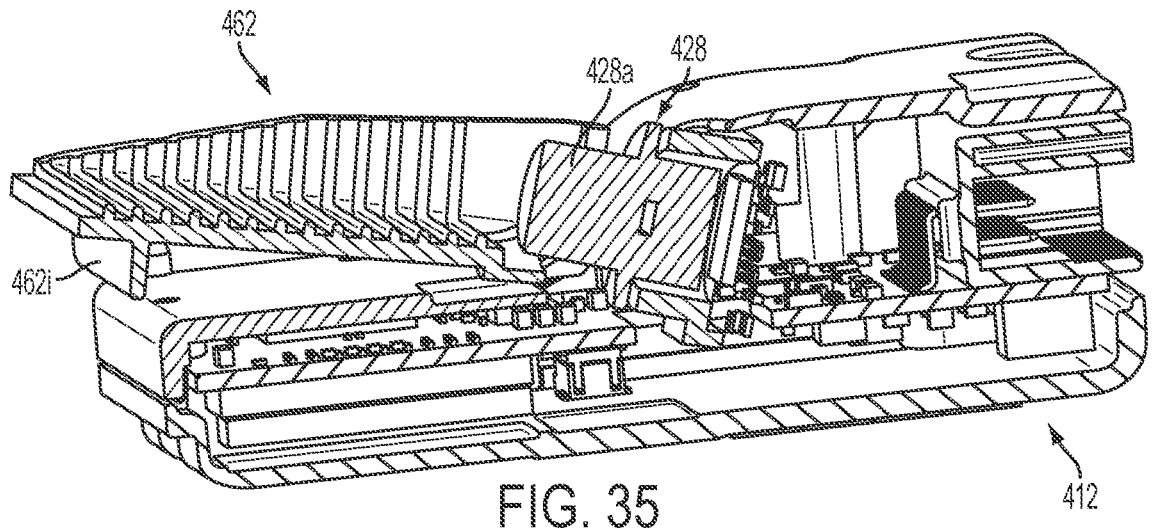
Figure 36:
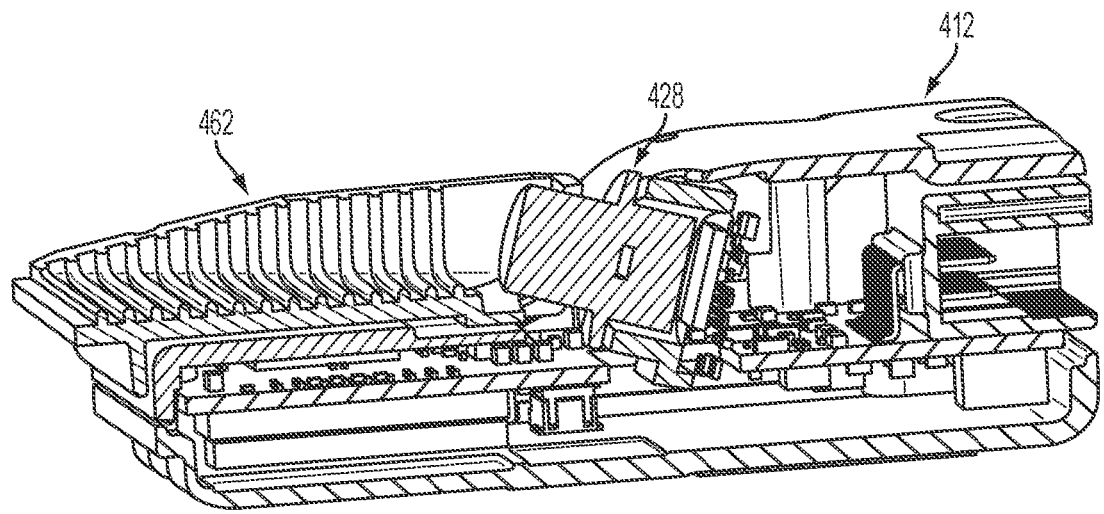
Figure 37:
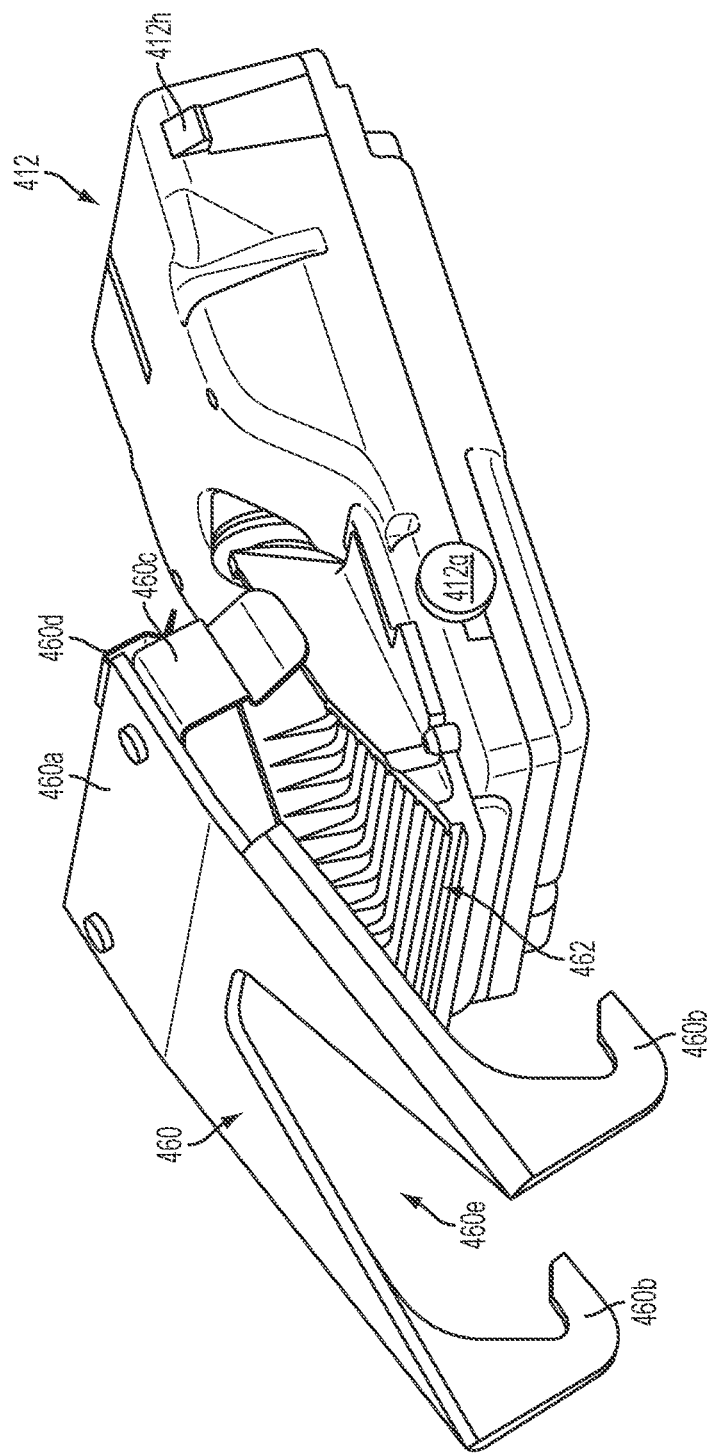
FIGS. 37-40 are views of the camera module and light shield assembly of FIG. 31, showing the attachment of the camera module and light shield assembly to a bracket attached at a vehicle windshield.
Figure 38:
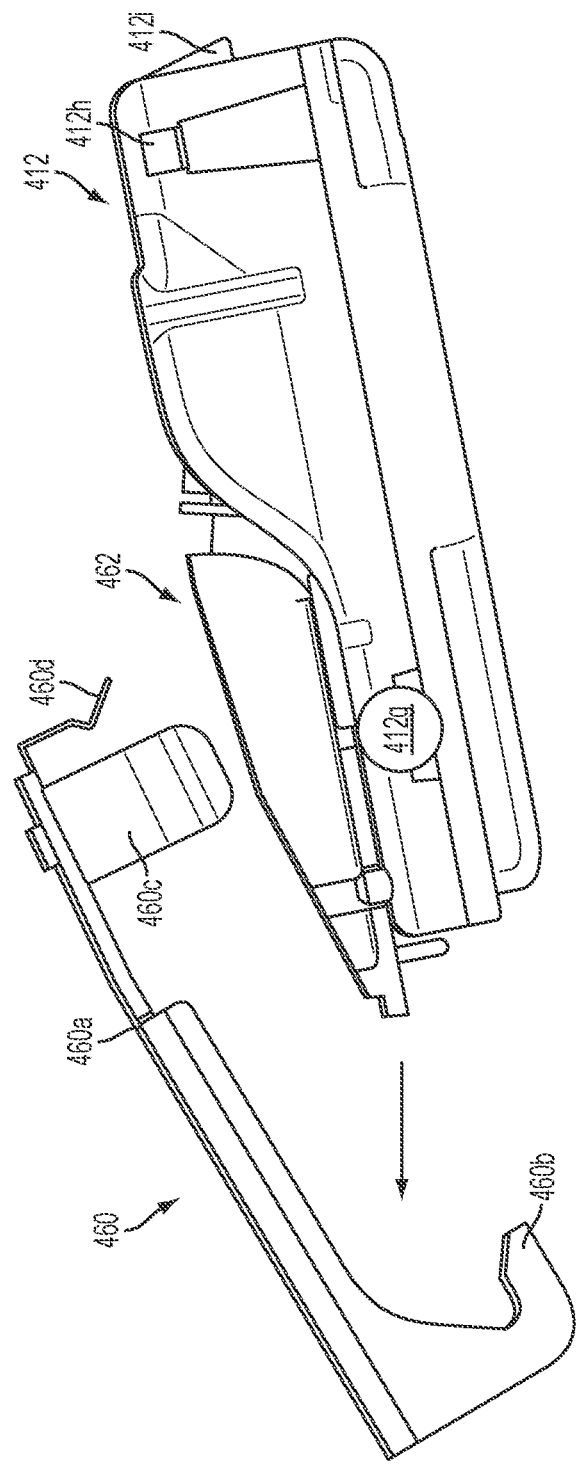
Figure 39:
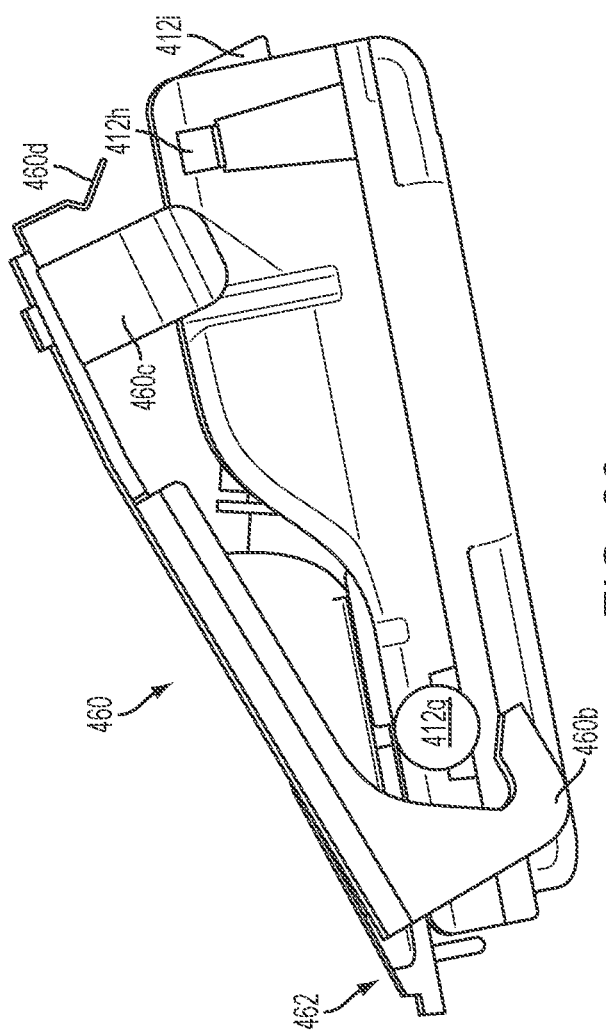
Figure 40:
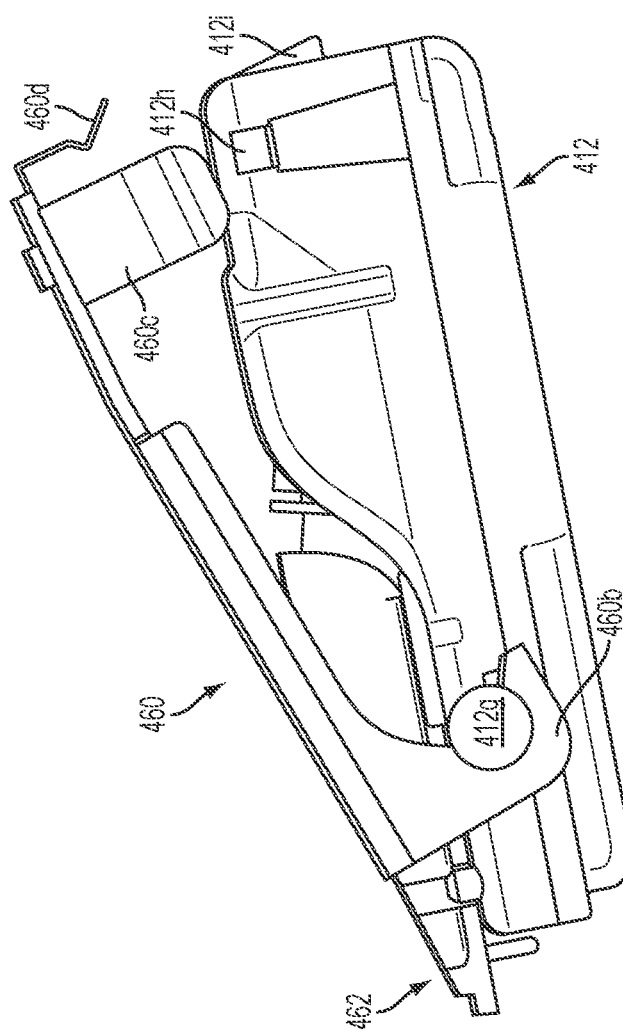
Figure 41:
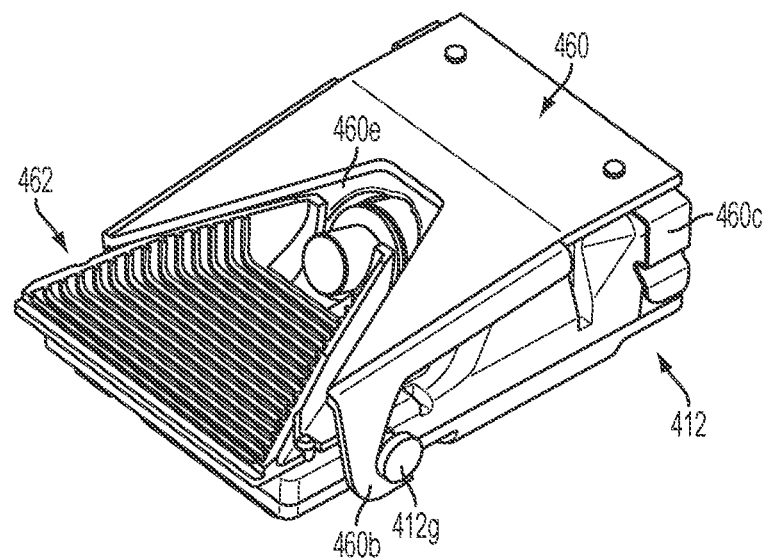
FIGS. 41 and 42 are perspective views of the camera module and light shield assembly as attached to the bracket.
Figure 42:
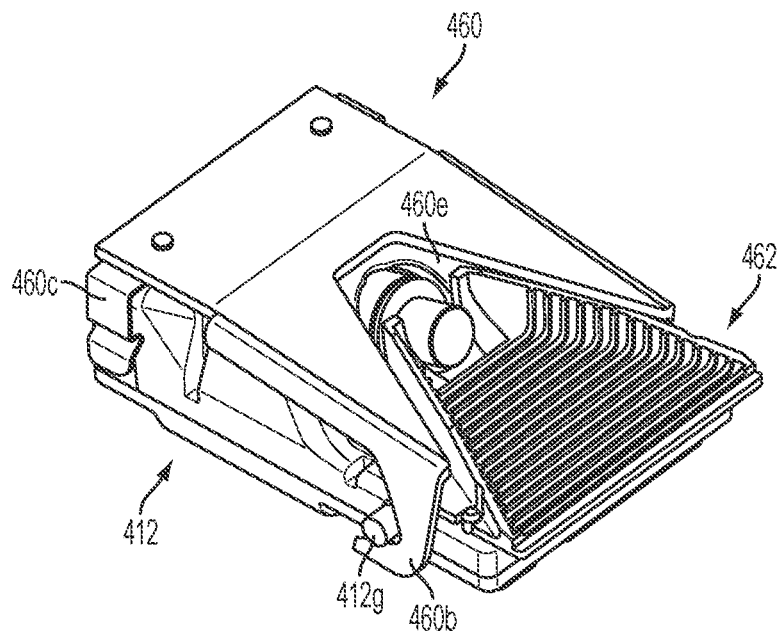
Figure 43:
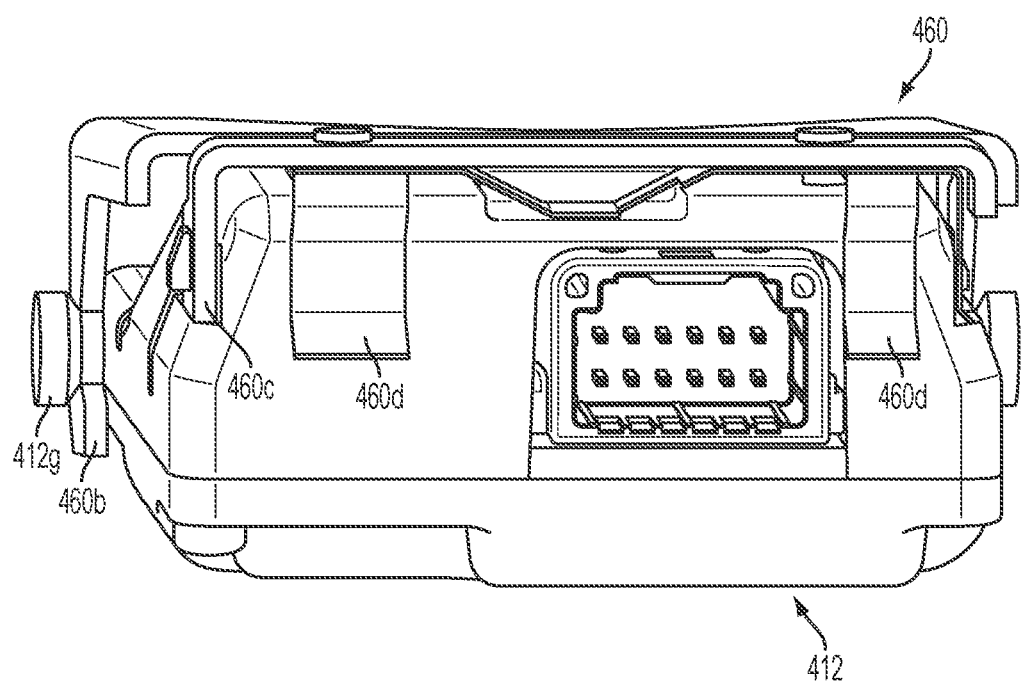
FIG. 43 is a perspective view of another camera module attachment at a bracket in accordance with the present invention.
Figure 44:
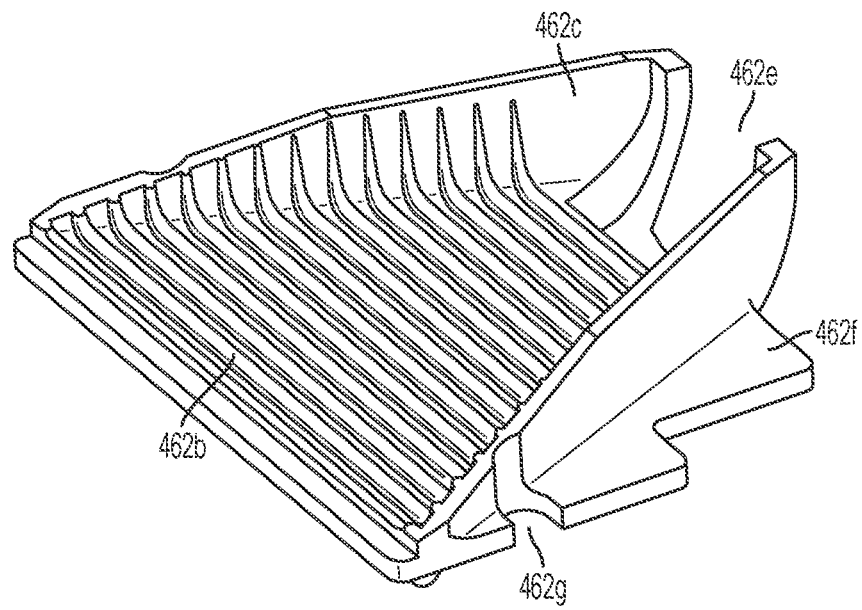
FIG. 44 is a perspective view of the separate light shield of FIG. 31.

Thus, and as shown in FIGS. 33-36, the light shield 462 may be attached at the camera module 412 by angling the light shield as shown in FIG. 33 and moving or sliding the light shield towards the imager until the base or footprint 462f of the light shield 462 is stopped by the partial wall 412e of the camera module. When the light shield contacts the partial wall or rib 412e, the light shield is then pivoted or pressed or moved downward to engage the base or footprint of the light shield with the attaching portion of the camera module, whereby the light shield is adhered to the attaching portion of the camera module. When the light shield is pivoted downward, the protrusions 412f are received in the respective slots 462g to guide and locate the light shield at the appropriate or desired location at the camera module. The light shield 462 may also include a forward tab or lip 462i that engages or contacts the forward end of the camera module when the light shield is adhered at the camera module.

After the light shield 462 is attached or adhered at the camera module 412, the camera module and light shield construction or assembly may be attached at a bracket 460 (such as a bracket already attached at a windshield of a vehicle or at a bracket that is configured for attachment at a windshield of a vehicle), such as shown in FIGS. 37-43. The bracket and light shield may be selected for a particular vehicle windshield application to adapt or configure the camera module for that particular vehicle windshield application. The bracket may be configured to attach at a vehicle windshield via any suitable manner, such as via a plurality of fixing elements or buttons that are adhered at the vehicle windshield and that are received through respective slots or apertures (not shown in FIGS. 37-43) of the bracket, such as in a similar manner as described above, or the bracket may be adhered directly at the vehicle windshield or may otherwise attach to one or more fixing elements or buttons adhered at the vehicle windshield.

In the illustrated embodiment, the bracket 460 (such as a metallic bracket formed by stamping or the like) comprises a generally planar portion 460a and a pair of spaced apart forward tabs 460b and a pair of spaced apart rearward side tabs 460c. The forward tabs 460b are configured to receive respective posts or protrusions 412g at opposite sides of the camera module as the camera module is moved towards the bracket 460 (such as can be seen with reference to FIGS. 37-40). When the posts 412g are received in the tabs or hooks 460b of the bracket 460 (FIG. 40), the camera module 412 is pivoted upward until the rearward side tabs 460c engage respective tabs 412h at the upper rear region of the camera module 412. The rearward side tabs 460c flex to receive and retain the tabs 412h to secure or retain or mount or attach the camera module 412 at the bracket 460. In the illustrated embodiment, and as best shown in FIGS. 38-40 and 43, the bracket 460 also includes one or more rear tabs 460d at the rear of the bracket for engaging or receiving respective rear tabs or elements 412i at the rear of the camera module 412. The bracket 460 is formed so that the generally planar portion 460a has a generally wedge-shaped or tapered aperture of notch 460e formed therethrough that generally corresponds to the shape of the light shield (and may be sized to be slightly larger than the tapered pocket of the light shield). Thus, when the camera module and light shield assembly is attached at the bracket, the bracket does not interfere with the forward field of view of the imager (such as can be seen with reference to FIGS. 41 and 42).

The bracket is formed such that it at least partially circumscribes the light shield, with the roof or upper boundary of the light shield (when disposed at the windshield-attached bracket) comprising the windshield. Optionally, a sealing element may be disposed at and along the upper edge region of the light shield for sealing against the in-cabin surface of the windshield or against a portion of the bracket (where the bracket may overlap the side walls of the light shield, and where the bracket may include a sealing element to seal against the in-cabin surface of the windshield). Thus, when the light shield and camera module are disposed at the windshield-attached bracket, the roof of the pocket (the upper boundary of the pocket of the stray light shield) is formed by the windshield and optionally a portion of the bracket and windshield. For example, the stray light shield, when disposed at the windshield-attached bracket, is aligned with an aperture or opening of the bracket, and a perimeter portion of the bracket that circumscribes or partially circumscribes the bracket aperture or opening may overlap the side walls and may extend over the stray light shield such that a small portion of the "roof" of the stray light shield comprises the circumscribing portion of the bracket (and optionally the circumscribing portion of the bracket may have light traps or ribs or columns thereat). The field of view of the camera, when the camera module and stray light shield are disposed at the windshield-attached bracket, preferably views through the aperture of the bracket (and may also view through an aperture of an opaque layer or frit layer at the windshield) and preferably does not encompass the circumscribing portion of the bracket (or any portion of the opaque layer at the windshield that circumscribes the aperture at the opaque layer).

Thus, the present invention provides a light shield that is separate and distinct from the camera module. The light shield may be incorporated into or formed with or molded as part of the bracket (such as a plastic bracket formed by injection molding or the like, preferably of a dark or opaque or black plastic material or the like), or the light shield may comprise a separate and distinct component or element (such as a plastic light shield element formed by injection molding or the like of a dark or opaque or black plastic material or the like) that is separate from the camera module and separate from the bracket. In such an embodiment, the bracket may comprise a metallic bracket that may be stamped or formed to provide the desired hooks or tabs for mounting the camera module thereat (and optionally with some of the tabs riveted or otherwise attached at the metallic bracket).

In the illustrated embodiment, the light shield element 462 provides a plurality of ribs or baffles 462j (FIG. 45) that are formed across the base portion 462b and at least partially up the side walls 462c of the light shield. The ribs or baffles 462j are spaced apart along the base portion 462b and function to scatter and trap light emanating from exterior of the vehicle that passes through the windshield and that may, absent the presence of the baffles or ribs, reflect off of the base portion 462b and into the lens 428a of the imager (see, for example, the schematic of FIG. 46).

Figure 45:
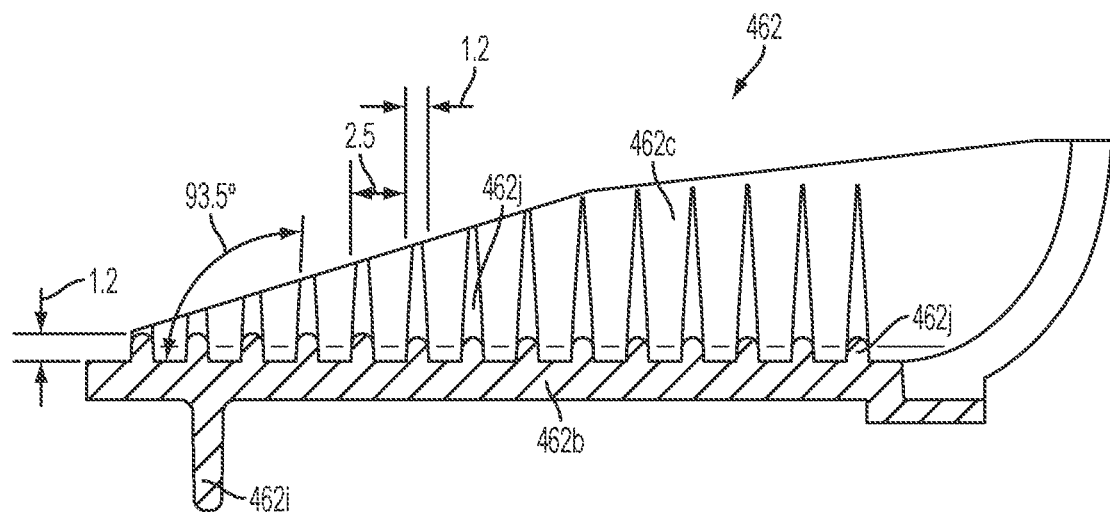
FIG. 45 is a sectional view of the light shield of FIG. 44.
Figure 46:
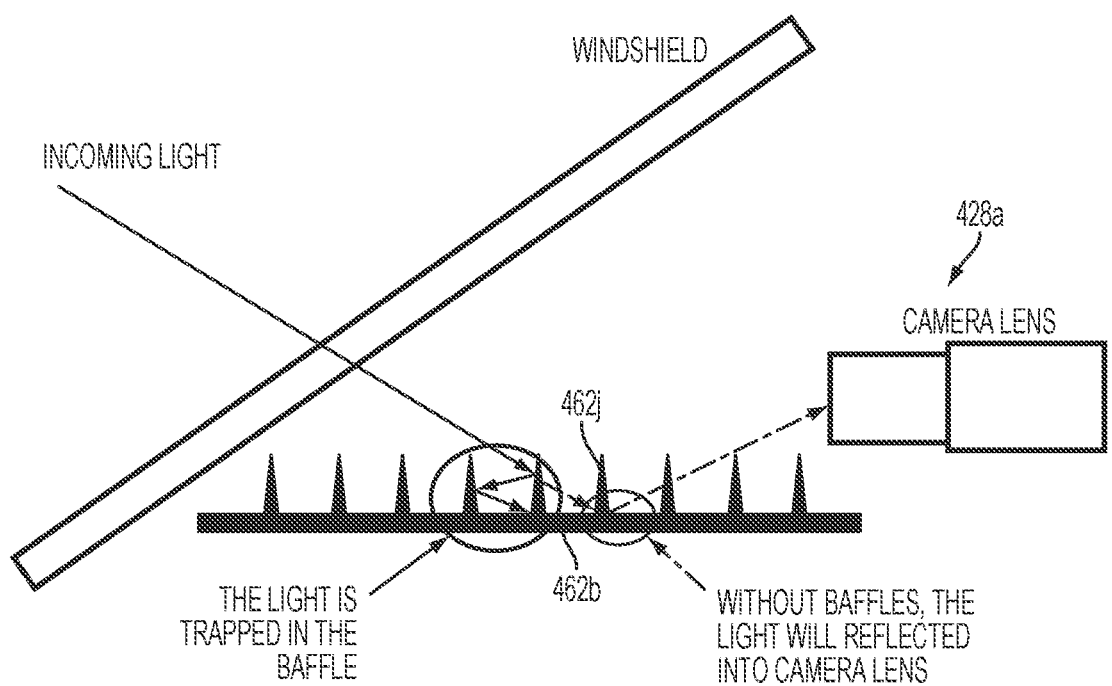
FIG. 46 is a schematic of a light shield and baffles of the present invention.

The baffles or ribs protrude upward from the base portion at least about 0.5 mm and preferably at least about 1 mm, and are at least about 0.5 mm wide and preferably at least about 1 mm wide. The spacing of the baffles is selected to be at least about 0.5 mm and preferably at least about 1 mm between a rear surface of one baffle and a forward surface of an adjacent baffle. In the illustrated embodiment of FIG. 45, the baffles comprise rounded ribs that protrude upwards about 1.2 mm and are about 1.2 mm wide and are spaced apart by about 1.3 mm (having about a 2.5 mm pitch). The baffles are preferably angled relative to the generally planar base portion and may be angled at least about 90 degrees and optionally, for example, about 93.5 degrees as shown in FIG. 45. As shown in FIG. 45, the light shield has the baffles or ribs 462j extending at least partially up the side walls 462c, which are tapered or angled or formed to generally correspond with the windshield angle for the particular application of the camera module and light shield assembly. Optionally, and desirably, the ratio of the distance between the ribs to the height of the ribs is preferably greater than about 1, such as a ratio of about 1 to about 1.5. Optionally, and desirably, the spacing distance between the ribs is at least about 0.5 mm and less than about 3 mm.

Figure 47:
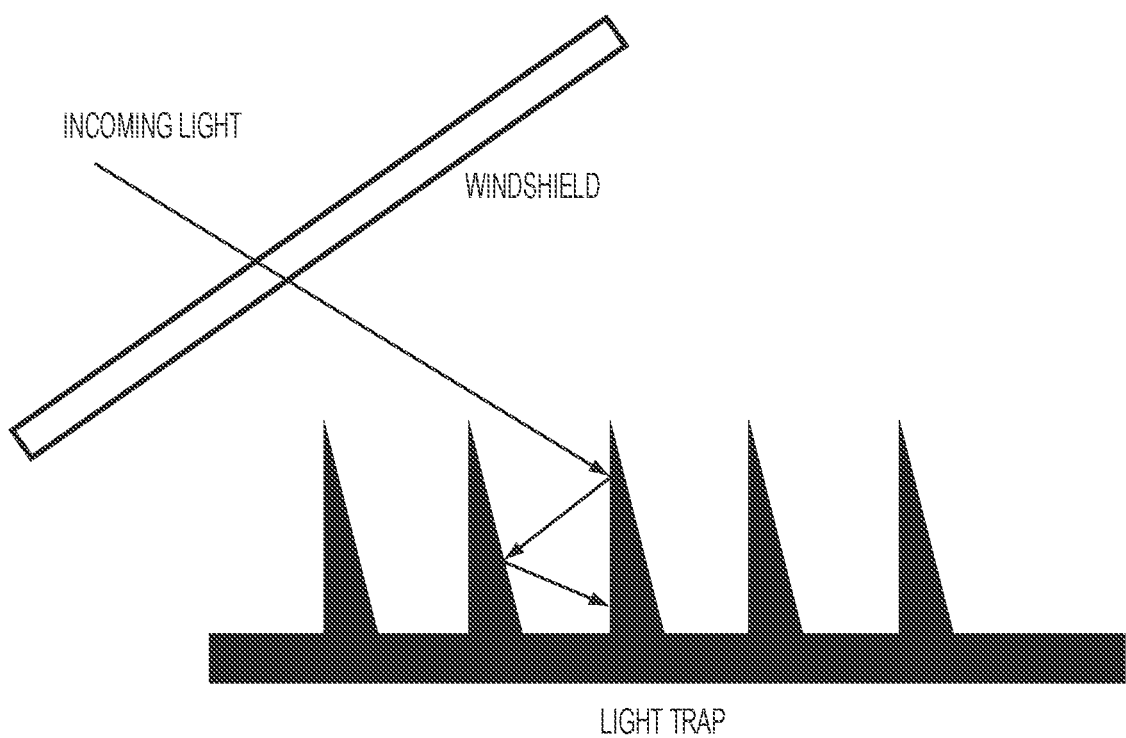
FIG. 47 is a schematic of another light shield and baffles of the present invention.

Optionally, and desirably, and such as shown in the schematic of FIG. 47, the baffles or ribs of a light trapping or scattering element may be formed with a generally vertical forward surface (which is generally normal to the generally planar base portion) and an angled rearward surface (which is angled towards the forward surface so as to form a generally pointed baffle or rib). For example, the forward surface of the baffles may be at an angle of about 90 degrees relative to the base portion and the rearward surface of the baffles are at an angle relative towards the forward surface, such as at an angle of less than about 15 degrees relative to the forward surface, preferably less than about 10 degrees relative to the forward surface and preferably less than about 5 degrees relative to the forward surface, and greater than about 2 degrees relative to the forward surface. Such a configuration of spaced apart baffles or ribs provides enhanced trapping of light that passes through the vehicle windshield and towards the light trap and baffles or ribs. However, clearly, other configurations of baffles or ribs or light trapping means (such as vertical posts or pillars or the like or such as a surface having a plurality of compartments or walls or the like or such as a textured surface or light absorbing black flocked material or the like) may be implemented at a camera module or windshield electronics module or the like, while remaining within the spirit and scope of the present invention. The present invention thus provides an engineered structured light trap that is incorporated as part of the light shield during the fabrication of the light shield, such as during an injection molding process. Optionally, the light scattering or trapping element may be molded of a plastic material or may be cast or machined of a metallic material or the like.

The camera or imager or imaging sensor may comprise any suitable camera or imager or sensor. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066571, filed Nov. 27, 2012, and published Jun. 6, 2013 as International Publication No. WO 2013/081985, and/or PCT Application No. PCT/US2012/066570, filed Nov. 27, 2012, and published Jun. 6, 2013 as International Publication No. WO 2013/081984, which are hereby incorporated herein by reference in their entireties.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least about 640 columns and 480 rows (at least about a 640×480 imaging array), with a respective lens focusing images onto respective portions of the array. Alternatively, a megapixel imager may be utilized that comprises a photosensor array with at least one million photosensor elements, preferably arranged in rows and columns, and the image processor associated therewith and processing image data captured thereby is preferably an EYEQ3™ image processing chip available from Mobileye Vision Technologies Ltd. of Jerusalem, Israel. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, PCT Application No. PCT/US2010/047256, filed Aug. 31, 2010 and published Mar. 10, 2011 as International Publication No. WO 2011/

028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012, and published Feb. 7, 2013 as International Publication No. WO 2013/019707, and/or PCT Application No. PCT/US2012/048110, filed Jul. 25, 2012, and published Jan. 31, 2013 as International Publication No. WO 2013/016409, and/or PCT Application No. PCT/CA2012/000378, filed Apr. 25, 2012, and published Nov. 1, 2012 as International Publication No. WO 20112/145822, and/or PCT Application No. PCT/US2012/056014, filed Sep. 19, 2012, and published Mar. 28, 2013 as International Publication No. WO 2013/043661, and/or PCT Application No. PCT/US12/57007, filed Sep. 25, 2012, and published Apr. 4, 2013 as International Publication No. WO 2013/048994, and/or PCT Application No. PCT/US2012/061548, filed Oct. 24, 2012, and published May 2, 2013 as International Publication No. WO 2013/063014, and/or PCT Application No. PCT/US2012/062906, filed Nov. 1, 2012, and published May 10, 2013 as International Publication No. WO 2013/067083, and/or PCT Application No. PCT/US2012/063520, filed Nov. 5, 2012, and published May 16, 2013 as International Publication No. WO 2013/070539, and/or PCT Application No. PCT/US2012/064980, filed Nov. 14, 2012, and published May 23, 2013 as International Publication No. WO 2013/074604, and/or PCT Application No. PCT/US2012/066570, filed Nov. 27, 2012, and published Jun. 6, 2013 as International Publication No. WO 2013/081984, and/or PCT Application No. PCT/US2012/066571, filed Nov. 27, 2012, and published Jun. 6, 2013 as International Publication No. WO 2013/081985, and/or PCT Application No. PCT/US2012/068331, filed Dec. 7, 2012, and published Jun. 13, 2013 as International Publication No. WO 2013/086249, and/or PCT Application No. PCT/US2012/071219, filed Dec. 21, 2012, and published on Jul. 11, 2013 as International Publication No. WO 2013/103548, and/or PCT Application No. PCT/US2013/022119, filed Jan. 18, 2013, and published Jul. 25, 2013 as International Publication No. WO 2013/109869, and/or U.S. patent applications, Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published Jan. 3, 2013 as U.S. Publication No. US-2013-002873, and/or U.S. provisional applications, Ser. No. 61/736,104, filed Dec. 12, 2012; Ser. No. 61/736,103, filed Dec. 12, 2012; Ser. No. 61/735,314, filed Dec. 10, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; Ser. No. 61/727,911, filed Nov. 19, 2012; Ser. No. 61/727,910, filed Nov. 19, 2012; Ser. No. 61/718,382, filed Oct. 25, 2012; Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/676,405, filed Jul. 27, 2012; Ser. No. 61/666,146, filed Jun. 29, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser. No. 61/607,229, filed Mar. 6, 2012; Ser. No. 61/602,876, filed Feb. 24, 2012, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and published Jan. 31, 2013 as International Publication No. WO 2013/016409, and/or U.S. patent application Ser. No. 13/534,657, filed Jun. 27, 2012, and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent applications, Ser. No. 12/091,359, filed Apr. 24, 2008 and published Oct. 1, 2009 as U.S. Publication No. US-2009-0244361, and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877, 897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent applications, Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO 2012/075250, and/or PCT Application No. PCT/US2012/048993, filed Jul. 31, 2012 and published Feb. 7, 2013 as International Publication No. WO 2013/019795, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012, and published Nov. 1, 2012 as International Publication No. WO 2012/145822, and/or PCT Application No. PCT/US2012/066571, filed Nov. 27, 2012, and published Jun. 6, 2013 as International Publication No. WO 2013/081985, and/or U.S. patent application Ser. No. 13/333,337, filed Dec. 21, 2011, now U.S. Pat. No. 9,264,672, and/or U.S. provisional applications, Ser. No. 61/615,410, filed Mar. 26, 2012, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent applications, Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A camera module for a vehicle, said camera module comprising:
   a housing that houses (i) a main circuit board electrically connected with an imager circuit board via a flexible ribbon cable, (ii) an imager disposed on said imager circuit board, (iii) a lens barrel accommodating at least one lens and (iv) a lens holder;
   wherein the imager disposed on said imager circuit board comprises a CMOS photosensor array having at least one million photosensor elements arranged in rows and columns;
   wherein said housing comprises an upper cover and a lower cover, and wherein the upper cover and the lower cover are joined together;
   wherein said main circuit board comprises a printed circuit board (main PCB) having a first planar side and an opposing second planar side separated from the first planar side by a thickness dimension of the main PCB of said main circuit board;
   wherein said imager circuit board comprises a printed circuit board (imager PCB) having a first planar side and an opposing second planar side separated from the first planar side by a thickness dimension of the imager PCB of said imager circuit board;
   wherein circuitry disposed at the main PCB of said main circuit board comprises (i) first circuitry disposed at the first planar side of the main PCB of said main circuit board and (ii) second circuitry disposed at the second planar side of the main PCB of said main circuit board;
   wherein the second circuitry disposed at the second planar side of the main PCB of said main circuit board comprises an image processor;
   wherein said image processor is operable for processing image data captured by the imager;
   wherein, with the imager operated to capture image data, image data captured by the imager is provided via said flexible ribbon cable to circuitry disposed at the main PCB of said main circuit board;
   wherein said housing, with said upper cover and said lower cover joined together, comprises a front portion and a rear portion;
   wherein said front portion is in front of said rear portion;
   wherein said main circuit board is accommodated within said front and rear portions;
   wherein the imager is accommodated within said rear portion and is not accommodated within said front portion of said housing;
   wherein said housing of said camera module has breadth and length, and wherein the main PCB of said main circuit board extends across the breadth of said housing and along the length of said housing;
   wherein said rear portion of said housing has height;
   wherein said front portion of said housing has height;
   wherein the maximum height dimension of said rear portion of said housing is greater than the maximum height dimension of said front portion of said housing;
   wherein the upper cover at said rear portion of said housing comprises an opening, and wherein the imager views to exterior of said housing via said opening;
   wherein the lens barrel extends through said opening to protrude outside said housing;
   wherein the lens barrel is tilted at an acute angle upward relative to the plane of the main PCB of said main circuit board; and
   wherein the first circuitry disposed at the first planar side of the main PCB of said main circuit board comprises an electrical socket connector configured for electrical connection to a plug connector of a vehicular wire harness.

2. The camera module of claim 1, wherein the lens holder is attached at an inner surface of the upper cover at said rear portion of said housing.

3. The camera module of claim 2, wherein said flexible ribbon cable provides LVDS signals to the second circuitry disposed at the second planar side of the main PCB of said main circuit board.

4. The camera module of claim 3, wherein said image processor comprises an image processor chip, and wherein a heat sink is in contact with said image processor chip to dissipate heat generated by said image processor chip.

5. The camera module of claim 1, wherein said housing is configured for detachable mounting at a mounting bracket disposed at an in-cabin side of a windshield of a vehicle equipped with said camera module.

6. The camera module of claim 5, wherein the imager, with said camera module mounted at the in-cabin side of the windshield as installed in the equipped vehicle, has the principal axis of its forward view directed within 2 degrees of horizontal.

7. The camera module of claim 5, wherein the windshield as installed in the equipped vehicle is sloped relative to horizontal at an acute angle in a range of 24 degrees to 28 degrees, and wherein the imager, with said camera module mounted at the in-cabin side of the windshield, has the principal axis of its forward view directed at an angle within 2 degrees of horizontal.

8. The camera module of claim 5, wherein, with said camera module mounted at the in-cabin side of the windshield of the equipped vehicle, the imager is within 4 mm distance to a portion of the windshield that the imager views through.

9. The camera module of claim 5, wherein with said camera module mounted at the in-cabin side of the windshield of the equipped vehicle, image data captured by the imager provided via said flexible ribbon cable to circuitry of the main PCB of said main circuit board is processed by said image processor for at least three driving assist systems of the equipped vehicle, and wherein the at least three driving assist systems of the equipped vehicle comprise (i) a headlamp control system of the equipped vehicle, (ii) a traffic sign recognition system of the equipped vehicle and (iii) a lane departure warning system of the equipped vehicle.

10. The camera module of claim 5, wherein, with said camera module mounted at the in-cabin side of the windshield of the equipped vehicle, a stray light shield is present that reduces incidence of stray light at the imager.

11. The camera module of claim 10, wherein said stray light shield is formed of a polymeric material in an injection molding operation.

12. The camera module of claim 11, wherein said stray light shield is separate from said housing of said camera module.

13. The camera module of claim 12, wherein said stray light shield is configured to attach at said housing of said camera module.

14. The camera module of claim 10, wherein said stray light shield comprises a base portion and side walls that extend upward from said base portion so as to establish a pocket.

15. The camera module of claim 14, wherein at least said base portion of said stray light shield comprises light traps configured to at least partially trap extraneous light emanating from exterior the equipped vehicle and passing through the windshield of the equipped vehicle so as to be incident at said base portion, said light traps reducing incidence of extraneous light at the imager.

16. The camera module of claim 15, wherein said light traps comprise a plurality of shaped light absorbing elements that are spaced apart and shaped to trap light, and wherein said shaped light absorbing elements comprise a plurality of generally vertical ribs each having a first surface and a second surface opposite said first surface, and wherein said first surface of a given rib is closer to the windshield than said second surface of the given rib, and wherein said first surface is configured to be at an angle of less than or equal to five degrees relative to vertical and said second surface is configured to be at an angle of less than or equal to ten degrees relative to vertical when said camera module is mounted at the in-cabin side of the windshield of the equipped vehicle of the equipped vehicle, and wherein said first and second surfaces are different so that each of said ribs narrows towards its upper end, and wherein a ratio of a distance between adjacent ribs to the height dimension of the adjacent ribs is greater than one, and wherein, with said camera module mounted at the in-cabin side of the windshield of the equipped vehicle of the equipped vehicle, (i) said first surface is at an angle of zero degrees relative to vertical and (ii) said second surface is at an angle of five degrees relative to vertical.

17. The camera module of claim 5, wherein structure of said housing is configured to cooperate with corresponding structure of the mounting bracket so that, with said camera module mounted at the in-cabin side of the windshield of the equipped vehicle, said camera module is mounted at the windshield with the imager viewing through the windshield in a forward direction of travel of the equipped vehicle.

18. The camera module of claim 17, wherein, with said camera module mounted at the windshield of the equipped vehicle, the mounting bracket at least partially establishes angle of view of the imager relative to the windshield.

19. The camera module of claim 17, wherein one side of the mounting bracket comprises structure configured to cooperate with corresponding other structure of said housing of said camera module, and wherein the structure of the mounting bracket and the other structure of said housing of said camera module cooperate to detachably mount said camera module at the in-cabin side of the windshield.

20. The camera module of claim 19, wherein an opposing other side of the mounting bracket is configured for adhesive attachment at the in-cabin side of the windshield of the equipped vehicle.

21. The camera module of claim 17, wherein the windshield as installed in the equipped vehicle is sloped relative to horizontal at an acute windshield angle, and wherein the mounting bracket is configured and constructed so that, with said camera module mounted at the in-cabin side of the windshield that is sloped relative to horizontal at the acute windshield angle, the imager has the principal axis of its forward view directed at an angle closer to horizontal than the acute windshield angle of the windshield to horizontal.

22. The camera module of claim 17, wherein said housing attaches at the mounting bracket via a mechanical clip-and-notch structure.

23. The camera module of claim 5, wherein, with said camera module mounted at the in-cabin side of the windshield of the equipped vehicle, a stray light shield is present that reduces incidence of stray light at the imager, and wherein said stray light shield is separate from the mounting bracket.

24. The camera module of claim 23, wherein said stray light shield is configured to attach at the mounting bracket.

25. The camera module of claim 5, wherein, with said camera module mounted at the in-cabin side of the windshield of the equipped vehicle, a stray light shield is present that reduces incidence of stray light at the imager, and wherein the mounting bracket is formed of a polymeric material in an injection molding operation, and wherein said stray light shield is integrally formed with the mounting bracket by injection molding of polymeric material in the injection molding operation and constitutes an integral part of the mounting bracket.

26. The camera module of claim 5, wherein, with said camera module mounted at the in-cabin side of the windshield of the equipped vehicle, a stray light shield is present that reduces incidence of stray light at the imager, and wherein said stray light shield is formed of a polymeric material in an injection molding operation, and wherein said stray light shield comprises a base portion and tapering side walls that extend upward from said base portion so as to establish a tapered pocket.

27. The camera module of claim 1, wherein the lens holder is mechanically attached at an inner surface of the upper cover at said rear portion of said housing, and wherein said imager circuit board is disposed at said rear portion of said housing and is tilted at an acute angle with respect to the plane of the main PCB of said main circuit board.

28. The camera module of claim 1, wherein the lens barrel is tilted upward at an acute angle between 10 degrees and 20 degrees relative to the plane of the main PCB of said main circuit board.

29. The camera module of claim 1, wherein the lens holder comprises a first opening therethrough, and wherein the lens holder comprises a second opening therethrough, and wherein the upper cover at said rear portion of said housing comprises a first threaded hole that corresponds with the first opening of the lens holder, and wherein the upper cover at said rear portion of said housing comprises a second threaded hole that corresponds with the second opening of the lens holder, and wherein the lens holder is mechanically attached at an inner surface of the upper cover at said rear portion of said housing by (i) a first screw fastener that passes through the first opening of the lens holder and that screws into the first threaded hole of the upper cover at said rear portion of said housing and (ii) a second screw fastener that passes through the second opening of the lens holder and that screws into the second threaded hole of the upper cover at said rear portion of said housing.

30. The camera module of claim 1, wherein the main PCB of said main circuit board comprises a hole surrounded by material of the main PCB that extends from the first planar side of the main PCB of said main circuit board to the second planar side of the main PCB of said main circuit board.

31. The camera module of claim 1, wherein the main PCB of said main circuit board comprises a cut-out that extends from the first planar side of the main PCB of said main circuit board to the second planar side of the main PCB of said main circuit board.

32. The camera module of claim 1, wherein the upper cover and the lower cover are joined together by a plurality of screw fasteners.

33. The camera module of claim 1, wherein the lens holder is mechanically attached by a plurality of screw fasteners at an inner surface of the upper cover at said rear portion of said housing.

34. The camera module of claim 1, wherein the breadth of said housing has a maximum dimension of 100 mm or less, and wherein the length of said housing has a maximum dimension of 100 mm or less, and wherein the height of said rear portion of said housing has a maximum dimension of 35 mm or less.

35. The camera module of claim 1, wherein the lens holder is fixed to said imager circuit board.

36. The camera module of claim 1, wherein the lens holder is fixed to said imager circuit board by at least one screw fastener that extends through a hole in said imager circuit board and mates with a threaded hole in the lens holder.

37. The camera module of claim 1, wherein the lens barrel is adhesively bonded to the lens holder.

38. The camera module of claim 1, wherein the lens barrel is screwed into the lens holder.

39. The camera module of claim 1, wherein circuitry disposed at the main PCB comprises at least one memory component.

40. The camera module of claim 39, wherein circuitry disposed at the main PCB comprises at least one power supply component.

41. The camera module of claim 40, wherein said image processor comprises an image processor chip disposed at the main PCB, and wherein (i) the at least one memory component disposed at the main PCB, (ii) the at least one power supply component disposed at the main PCB, (iii) said image processor chip disposed at the main PCB and (iv) the electrical socket connector configured for electrical connection to the plug connector of the vehicular wire harness are electrically operatively coupled together by conductive traces and vias of the main PCB.

42. A camera module for a vehicle, said camera module comprising:
a housing that houses (i) a main circuit board electrically connected with an imager circuit board via a flexible ribbon cable, (ii) an imager disposed on said imager circuit board, (iii) a lens barrel accommodating at least one lens and (iv) a lens holder;
wherein the imager disposed on said imager circuit board comprises a photosensor array having at least one million photosensor elements arranged in rows and columns;
wherein said housing comprises an upper cover and a lower cover, and wherein the upper cover and the lower cover are joined together;
wherein said main circuit board comprises a multilayered printed circuit board (main PCB) having a first planar side and an opposing second planar side separated from the first planar side by a thickness dimension of the main PCB of said main circuit board;
wherein said imager circuit board comprises a printed circuit board (imager PCB) having a first planar side and an opposing second planar side separated from the first planar side by a thickness dimension of the imager PCB of said imager circuit board;
wherein circuitry disposed at the main PCB of said main circuit board comprises (i) first circuitry disposed at the first planar side of the main PCB of said main circuit board and (ii) second circuitry disposed at the second planar side of the main PCB of said main circuit board;
wherein the second circuitry disposed at the second planar side of the main PCB of said main circuit board comprises an image processor chip;
wherein said image processor chip is operable for processing image data captured by the imager;
wherein, with the imager operated to capture image data, image data captured by the imager is provided via said flexible ribbon cable to circuitry disposed at the main PCB of said main circuit board;
wherein said housing, with said upper cover and said lower cover joined together, comprises a front portion and a rear portion;
wherein said front portion is in front of said rear portion;
wherein said main circuit board is accommodated within said front and rear portions;
wherein the imager is accommodated within said rear portion and is not accommodated within said front portion of said housing;
wherein said housing of said camera module has breadth and length, and wherein the main PCB of said main circuit board extends across the breadth of said housing and along the length of said housing;
wherein said rear portion of said housing has height;
wherein said front portion of said housing has height;
wherein the maximum height dimension of said rear portion of said housing is greater than the maximum height dimension of said front portion of said housing;
wherein the lens holder comprises a first opening therethrough;
wherein the lens holder comprises a second opening therethrough;
wherein the upper cover at said rear portion of said housing comprises a first threaded hole that corresponds with the first opening of the lens holder, and wherein the upper cover at said rear portion of said housing comprises a second threaded hole that corresponds with the second opening of the lens holder;
wherein the lens holder is mechanically attached at an inner surface of the upper cover at said rear portion of said housing by (i) a first screw fastener that passes through the first opening of the lens holder and that screws into the first threaded hole of the upper cover at said rear portion of said housing and (ii) a second screw fastener that passes through the second opening of the lens holder and that screws into the second threaded hole of the upper cover at said rear portion of said housing;

wherein the upper cover at said rear portion of said housing comprises an opening, and wherein the imager views to exterior of said housing via said opening;

wherein the lens barrel extends through said opening to protrude outside said housing;

wherein the lens barrel is tilted at an acute angle upward relative to the plane of the main PCB of said main circuit board; and wherein the first circuitry disposed at the first planar side of the main PCB of said main circuit board comprises an electrical socket connector configured for electrical connection to a plug connector of a vehicular wire harness.

43. The camera module of claim 42, wherein said imager circuit board is disposed at said rear portion of said housing and is tilted at an acute angle with respect to the plane of the main PCB of said main circuit board.

44. The camera module of claim 43, wherein the lens barrel is tilted upward at an acute angle between 10 degrees and 20 degrees relative to the plane of the main PCB of said main circuit board.

45. The camera module of claim 42, wherein a first electrical connector is disposed at the second planar side of the main PCB of said main circuit board, and wherein a second electrical connector of said flexible ribbon cable electrically connects with said first electrical disposed at the second planar side of the main PCB of said main circuit board.

46. The camera module of claim 42, wherein said flexible ribbon cable provides LVDS signals to the second circuitry disposed at the second planar side of the main PCB of said main circuit board.

47. The camera module of claim 46, wherein the main PCB of said main circuit board comprises a hole surrounded by material of the main PCB that extends from the first planar side of the main PCB of said main circuit board to the second planar side of the main PCB of said main circuit board, and wherein said flexible ribbon cable extending from said imager circuit board passes through the hole of the main PCB.

48. The camera module of claim 46, wherein the main PCB of said main circuit board comprises a cut-out that extends from the first planar side of the main PCB of said main circuit board to the second planar side of the main PCB of said main circuit board, and wherein said flexible ribbon cable extending from said imager circuit board traverses the cut-out of the main PCB for connecting said flexible ribbon cable with an electrical connector disposed at the second planar side of the main PCB.

49. The camera module of claim 42, wherein a heat sink is in contact with said image processor chip to dissipate heat generated by said image processor chip.

50. The camera module of claim 42, wherein the lens holder is fixed to said imager circuit board.

51. The camera module of claim 50, wherein the upper cover and the lower cover are joined together by a plurality of screw fasteners.

52. The camera module of claim 51, wherein with said camera module mounted in a vehicle equipped with said camera module, image data captured by the imager provided via said flexible ribbon cable to circuitry of the main PCB of said main circuit board is processed by said image processor chip for at least three driving assist systems of the equipped vehicle, and wherein the at least three driving assist systems of the equipped vehicle comprise (i) a headlamp control system of the equipped vehicle, (ii) a traffic sign recognition system of the equipped vehicle and (iii) a lane departure warning system of the equipped vehicle.

53. The camera module of claim 42, wherein the lens holder is fixed to said imager circuit board by at least one screw fastener that extends through a hole in said imager circuit board and mates with a threaded hole in the lens holder.

54. The camera module of claim 42, wherein said housing is configured for detachable mounting at a mounting bracket disposed at an in-cabin side of a windshield of a vehicle equipped with said camera module.

55. The camera module of claim 54, wherein structure of said housing is configured to cooperate with corresponding structure of the mounting bracket so that, with said camera module mounted at the in-cabin side of the windshield of the equipped vehicle, said camera module is mounted at the windshield with the imager viewing through the windshield in a forward direction of travel of the equipped vehicle.

56. The camera module of claim 55, wherein, with said camera module mounted at the windshield of the equipped vehicle, the mounting bracket at least partially establishes angle of view of the imager relative to the windshield.

57. The camera module of claim 55, wherein the windshield as installed in the equipped vehicle is sloped relative to horizontal at an acute windshield angle, and wherein the mounting bracket is configured and constructed so that, with said camera module mounted at the in-cabin side of the windshield that is sloped relative to horizontal at the acute windshield angle, the imager has the principal axis of its forward view directed at an angle closer to horizontal than the acute windshield angle of the windshield to horizontal.

58. The camera module of claim 42, wherein, with said camera module mounted at an in-cabin side of a windshield of a vehicle equipped with said camera module, a stray light shield is present that reduces incidence of stray light at the imager.

59. The camera module of claim 58, wherein said stray light shield comprises a base portion and side walls that extend upward from said base portion so as to establish a pocket.

60. The camera module of claim 58, wherein said stray light shield is formed of a polymeric material in an injection molding operation.

61. The camera module of claim 60, wherein said stray light shield is separate from said housing of said camera module.

62. The camera module of claim 61, wherein said stray light shield is configured to attach at said housing of said camera module.

63. The camera module of claim 42, wherein the breadth of said housing has a maximum dimension of 100 mm or less, and wherein the length of said housing has a maximum dimension of 100 mm or less, and wherein the height of said rear portion of said housing has a maximum dimension of 35 mm or less.

64. The camera module of claim 63, wherein said imager circuit board is disposed at said rear portion of said housing and is tilted at an acute angle with respect to the plane of the main PCB of said main circuit board.

65. The camera module of claim 42, wherein, with said camera module mounted at an in-cabin side of a windshield of a vehicle equipped with said camera module, the imager is within 4 mm distance to a portion of the windshield that the imager views through.

66. The camera module of claim 42, wherein the lens barrel is adhesively bonded to the lens holder.

67. The camera module of claim 42, wherein the lens barrel is screwed into the lens holder.

68. The camera module of claim 42, wherein circuitry disposed at the main PCB comprises at least one memory component.

69. The camera module of claim 68, wherein circuitry disposed at the main PCB comprises at least one power supply component.

70. The camera module of claim 69, wherein (i) the at least one memory component disposed at the main PCB, (ii) the at least one power supply component disposed at the main PCB, (iii) said image processor chip disposed at the main PCB and (iv) the electrical socket connector configured for electrical connection to the plug connector of the vehicular wire harness are electrically operatively coupled together by conductive traces and vias of the main PCB.

71. A camera module for a vehicle, said camera module comprising:
a housing that houses (i) a main circuit board electrically connected with an imager circuit board via a flexible ribbon cable, (ii) an imager disposed on said imager circuit board, (iii) a lens barrel accommodating at least one lens and (iv) a lens holder;
wherein the imager disposed on said imager circuit board comprises a photosensor array having at least one million photosensor elements arranged in rows and columns;
wherein said housing comprises an upper cover and a lower cover, and wherein the upper cover and the lower cover are joined together;
wherein said main circuit board comprises a multilayered printed circuit board (main PCB) having a first planar side and an opposing second planar side separated from the first planar side by a thickness dimension of the main PCB of said main circuit board;
wherein said imager circuit board comprises a printed circuit board (imager PCB) having a first planar side and an opposing second planar side separated from the first planar side by a thickness dimension of the imager PCB of said imager circuit board;
wherein circuitry disposed at the main PCB of said main circuit board comprises an image processor;
wherein said image processor is operable for processing image data captured by the imager;
wherein, with the imager operated to capture image data, image data captured by the imager is provided via said flexible ribbon cable to circuitry disposed at the main PCB of said main circuit board;
wherein said housing, with said upper cover and said lower cover joined together, comprises a front portion and a rear portion;
wherein said front portion is in front of said rear portion;
wherein said main circuit board is accommodated within said front and rear portions;
wherein the imager is accommodated within said rear portion and is not accommodated within said front portion of said housing;
wherein the lens holder is attached at an inner surface of the upper cover at said rear portion of said housing;
wherein said housing of said camera module has breadth and length, and wherein the main PCB of said main circuit board extends across the breadth of said housing and along the length of said housing;
wherein said rear portion of said housing has height;
wherein said front portion of said housing has height;
wherein the maximum height dimension of said rear portion of said housing is greater than the maximum height dimension of said front portion of said housing;
wherein the breadth of said housing has a maximum dimension of 100 mm or less;
wherein the length of said housing has a maximum dimension of 100 mm or less;
wherein the height of said rear portion of said housing has a maximum dimension of 35 mm or less;
wherein the upper cover at said rear portion of said housing comprises an opening, and wherein the imager views to exterior of said housing via said opening;
wherein the lens barrel extends through said opening to protrude outside said housing; and
wherein circuitry of the main PCB of said main circuit board comprises an electrical socket connector configured for electrical connection to a plug connector of a vehicular wire harness.

72. The camera module of claim 71, wherein said image processor comprises an image processor chip, and wherein a heat sink is in contact with said image processor chip to dissipate heat generated by said image processor chip.

73. The camera module of claim 71, wherein the upper cover and the lower cover are joined together by a plurality of screw fasteners.

74. The camera module of claim 73, wherein the lens barrel is tilted upward at an acute angle between 10 degrees and 20 degrees relative to the plane of the main PCB of said main circuit board.

75. The camera module of claim 71, wherein said image processor comprises an image processor chip.

76. The camera module of claim 75, wherein the main PCB of said main circuit board comprises a hole surrounded by material of the main PCB that extends from the first planar side of the main PCB of said main circuit board to the second planar side of the main PCB of said main circuit board.

77. The camera module of claim 75, wherein the main PCB of said main circuit board comprises a cut-out that extends from the first planar side of the main PCB of said main circuit board to the second planar side of the main PCB of said main circuit board.

78. The camera module of claim 75, wherein said flexible ribbon cable provides LVDS signals to circuitry of the main PCB of said main circuit board.

79. The camera module of claim 71, wherein the lens holder is fixed to said imager circuit board.

80. The camera module of claim 79, wherein the lens holder is fixed to said imager circuit board by at least one screw fastener that extends through a hole in said imager circuit board and mates with a threaded hole in the lens holder.

81. The camera module of claim 71, wherein with said camera module mounted in a vehicle equipped with said camera module, image data captured by the imager provided via said flexible ribbon cable to circuitry of the main PCB of said main circuit board is processed by said image processor for at least three driving assist systems of the equipped vehicle, and wherein the at least three driving assist systems of the equipped vehicle comprise (i) a headlamp control system of the equipped vehicle, (ii) a traffic sign recognition system of the equipped vehicle and (iii) a lane departure warning system of the equipped vehicle.

82. The camera module of claim 71, wherein said housing is configured for detachable mounting at a mounting bracket disposed at an in-cabin side of a windshield of a vehicle equipped with said camera module.

83. The camera module of claim 82, wherein structure of said housing is configured to cooperate with corresponding structure of the mounting bracket so that, with said camera module mounted at the in-cabin side of the windshield of the equipped vehicle, said camera module is mounted at the windshield with the imager viewing through the windshield in a forward direction of travel of the equipped vehicle.

84. The camera module of claim 83, wherein, with said camera module mounted at the windshield of the equipped vehicle, the mounting bracket at least partially establishes angle of view of the imager relative to the windshield.

85. The camera module of claim 83, wherein the windshield as installed in the equipped vehicle is sloped relative to horizontal at an acute windshield angle, and wherein the mounting bracket is configured and constructed so that, with said camera module mounted at the in-cabin side of the windshield that is sloped relative to horizontal at the acute windshield angle, the imager has the principal axis of its forward view directed at an angle closer to horizontal than the acute windshield angle of the windshield to horizontal.

86. The camera module of claim 82, wherein the imager, with said camera module mounted at the in-cabin side of the windshield as installed in the equipped vehicle, has the principal axis of its forward view directed within 2 degrees of horizontal.

87. The camera module of claim 82, wherein the windshield as installed in the equipped vehicle is sloped relative to horizontal at an acute angle in a range of 24 degrees to 28 degrees, and wherein the imager, with said camera module mounted at the in-cabin side of the windshield, has the principal axis of its forward view directed at an angle within 2 degrees of horizontal.

88. The camera module of claim 82, wherein, with said camera module mounted at the in-cabin side of the windshield of the equipped vehicle, a stray light shield is present that reduces incidence of stray light at the imager, and wherein said stray light shield is formed of a polymeric material in an injection molding operation, and wherein said stray light shield comprises a base portion and tapering side walls that extend upward from said base portion so as to establish a tapered pocket.

89. The camera module of claim 71, wherein, with said camera module mounted at an in-cabin side of a windshield of a vehicle equipped with said camera module, a stray light shield is present that reduces incidence of stray light at the imager.

90. The camera module of claim 89, wherein said stray light shield comprises a base portion and side walls that extend upward from said base portion so as to establish a pocket.

91. The camera module of claim 89, wherein said stray light shield is formed of a polymeric material in an injection molding operation.

92. The camera module of claim 91, wherein said stray light shield is separate from said housing of said camera module.

93. The camera module of claim 92, wherein said stray light shield is configured to attach at said housing of said camera module.

94. The camera module of claim 71, wherein said imager circuit board is disposed at said rear portion of said housing and is tilted at an acute angle with respect to the plane of the main PCB of said main circuit board.

95. The camera module of claim 71, wherein, with said camera module mounted at an in-cabin side of a windshield of a vehicle equipped with said camera module, the imager is within 4 mm distance to a portion of the windshield that the imager views through.

96. The camera module of claim 71, wherein the lens holder comprises a first opening therethrough, and wherein the lens holder comprises a second opening therethrough, and wherein the upper cover at said rear portion of said housing comprises a first threaded hole that corresponds with the first opening of the lens holder, and wherein the upper cover at said rear portion of said housing comprises a second threaded hole that corresponds with the second opening of the lens holder, and wherein the lens holder is mechanically attached at the inner surface of the upper cover at said rear portion of said housing by (i) a first screw fastener that passes through the first opening of the lens holder and that screws into the first threaded hole of the upper cover at said rear portion of said housing and (ii) a second screw fastener that passes through the second opening of the lens holder and that screws into the second threaded hole of the upper cover at said rear portion of said housing.

97. The camera module of claim 96, wherein the lens barrel is tilted at an acute angle upward relative to the plane of the main PCB of said main circuit board.

98. The camera module of claim 71, wherein the lens barrel is adhesively bonded to the lens holder.

99. The camera module of claim 71, wherein the lens barrel is screwed into the lens holder.

100. The camera module of claim 71, wherein circuitry disposed at the main PCB comprises at least one memory component.

101. The camera module of claim 100, wherein circuitry disposed at the main PCB comprises at least one power supply component.

102. The camera module of claim 101, wherein said image processor comprises an image processor chip disposed at the main PCB, and wherein (i) the at least one memory component disposed at the main PCB, (ii) the at least one power supply component disposed at the main PCB, (iii) said image processor chip disposed at the main PCB and (iv) the electrical socket connector configured for electrical connection to the plug connector of the vehicular wire harness are electrically operatively coupled together by conductive traces and vias of the main PCB.

* * * * *